United States Patent [19]

Kiko

[11] Patent Number: 5,586,181

[45] Date of Patent: Dec. 17, 1996

[54] METALLIC CHANNEL UNIT NETWORK

[75] Inventor: Frederick J. Kiko, Carlsbad, Calif.

[73] Assignee: Tollgrade Communications, Inc., Wilmington, Del.

[21] Appl. No.: 336,315

[22] Filed: Nov. 9, 1994

Related U.S. Application Data

[63] Continuation-in-part of Ser. No. 35,090, Mar. 22, 1993, Pat. No. 5,457,743, which is a continuation-in-part of Ser. No. 577,284, Sep. 4, 1990, Pat. No. 5,202,919.

[51] Int. Cl.$^6$ ................................................. H04M 19/00
[52] U.S. Cl. ........................ 379/399; 379/405; 379/402; 379/413; 379/344
[58] Field of Search ................................. 379/405, 399, 379/344, 345, 328, 338, 402, 413

[56] References Cited

U.S. PATENT DOCUMENTS

| | | | |
|---|---|---|---|
| 4,287,393 | 9/1981 | Reuvekamp | 379/413 |
| 4,476,350 | 10/1984 | Aull et al. | 379/413 |
| 4,677,669 | 6/1987 | Kawami et al. | 379/399 |
| 4,764,956 | 8/1988 | Rosch et al. | 379/413 |
| 4,852,160 | 7/1989 | Kiko | 379/405 |
| 4,914,693 | 4/1990 | Beck et al. | 379/405 |
| 5,202,919 | 4/1993 | Kiko | 379/399 |
| 5,457,743 | 10/1995 | Kiko | 379/399 |

*Primary Examiner*—Jeffery Hofsass
*Assistant Examiner*—Jacques M. Saint-Surin
*Attorney, Agent, or Firm*—Davis Chin

[57] ABSTRACT

A channel unit network having a two-wire port for interconnecting a two-wire, bidirectional signal transmitting means with a four-wire digital transmitting means in a communication system to create a precision bidirectional simulated two-wire cable pair with an extended operation range over a transmission medium includes a signal processing circuit, tip and ring switch mode driver, a negative inductor circuit, a negative capacitor circuit, and a 200 Hz impedance circuit. The negative conductor circuit and the negative capacitor circuit are used to generate respective negative inductance and negative capacitance at 24 Hz in order to maintain loop stability. The 200 Hz impedance circuit is used to generate a positive impedance at a frequency of approximately 200 Hz so as to prevent overloading of external telephone communication testing circuitry.

18 Claims, 39 Drawing Sheets

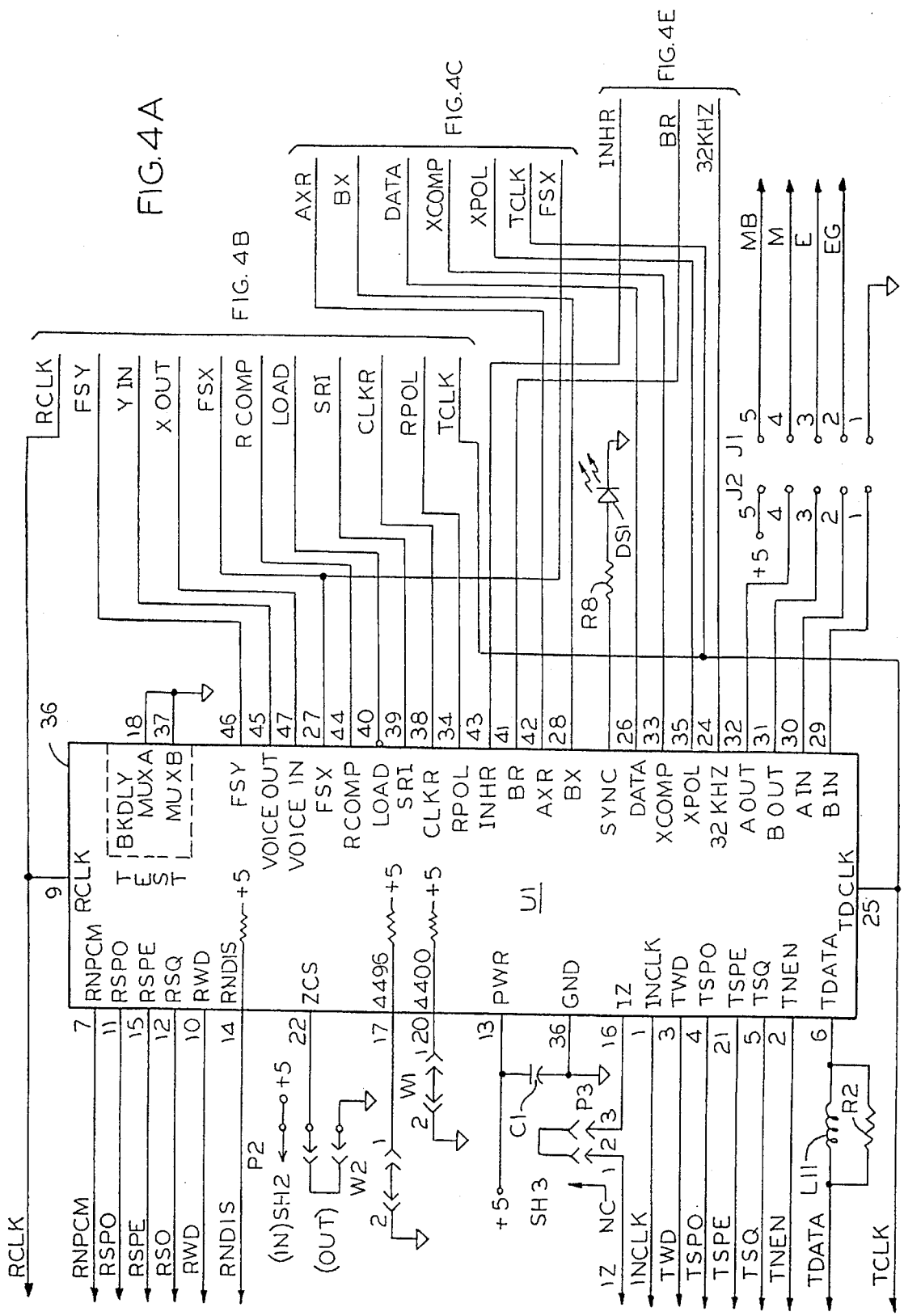

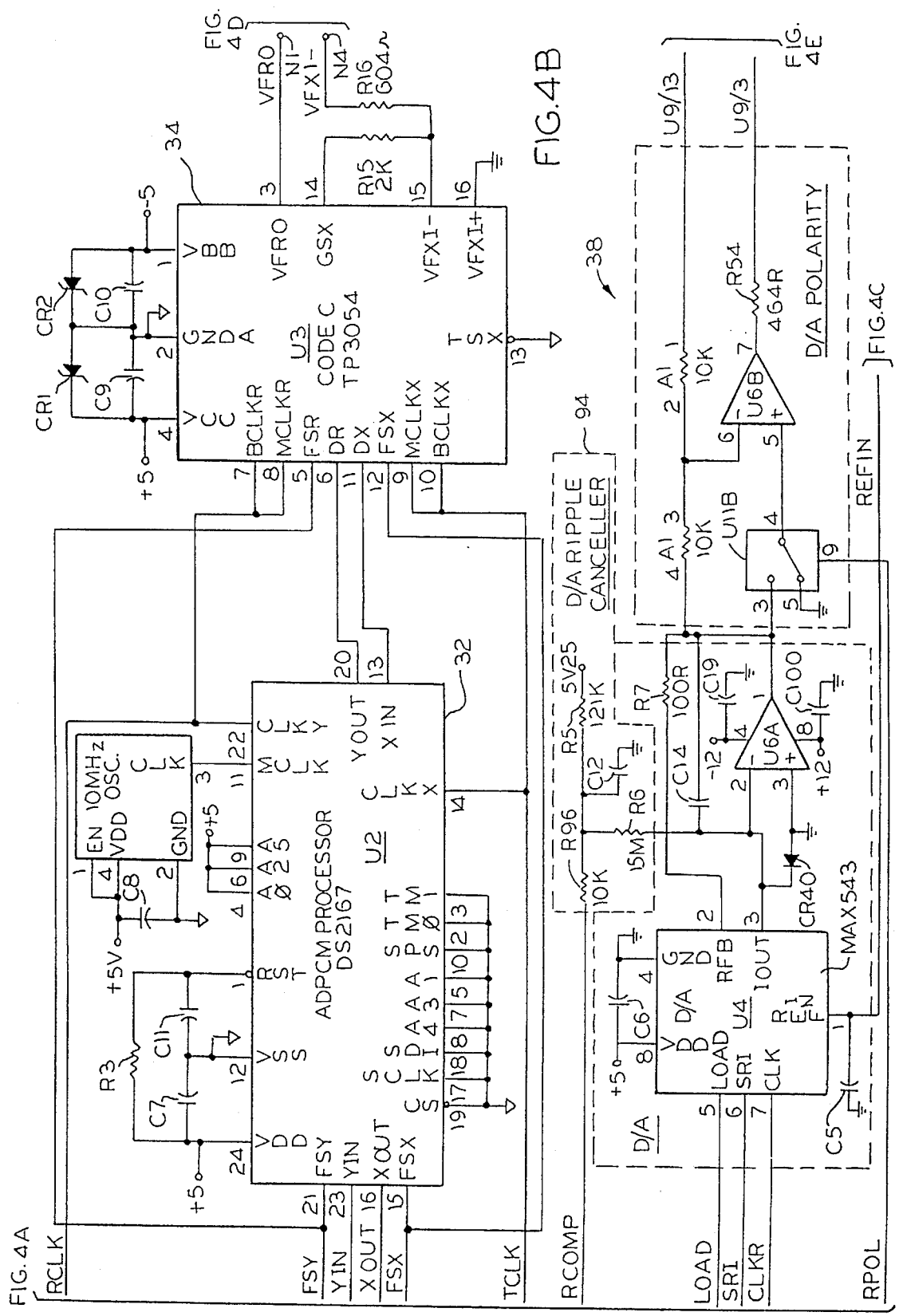

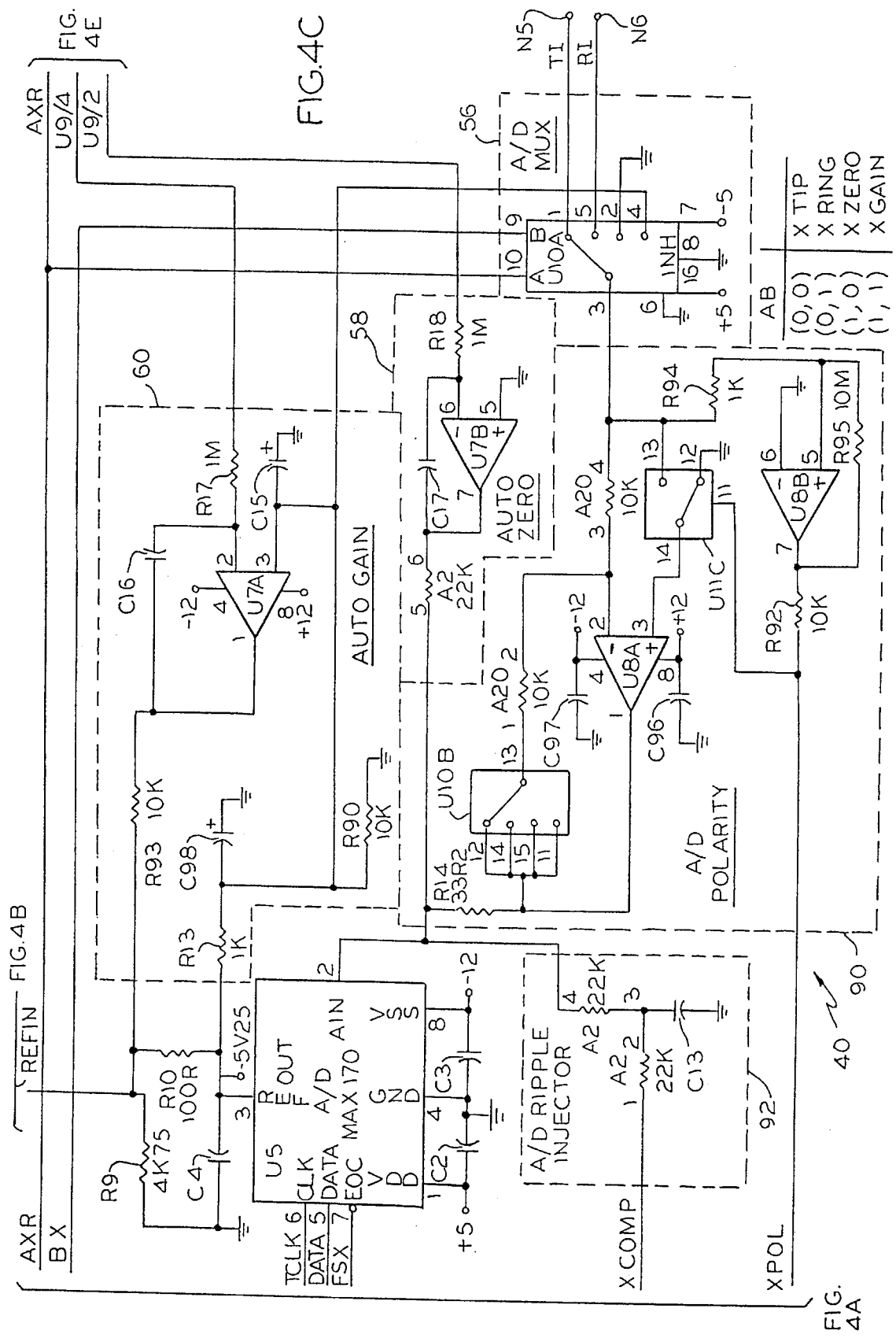

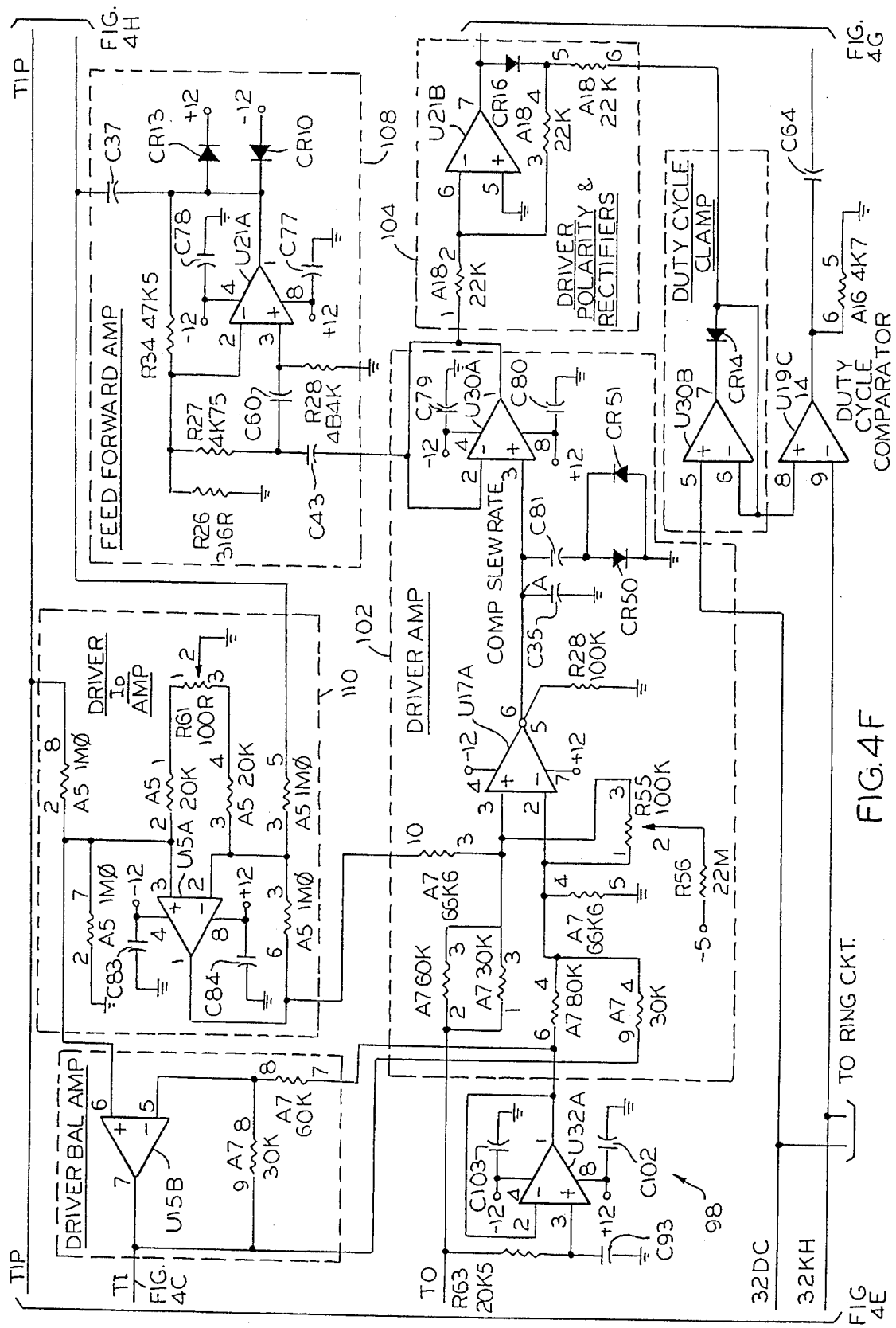

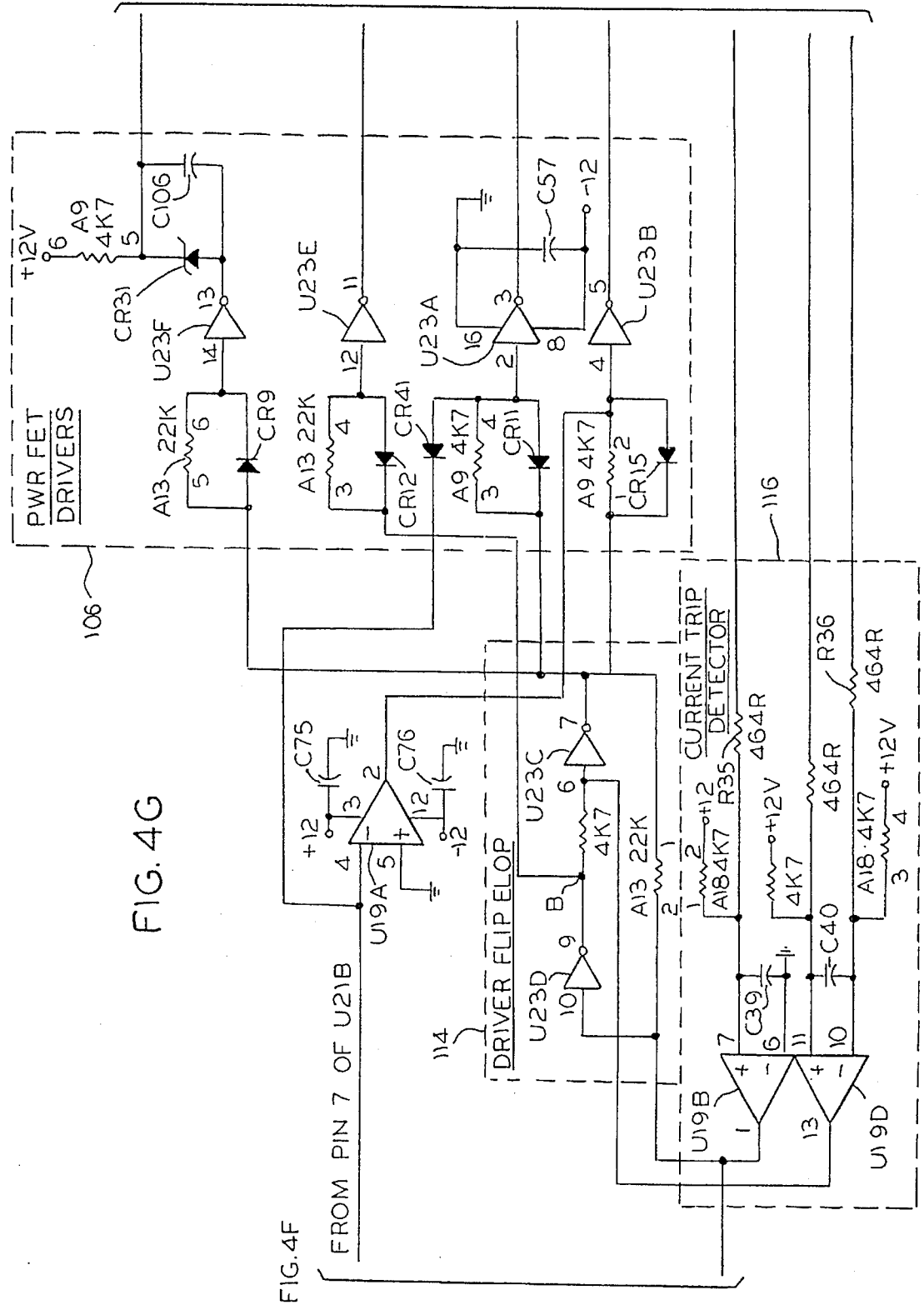

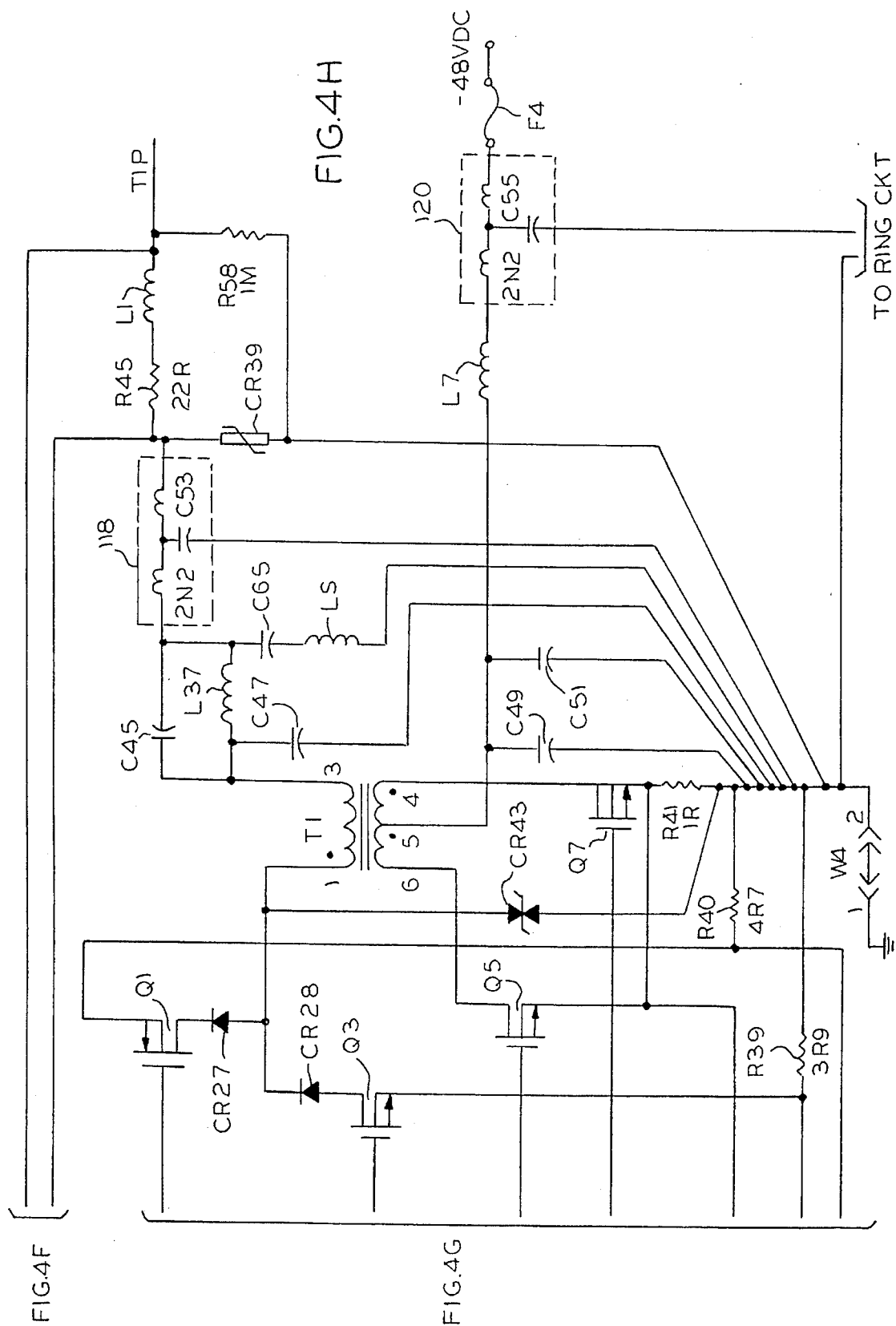

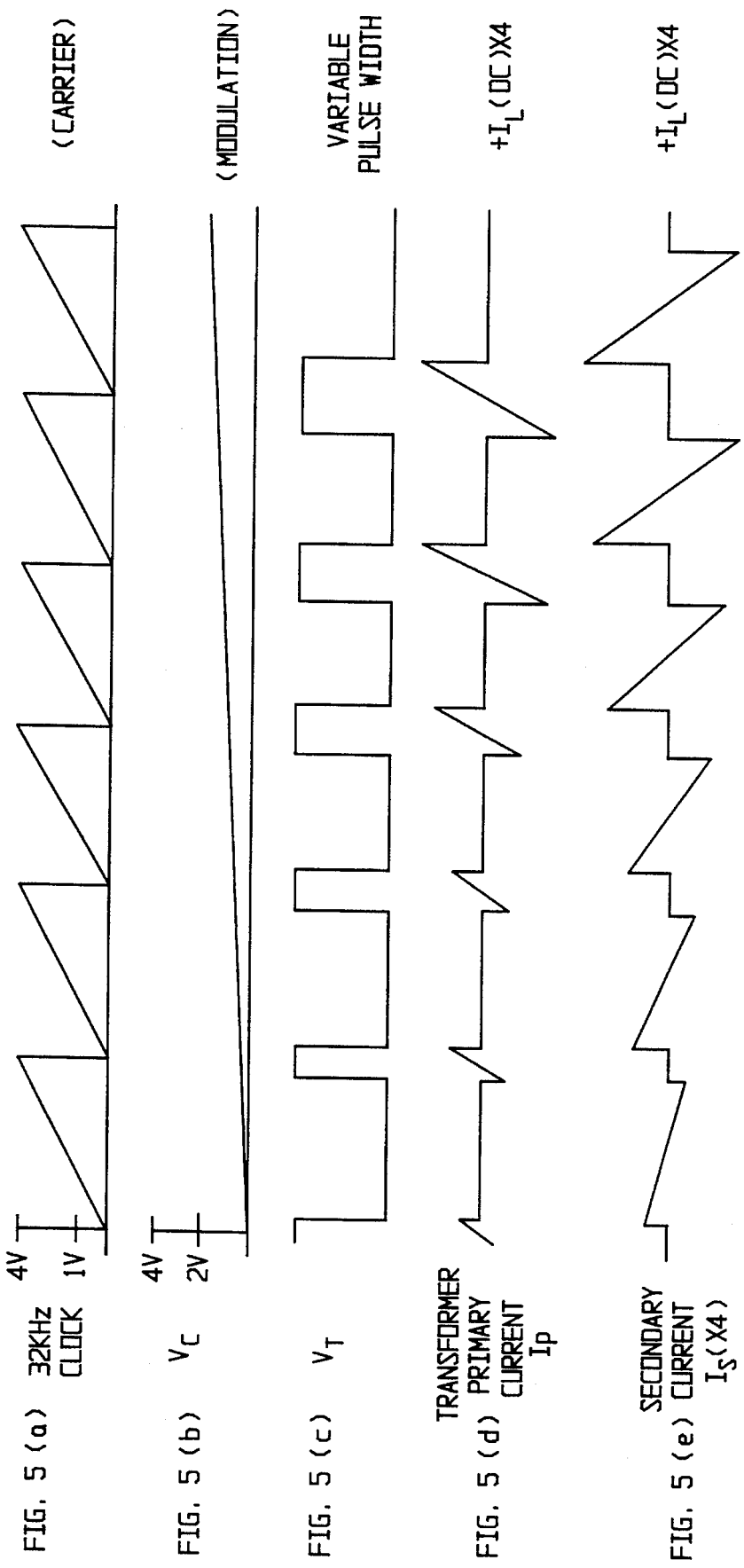

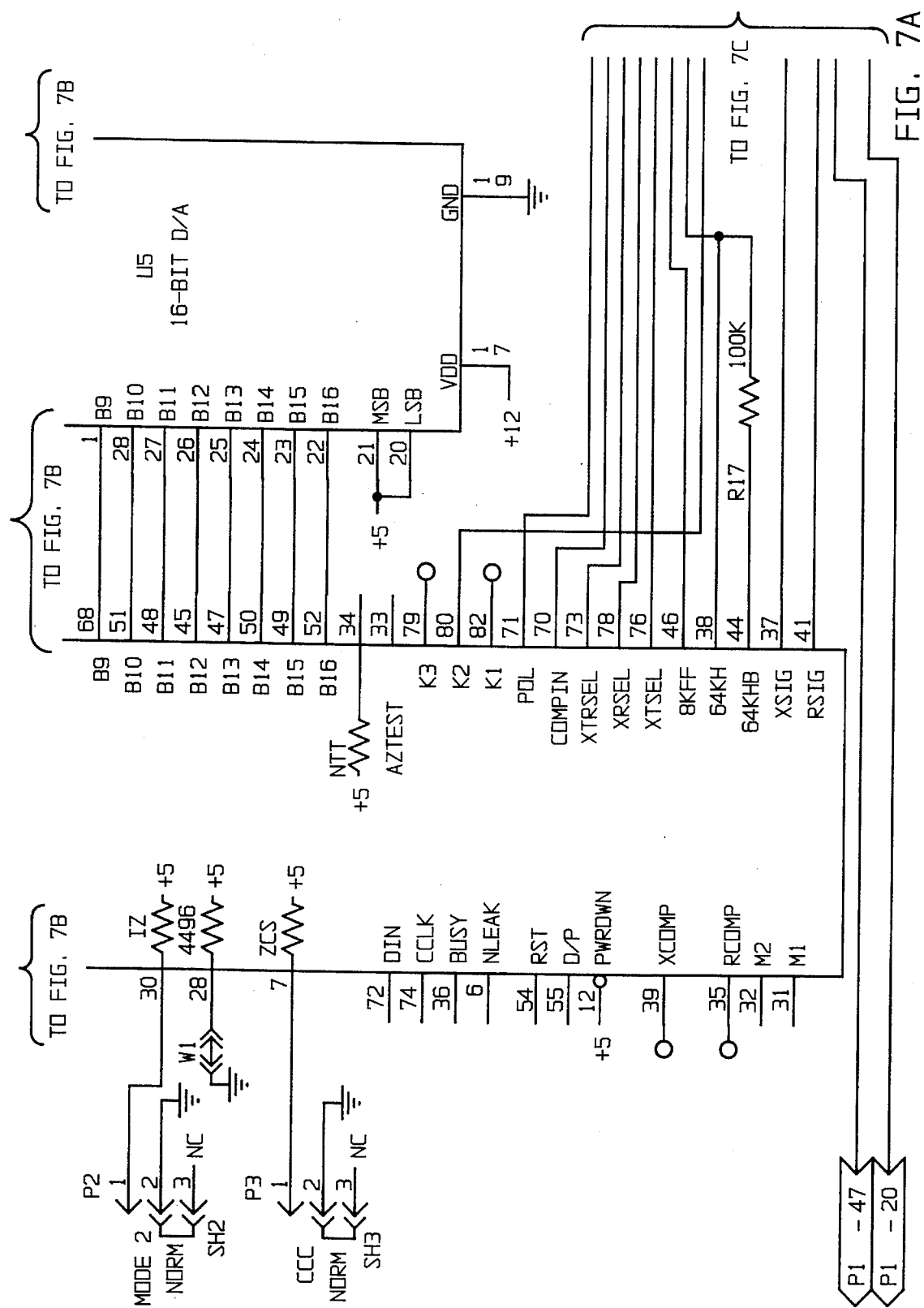

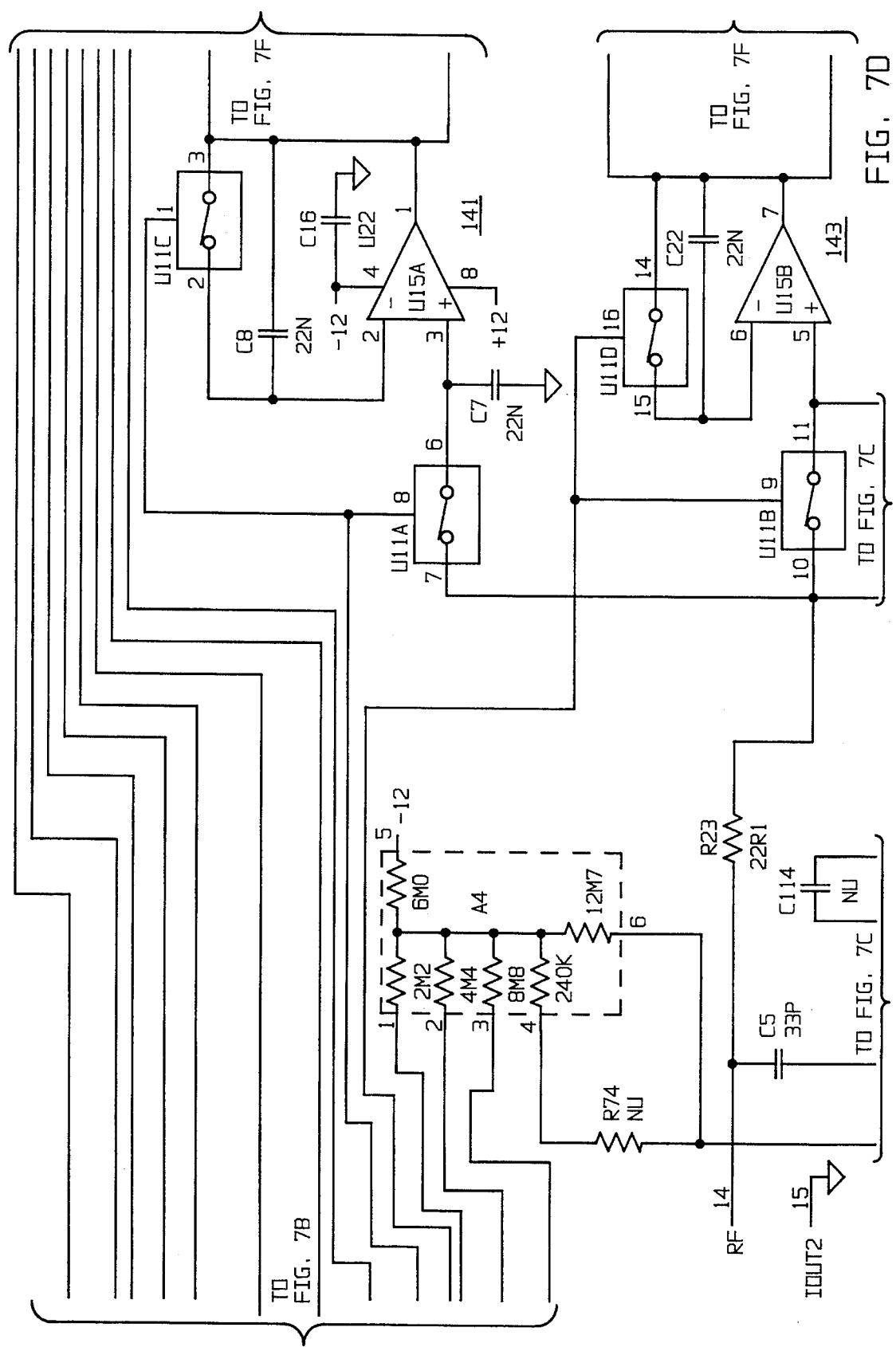

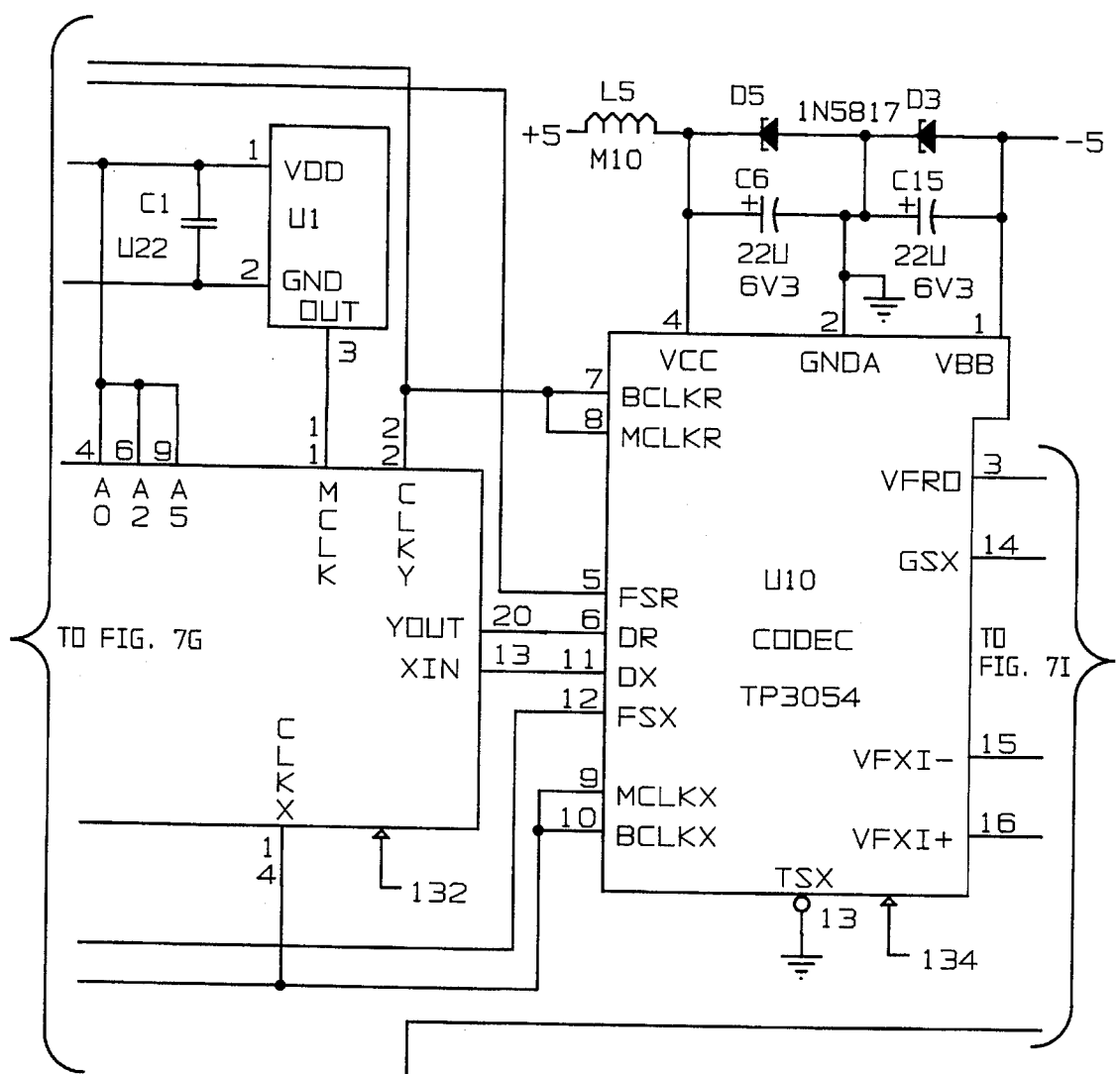
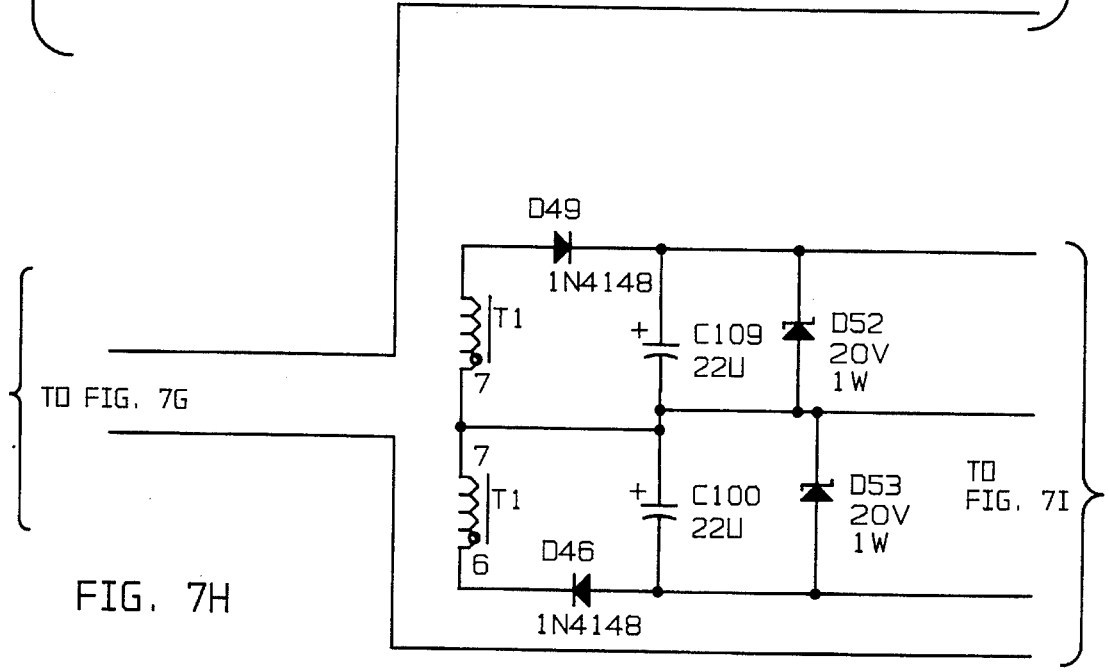
FIG. 7H

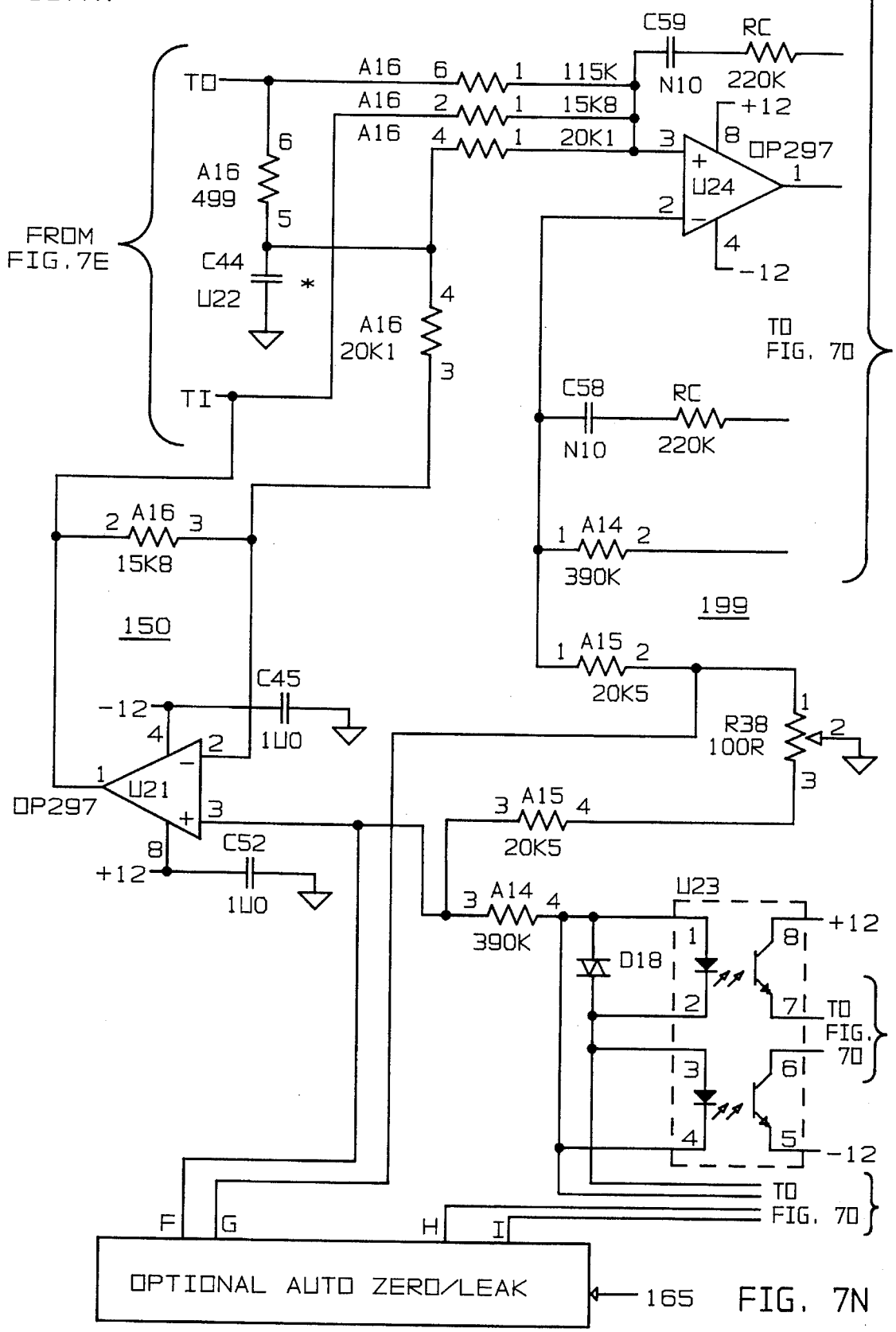

METALLIC CHANNEL UNIT NETWORK

CROSS-REFERENCE TO RELATED APPLICATION

The present invention is a continuation-in-part of Ser. No. 08/035,090 filed on Mar. 22, 1993, now U.S. Pat. No. 5,457,743, which is in turn a continuation-in-part application based on prior parent application Ser. No. 07/577,284 filed on Sep. 4, 1990, and entitled "Metallic Channel Unit Network." This Ser. No. 07/577,284 has now matured into U.S. Pat. No. 5,202,919 issued on Apr. 13, 1993.

BACKGROUND OF THE INVENTION

1. Field of the Invention

This invention relates generally to communication systems and more particularly, it relates to metallic channel unit network for interconnecting a two-wire transmission path to a four-wire transmission path. In particular, the present invention is directed to a metallic channel unit network which is used in direct current (DC), low frequency, and voice frequency applications for interfacing between a channel bank multiplexer having a four-wire circuit and a customer station having a two-wire circuit.

2. Description of the Prior Art

As is generally well known, burglar and fire alarm companies have leased or rented two-wire transmission lines from telephone companies so as to communicate alarm signals from their alarm-detection equipment located at a customer's premise to alarm-monitoring equipment located in their remote monitoring office. Further, test signals may be sent from the alarm-monitoring equipment over the transmission lines to the alarm-detection equipment so as to check for routine maintenance or even troubleshooting. These two-wire transmission lines are generally a part of the same wire pairs in a large multi-conductor metallic cable furnished by the telephone companies over the past many years. Recently, the telephone companies have been pulling out these metallic cables and replacing them with a fibre optics transmission medium suitable for a digital carrier system so as to realize multifold orders of magnitude more circuits over a single cable, thereby reducing costs.

Unfortunately, the alarm signals generated by the burglar and fire alarm companies cannot be conveniently converted over to the digital carrier system. This is due to the fact that there are different alarm-signalling techniques and each would require a specially-designed channel unit in order to be compatible with the digital carrier system. While the telephone companies could design special equipment for use with each of the different alarm techniques, this is generally undesirable since it would be quite complex for administration as well as being relative high in cost.

In U.S. Pat. No. 4,852,160 to Frederick J. Kiko et al. issued on Jul. 25, 1989, there is disclosed a channel unit interface circuit for interconnecting a two-wire, bidirectional signal transmitting means and a four-wire transmitting means in a communication system which is suitable for use with substantially all of the different alarm-signalling techniques utilized by the various alarm companies for connecting their equipment to a channel bank coupled to the four-wire means. The interface circuit of the '160 patent simulates a transmission line or cable over a digital carrier system in the frequency range of DC to 3.5 KHz with an amplitude variation between +110 to −200 VDC. However, this patented interface circuit suffers from the disadvantages of having a large signalling capacitance and thus a slow speed of operation.

Accordingly, it would therefore be desirable to provide a metallic channel unit network for interconnecting a two-wire transmission path over a four-wire transmission path, with a relatively low signalling capacitance, a faster speed of operation, low power dissipation, and low power consumption. The present invention represents a significant improvement over the aforementioned U.S. Pat. No. 4,852,160, which is hereby incorporated by reference.

SUMMARY OF THE INVENTION

Accordingly, it is a general object of the present invention to provide a metallic channel unit network for interconnecting a two-wire transmission path to a four-wire digital transmission path which is compatible with substantially all of the different alarm techniques utilized in signalling alarm conditions.

It is an object of the present invention to provide a metallic channel unit network which produces an apparent metallic cable pair in the frequency range of DC to 3.5 KHz with an amplitude between +200 to −200 VDC.

It is another object of the present invention to provide a metallic channel unit network which includes tip and ring switching drivers each having a low output impedance formed of a series resistance and inductance so as to effect a low signalling capacitance.

It is still another object of the present invention to provide a metallic channel unit network which includes autozero and autogain means interconnected between D/A signal processing means and A/D signal processing means for automatically correcting errors occurring in the D/A conversion process of the D/A processing means.

It is yet still another object of the present invention to provide a metallic channel unit network for interconnecting a two-wire transmission path to a four-wire transmission path which has a relatively low signalling capacitance, a faster speed of operation, low power dissipation and low power consumption.

In accordance with these aims and objectives, the present invention is concerned with the provision of a metallic channel unit network for interconnecting a two-wire, bidirectional signal transmitting means and a four-wire signal transmitting and receiving means in a digital carrier system. The metallic channel unit network includes a two-wire port having tip and ring terminals which are adapted for connection to the two-wire, bidirectional signal transmitting means. There is provided a signal receive-in port which is adapted for connection to a first signal transmission path of the four-wire means for receiving incoming encoded DC to 300 Hz (DC band) frequency signals and 300 Hz to 3.5 KHz (voice band) frequency signals. A signal transmit port is adapted for connection to a second signal transmission path of the four-wire means for supplying outgoing encoded "DC band" frequency signals and "voice band" frequency signals thereto. First circuit means formed of a voice compression means and CODEC means coupled to the four-wire means for supplying the incoming tip and ring terminal "voice band" frequency signals of the four-wire means at a first node connected to the CODEC means. Second circuit means formed of D/A signal processing means and A/D signal processing means are coupled to the four-wire means for supplying the incoming tip and ring terminal "DC band" frequency signals of four-wire means at second and third nodes connected to the D/A signal processing means.

A voice hybrid driver is responsive to the incoming tip and ring terminal "voice band" frequency signals of the four-wire means at the first node from the CODEC means for applying to the respective tip and ring terminals corresponding outgoing tip and ring terminal "voice band" frequency signals. The voice hybrid driver includes a line amplifier having its inputs coupled across the tip and ring terminals and is responsive to incoming differential "voice band" frequency signals from the two-wire means for generating an output voltage on its output. The CODEC means of the first circuit means is responsive to the output voltage of line amplifier at a fourth node for supplying the outgoing tip and ring terminal "voice band" frequency signals of the two-wire means for transmission over the second path of the four-wire means.

A tip switching driver is responsive to the incoming tip terminal "DC band" frequency signals of the four-wire means arriving at the second node from the D/A signal processing means for applying to the tip terminal corresponding outgoing tip terminal "DC band" frequency signals. A ring switching driver is responsive to the incoming ring terminal "DC band" frequency signals of the four-wire means arriving at the third node from the D/A signal processing means for applying to the ring terminal corresponding outgoing ring terminal "DC band" frequency signals. A tip sensing amplifier is coupled to the tip terminal for receiving incoming tip terminal "DC band" frequency signals from the two-wire means. A ring sensing amplifier is coupled to the ring terminal for receiving incoming ring terminal "DC band" frequency signals from the two-wire means.

The A/D signal processing means is coupled to the tip sensing amplifier at a fifth node for supplying the incoming tip terminal "DC band" frequency signals of the two-wire means for transmission over the second path of the four-wire means. The A/D signal processing means is coupled to the ring sensing amplifier at a sixth node for supplying the incoming ring terminal "DC band" frequency signals of the two-wire means for transmission over the second path of the four-wire means.

The foregoing applies specifically to the disclosure of the parent Ser. No. 07/577,284. A second embodiment of the present invention added by way of this continuation-in-part application is quite similar, but many of the various blocks in the embodiment of FIG. 2 have been either eliminated and/or replaced in the second embodiment of FIGS. 6A and 6B. Further, detailed schematic circuit diagrams for use in the blocks of the second embodiment of the present invention are shown in FIGS. 7A through 7Q, 8 and 11A–11C. As a result, this added embodiment represents significant improvements over the embodiment of FIG. 2 to produce an effective and efficient communication system for creating a precision bidirectional simulated two-wire cable pair over a transmission medium which can be utilized by telephone companies for interfacing equipment located at a first location with equipment located at a second location.

A third embodiment of the present invention, which is being added by way of this second continuation-in-part application, is quite similar to the second embodiment of FIGS. 6A and 6B. In this third embodiment of FIG. 12, there has now been further added a first bandpass filter circuit connected to the negative inductor circuit, a negative shunt capacitor circuit, a second bandpass filter connected to the negative capacitor circuit, and a 200 Hz longitudinal impedance circuit connected to the tip (ring) switch mode driver in the tip driver portion 167a and the ring driver portion 167b of FIGS. 6A and 6B. As a consequence, this added third embodiment represents further enhancements over the embodiment of FIGS. 6A ad 6B so as to extend the operating range of the metallic channel unit for generating a precision bidirectional simulated two-wire cable pair over a transmission medium.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 3 is an approximate equivalent circuit of the effective DC impedance of a cable pair interconnected between the metallic channel unit networks 20, 20a of the present invention;

FIGS. 4A through 4H, when connected together, is a detailed schematic circuit diagram of the metallic channel unit network constructed in accordance with the principles of the present invention; and FIGS. 5(a) through 5(e) show waveforms useful in understanding the operation of the tip switching driver 46 illustrated in FIGS. 4F–4H.

DESCRIPTION OF THE PREFERRED EMBODIMENTS

Figure 1:
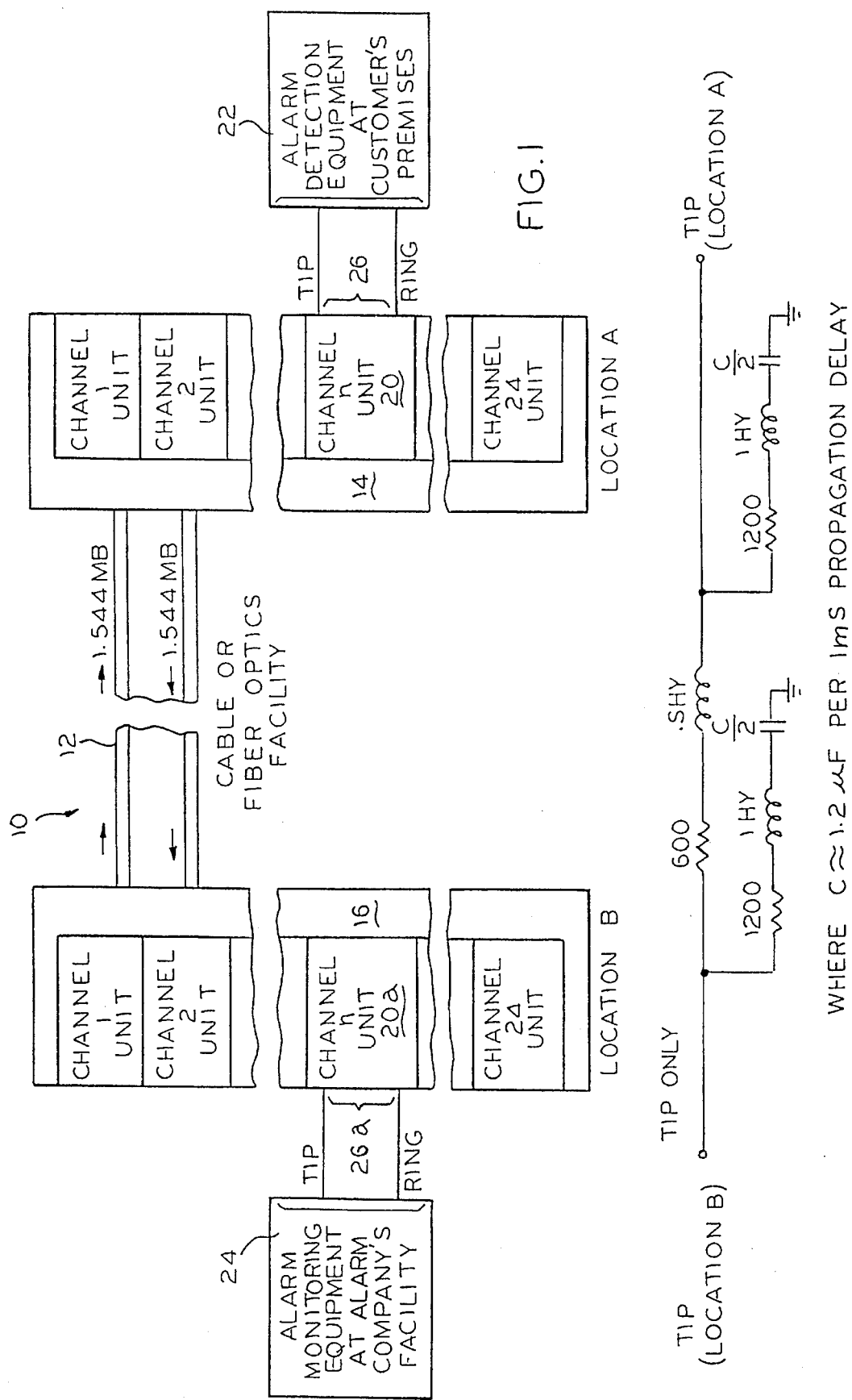
FIG. 1 is a general block diagram of a communication system which utilizes metallic channel unit networks constructed in accordance with the principles of the present invention.

Referring now in detail to the drawings, there is shown in FIG. 1 a general block diagram of a communication system 10 which incorporates metallic channel unit networks constructed in accordance with the principles of the present invention. The communication system 10 includes transmission lines 12 which are interconnected between a first channel bank multiplexer 14 disposed at a first central office or location A and a second channel bank multiplexer 16 disposed at a second central office or location B. The transmission lines 12 are typically in the form of a cable or fibre optics transmission medium suitable for a digital carrier system. Each of the channel bank multiplexers 14 and 16 may typically accommodate up to twenty-four metallic channel unit networks. The metallic channel unit network 20 refers to a metallic channel unit network of the present invention in the channel bank 14 and is connected between the channel bank 14 and the alarm-detection equipment 22 located at a customer's premise. The alarm-detection equipment 22 generates signals indicative of alarm conditions which are to be monitored by an alarm company. The metallic channel unit network 20a refers to a metallic channel unit network of the present invention in the channel bank multiplexer 16 and is connected between the channel bank multiplexer 16 and the alarm-monitoring equipment 24 in a monitoring facility of the alarm company. Since the metallic channel unit networks 20 and 20a are identical in construction, it will be only necessary to describe the components and operation of one of them.

Figure 2:
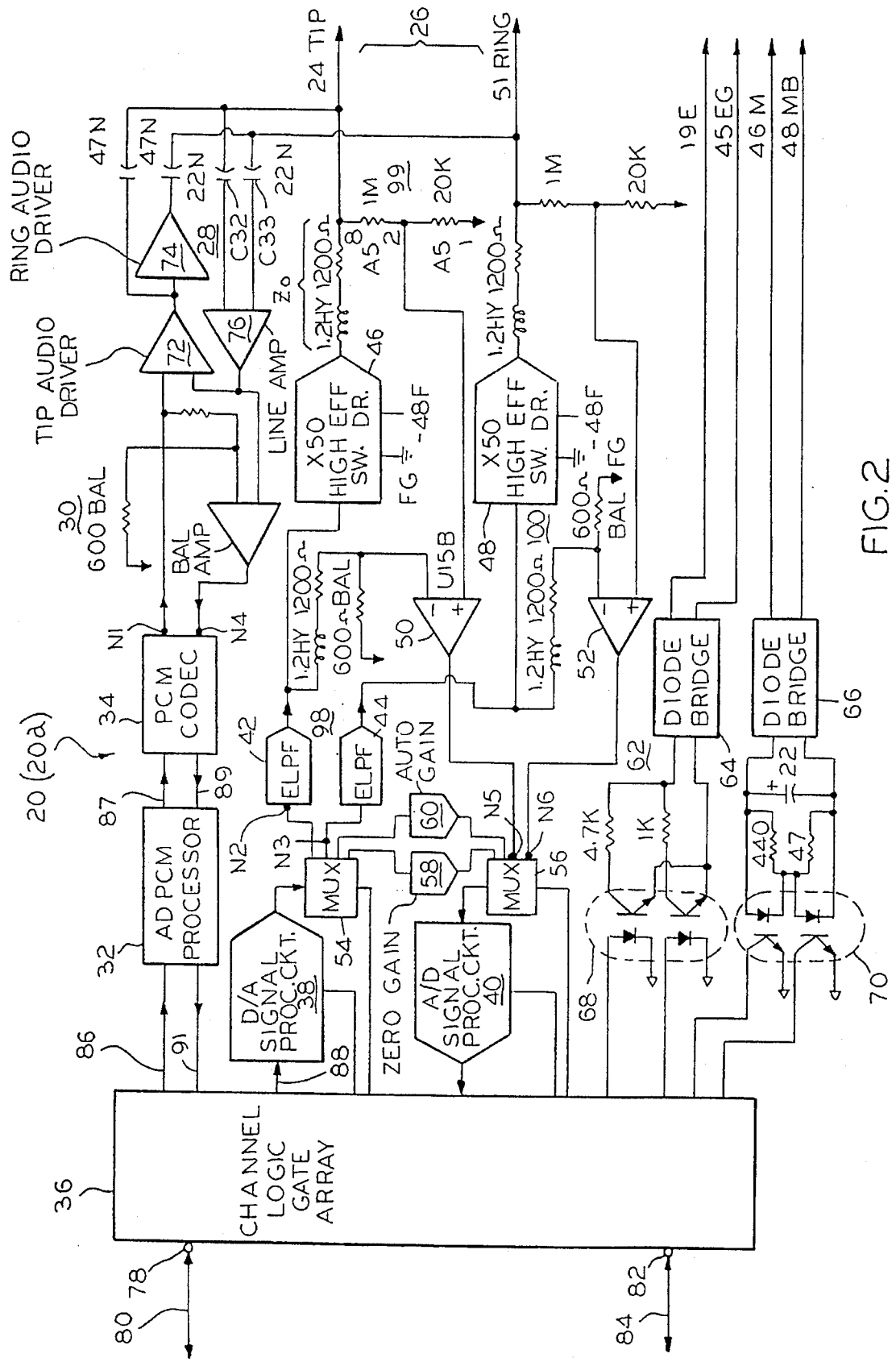
FIG. 2 is a simplified block diagram of a metallic channel unit of the present invention.

There is illustrated in FIG. 2 a simplified block diagram of the metallic channel unit network 20 or 20a of FIG. 1 which is connected at each end of the cable 12 via the respective channel bank multiplexers 14 and 16. The metallic channel unit network 20 has a bidirectional port 26 formed by a tip terminal and a ring terminal. The ring and tip terminals of the metallic channel unit network 20 are connected to the alarm-detection equipment 22, and the ring and tip terminals at the bidirectional port 26a of the metallic channel unit network 20a are connected to the alarm-monitoring equipment 24.

The metallic channel unit network 20 at location A (FIG. 2) includes a voice hybrid driver 28, with a reference/balance circuit 30, an ADPCM (an acronym for adaptive delta pulse code modulation) processor 32, a voice PCM/CODEC 34 (coder/decoder), a channel logic gate array 36, a D/A signal processing circuit 38, an A/D signal processing circuit 40, a tip filter network 42, a ring filter network 44, a X50 high efficiency tip switching driver 46, and a X50 high efficiency ring switching driver 48. A voltage divider 99 is connected between the tip terminal and a ground potential to provide a 50-to-1 attenuation/gain ratio for scaling down the ±200 tip terminal voltage to be compatible with the A/D and D/A signal processing circuits. Further, the metallic channel unit network 20 includes a tip sense amplifier 50, a ring sense amplifier 52, a first multiplexer 54 associated with the D/A processing circuit 38, a second multiplexer 56 associated with the A/D processing circuit 40, an autozero circuit 58, and an autogain loop circuit 60. Optionally, the metallic channel unit network may further include a sleeve lead control circuit 62 for sensing a low impedance or high impedance source. The control circuit 62 is comprised of a pair of diode bridges 64, 66 and a pair of opto-couplers 68, 70 which are used to send sensed information to the channel logic gate array 36. The voice hybrid driver 28 is formed of a tip audio driver 72, a ring audio driver 74, and a line amplifier driver 76. For the purpose of creating an apparent metallic pair connection over the digital carrier system between the tip and ring terminals at location A and the tip and ring terminals at location B, the metallic channel unit 20 separates the frequency range into two bands consisting of: (1) a DC band or channel having a frequency range of DC to approximately 300 Hz, and (2) a voice band or channel having a frequency range between 300 to 3.5 KHz.

Since the circuit design of the metallic channel unit network 20a is the same as that of the metallic channel unit network 20, like reference characters have been applied to designate like components or parts except the components of the metallic channel unit network 20a have been suffixed by a letter "a" to distinguish them from the reference numerals used to identify the components of the metallic channel unit network 20.

For the "voice band or channel" operation, incoming differential signals (such as those originating at the alarm-detection equipment connected to location A) arriving at the bidirectional port 26 are converted by the line amplifier driver 76 of the voice hybrid driver 28 to unbalanced or single-ended signals for transmission to the PCM/CODEC 34. The CODEC sends this "voice band" information over to the channel bank multiplexer 14 via the ADPCM processor 32 and the channel logic gate array 36. This "voice band" information is then received at the CODEC 34a via the cable 12, the channel bank multiplexer 16, the channel logic gate array 36a at location B, and the ADPCM processor 32a. Finally, the tip audio driver 72a and the ring audio driver 74a are used to convert the unbalanced signals back to balanced (differential) signals for transmission out the tip and ring terminals (bidirectional port 26a) which are connected to the alarm-monitoring equipment at location B.

In the "DC band or channel" operation, incoming "DC band" frequency signals (those originating at the alarm-detection equipment connected to location A) arriving at the bidirectional port 26 are blocked by the capacitors C32 and C33 and are thus not converted by the line amplifier driver 76, but are transmitted separately via the tip and ring sense amplifiers 50, 52, A/D signal processing circuit 40, and the gate array 36. This "DC band" information is received at the D/A signal processing circuit 38a via the cable 12, the channel bank multiplexer 16, and the gate array 36a. The tip and ring switching drivers 46a and 48a are used to send this "DC band" information from the D/A processing circuit 38a to the bidirectional port 26a which are connected to the alarm-monitoring equipment at location B.

The "DC band" input current signal at the tip terminal is initially determined by the input impedance of 1200 ohms+ 1.2 Hy. This input current signal applies an input voltage at location A which is also sent via the carrier facility to the identical metallic channel unit network at location B. In the case where location B is open circuited, the signal will be reflected and sent back to location A and will result in the input impedance at location A of 1200 ohms+1.2 Hy being made to seemingly disappear and appear as an apparent open circuit, except for a signalling capacitance to ground through the 1200 ohms+1 Hy impedance. This capacitance defining the signalling capacitance is desired to be low and is controlled by the propagation delay and processing delay of transmitting signals from locations A and B. An approximate equivalent circuit for the tip terminal only is illustrated in FIG. 3. It will be noted that a similar equivalent circuit exists between the ring terminals at locations A and B.

Figure 4D:
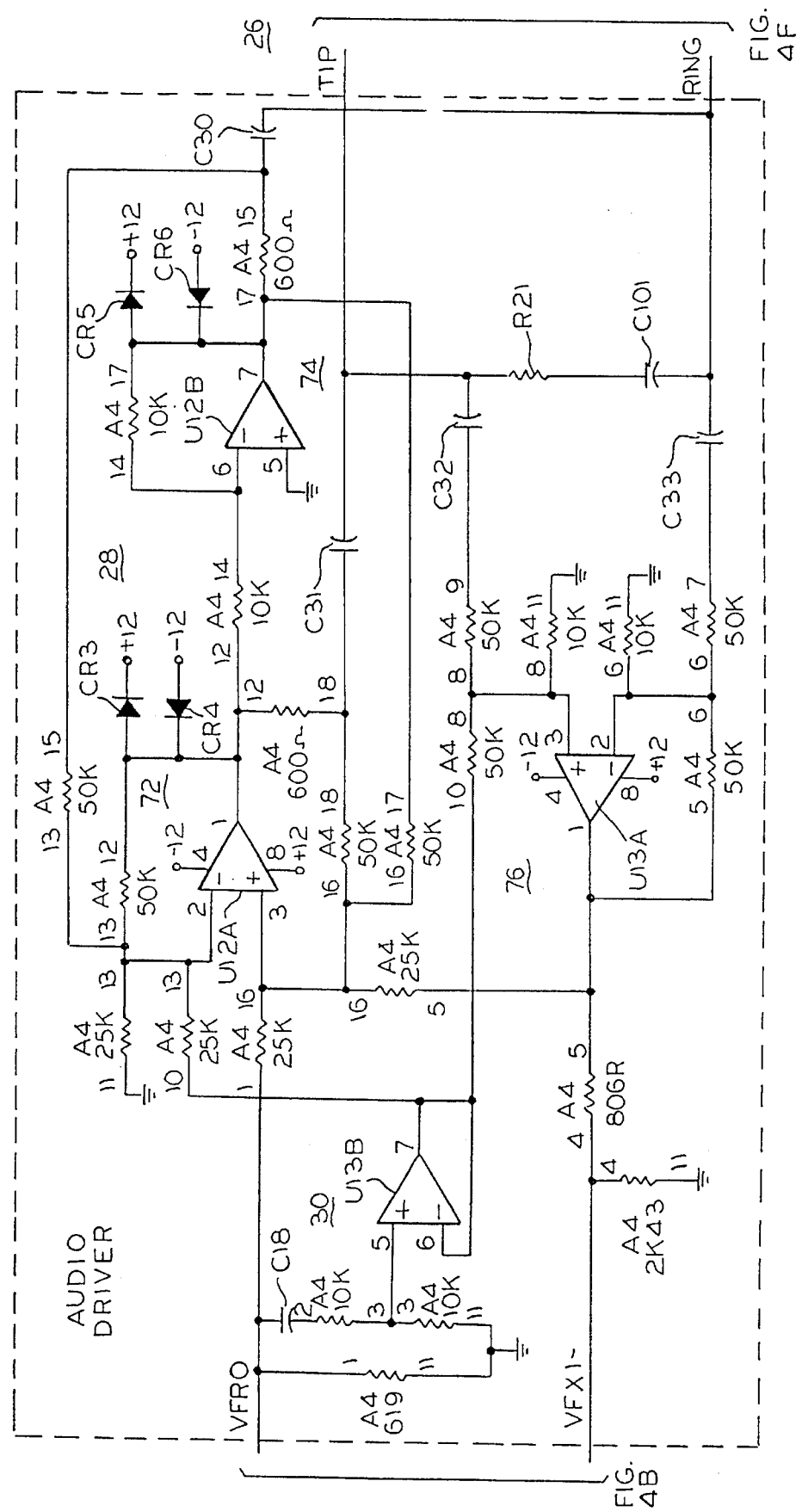

Referring now to FIGS. 4A–4H, when connected together, there is shown a schematic circuit diagram of the metallic channel unit network 20 of the present invention. In particular, FIGS. 4A–4E illustrates detailed circuitry for use in the various blocks 28, 30, 38–44, and 54–60 of FIG. 2. FIGS. 4F, 4G and 4H illustrate detailed circuitry for use in the blocks 46 and 50 of FIG. 2.

The audio driver 72 (FIG. 4D) is formed of an operational amplifier U12A which includes an input resistor (25K) A4/1-16 (this is used hereinafter to refer to pins 1 and 16 of the resistor array A4), a feedback resistor A4/13-12 (50K), and an output resistor A4/12-18 (600 ohms). The operational amplifier U12A receives the incoming "voice band" frequency signals from pin 3 of the CODEC U3 via the input resistor and drives the tip terminal through the output resistor. The operational amplifier U12A functions as a controlled output current amplifier which provides an output current from its input voltage on pin 2 to the tip terminal.

Similarly, the ring audio driver 74 is formed of an operational amplifier U12B which includes an input resistor A4/12-14 (10K), a feedback resistor A4/14-17 (10K), and an output resistor A4/17-15 (600 ohms). The operational amplifier U12B functions as an inverting amplifier for inverting the signals on the output of the operational amplifier U12A via its input resistor and drives the ring terminal through its output resistor.

The line amplifier driver 76 includes an operational amplifier U13A which is used to receive at its inputs the incoming differential "voice band" frequency signals applied across the tip and ring terminals. The non-inverting input of the amplifier U13A is connected via a series connection of the resistor A4/8-9 and the capacitor C32 to the tip terminal. The inverting input of the amplifier U13A is connected via a series connection of the resistor A4/6-7 and the capacitor C33 to the ring terminal. The capacitors C32 and C33 are used to block the "DC band" frequency signals and function 10 with the respective series resistors (A4/8-9 and A4/6-7), output resistor A4/5-16 and amplifiers U12A, U12B in generating an AC input source impedance of 600 ohms+approximately 1 uf across the tip and ring terminals. The differential signals applied across the tip and ring terminals are normally at a 0 dB TLP (test level point) level, and the amplifier U13A has a gain of 1. The output (pin 1) of the amplifier U13A is connected to the CODEC U3 via a resistor divider formed by resistors A4/45 and A4/4-11. For the values shown, there is provided an attenuation of 2.5 dB. Further, these same resistors also form a source impedance of 600 ohms which provides an additional attenuation of 6 dB when loaded by the input resistor R16 coupled to the CODEC U3. Thus, the level of the signal at pin 4 of the resistor array A4 is equal to the standard test level of (−2.5 dB)+(−6 dB) or −8.5 dB TLP. The input resistor R16 (FIG. 4B) and the feedback resistor R15 are operatively connected to an internal operational amplifier in the CODEC U3 so as to provide a 12.5 dB gain. As a result, the analog input of the CODEC U3 receives a 4 dB TLP level (−8.5+12.5) which is required by the CODEC.

Referring now to FIGS. 2 and 4A–4E, there is shown a signal receive port 78 which is connectible via line 80 to a first transmission path of the channel bank multiplexer 14 (four-wire circuit) for receiving both encoded incoming "DC band" frequency signals and incoming "voice band" frequency signals. A transmit-out port 82 is connected via line 84 to a second signal transmission path of the channel bank multiplexer 14 for supplying both outgoing tip and ring terminals "DC band" frequency signals and outgoing "voice band" frequency signals. The incoming signals at the receive port 78 are separated by the channel logic gate array 36 into incoming "voice band" frequencies which are applied to the ADPCM processor 32 via line 86 and incoming tip and ring terminals "DC band" frequency signals which are applied to the D/A signal processing circuit 38 via line 88. The incoming "voice band" frequency signals appear at a first node N1 connected to the CODEC 34 via the line 87 of the processor 32 and are send to the tip and ring terminals via the voice hybrid driver 28 as previously described. With respect to the incoming tip and ring terminals "DC band" frequency signals, the processing circuit 38 causes the incoming tip terminal "DC band" signals to appear at a second node N2 and the incoming ring terminal "DC band" signals to appear at a third node N3. The signals at the nodes N2 and N3 at the output of the first multiplexer 54 are sent separately to the tip and ring terminals via the respective high efficiency switching drivers 46 and 48.

With respect to the incoming differential "voice band" frequency signals applied to the bidirectional port 26, it will be recalled that they are converted to single-ended outgoing "voice band" frequency signals by the line amplifier driver 76 of the voice hybrid driver 28 and are send to the CODEC 34 at a node N4. These outgoing "voice band" frequency signals are then sent from the CODEC 34 to the gate array 36 via the line 89, the ADPCH processor 32, and the line 91.

It will be noted that in order to cancel the signal at the input of the line driver U13A (FIG. 4D) due to signals arriving at the node N1 from the receive path so that they are prevented from being returned to the transmit path via the node N4, there is needed the reference/balance circuit 30 which has a source resistor A4/2-3 (10K representing 600 ohms) and a signal equal in magnitude to ½ of the signal from the receive path but opposite in phase when terminated with a termination resistor A4/3-11 (10K representing 600 ohms). The line amplifier U13A is connected so that the voltage developed across the resistor A4/3-11 will cancel the line voltage originating from the four-wire circuit and sensed through the capacitors C32 and C33. However, this creates another error path via the output of the amplifier U13B through the input resistor A4/10-8 (50K) and the feedback resistor A4/5-16 to the non-inverting input of the tip audio driver U12A. This error is canceled by connecting the output of the error canceling amplifier U13B through an input resistor A4/10-13 (25K) to the inverting input of the tip audio driver U12A.

The channel logic gate array 36 (U1) provides the proper address decoding for reception and transmission on the respective lines 80 and 84. In particular, the gate array 36 (U1) interfaces with the ADPCM voice processor 32 via the lines 86, 91 to accept and provide 4 bit voice information and interfaces with the A/D signal processing circuit 40 and the D/A signal processing circuit 38 to accept and provide encoded DC information. Further, the gate array send and receive (1) DC polarity and (2) framing (synchronization or signalling) information. A unique framing scheme is generated and detected by the gate array for use in synchronization and data retrieval.

This unique framing (synchronization/signalling) scheme uses a modulo 8 counter whose various states determine the information to be transmitted (see Table 1 below).

TABLE 1

| COUNTER | | | |
|---|---|---|---|
| MSB | MB | LSB | TRANSMITTED BIT* |
| 0 | 0 | 0 | 0 (Sync) |
| 0 | 0 | 1 | "A" (Signalling) |
| 0 | 1 | 0 | 0 (Sync) |
| 0 | 1 | 1 | "B" (Signalling) |
| 1 | 0 | 0 | 1 (Sync) |
| 1 | 0 | 1 | "A" (Signalling) |
| 1 | 1 | 0 | 1 (Sync) |
| 1 | 1 | 1 | "B" (Signalling) |

(*Any of these bits are referred to as frame bits.)

The counter is updated every 6th frame, so a sync bit is sent every 12th frame. A complete sync pattern is "0" "0" "1" "1" as shown in Table 1. The signalling bits are not used by every embodiment.

All of the voice, framing, polarity and DC information are configured into one of three transmission formats. The gate array also controls the autozero circuitry 58 and the autogain circuitry 60 so as to perform automatically the autozero and autogain functions in-between send and receive samples for correcting errors occurring in the A/D and D/A converter circuitry, as will be later described.

In the receive mode, the gate array U1 is addressed when the three address lines (RSPO, RSQ, RWD) on pins 11, 12, 10 are high simultaneously. When the gate array is addressed, it will generate a frame synchronizing pulse FSY for the ADPCM voice processor 42 and the CODEC U3. In the transmit mode, there are also three address lines (TSPO, TSQ, TWD) on pins 4, 5, 3. When these address lines are made high simultaneously, the gate array is addressed to generate a frame synchronizing pulse FSX to the voice processor U2 and the CODEC U3 so as to cause the voice data to be delivered to the line 84 via the signal transmit-out port 82.

For each "DC band" transmission sample, there is contained a polarity bit, 11 bits of data information representing the amplitude of the DC signal, and for each "voice band" transmission sample, there is 4 bits of voice information. In one of the three transmission formats, this is achieved by utilizing three frames each having 8 bits of information. Each new complete "DC band" polarity/data sample (every three frames) alternates between the tip and ring terminal information. Thus, the voice, polarity and data information are arranged over three frames wherein (1) the first frame contains 3 bits of voice, a framing bit, a polarity bit, 3 bits of data, (2) the second frame containing 4 bits of voice and 4 bits of data, and (3) the third frame containing 4 bits of voice and 4 bits of data. The framing bit is sent in place of the 4th voice bit every 6th frame. This framing bit will alternate between a sync bit and signalling bit. Thus, a sync bit is sent every 12th frame, and a signalling bit could also be sent every 12th frame.

In a second one of the three transmission formats, 16 consecutive bits are used to send information in one frame wherein the 4 voice bits are sent first (every 6th frame will have only 3 voice bits and one framing bit), the polarity bit is sent next, and 11 bits of data information is sent last. The polarity and data will alternate each frame between the tip and ring terminal information. The third one of the transmission formats is quite similar to the second one and is arranged in exactly the same manner. The only difference is that the circuitry is designed to send the last 8 bits of data in response to the bank address lines RSPO, RSQ and RWD, which causes these bits to be sent a little later on in the frame rather than being sent immediately after the first 8 bits. The embodiment utilizing this third transmission format uses A and B signalling bits to control the sleeve lead circuitry for one of the test line applications.

However, it will be noted that each of the transmission formats utilize 12 bits for the "DC band" data information (one polarity bit and 11 bits for the magnitude). This is completely different from the '160 patent which uses 7 bits for voice information and only 1 bit for data information. As a result, the present invention allows the "DC band" frequency signals to be transmitted at a faster rate thereby reducing signalling capacitance.

The CODEC 34 (U3) is the type similar to TP3054 which is commercially available from National Semiconductor Corp. The analog incoming voice band frequency signals applied on its pin 15 is encoded into an 8-bit PCM format and sent out as a signal DX at its pin 11 to the ADPCM voice processor U2. The voice processor compresses the 8 bit signals into 4 bit signals for transmission over the second signal path via the gate array 36 (U1). The ADPCM is the type similar to DS2167 which is sold by Dallas Scientific Corp. The gate array U1 also generates a frame synchronizing pulse FSX on pin 27 for use by the voice processor and CODEC which enables a transmit 1.544 MHz clock signal TCLK received on pin 14 of the processor and pins 9, 10 of the CODEC. This clock signal causes the signal DX in PCM format to be shifted out on pin 11 of the CODEC, passing through the voice processor via pin 16, and to pin 47 of the gate array.

Digital incoming voice frequency signals from the gate array U1 are applied to pin 23 of the voice processor and received on pin 6 of the CODEC as pulsed signals DR. The gate array U1 also sends the frame synchronizing pulses FSR to pin 5 of the CODEC which enables a receive 1.544 MHz clock signal RCLK applies to its pins 7 and 8. The RCLK signal causes the pulsed signals DR to be shifted into the CODEC U3. The pulse signals DR are converted to an analog signal via an internal filter and power amplifier and is driven out on pin 3 (node N1) as a signal VFRO.

As will be recalled, the capacitors C32 and C33 block dc signals. Therefore, the DC to 300 Hz or "DC band" signals applied to the tip and ring terminals will not be transmitted by the line amplifier U13A in the voice hybrid driver 28, but will be transmitted separately via the tip sense amplifier 50 and the ring sense amplifier 52. Since the DC to 300 Hz operation for the tip and ring sense amplifiers 50, 52 is identical, it will be sufficient to discuss only the operation of the tip sense amplifier 50. The incoming tip "DC band" frequency signals representative of alarm signals from the alarm-detection equipment at location A are received at the tip terminal of the bidirectional port 26. These "DC band" signals are fed to the non-inverting input of the tip sense amplifier U15B via a voltage divider formed by resistors A5/2-8, A5/2-7 and A5/2-1 (FIG. 4F) the output of the sense amplifier U15B is connected to pin 1 of the A/D multiplexer 56 (U10A) which selects one of four input signals: (1) tip, (2) ring, (3) autozero, and (4) autogain. It will be noted that the corresponding incoming ring terminal "DC band" frequency signals are received on pin 5 of the multiplexer U10A.

The analog-to-digital (A/D) signal processing circuit 40 is connected to receive the tip terminal "DC band" frequency signals and the ring terminal "DC band" frequency signals appearing on the respective pins 1 and 5 of the multiplexer U10A. The pins 1 and 5 of the multiplexer U10A in FIG. 4C correspond to the nodes N5 and N6, respectively, of FIG. 2. Multiplexer U10A has control logic inputs at pins 10 and 9, which are connected to respective pins 42 and 28 of the gate array 36. Each of the logic signals from the pins 42 and 28 can be at a logic "0" or a logic "1". The truth table for these logic signals is shown below the multiplexer U10A. For example, the multiplexer U10A is shown in the position when both the pins 10 and 9 are receiving the logic "0". The logic signal on the pin 9 may be switched between logic "0" and logic "1" so that the tip and ring "DC band" frequency signals are sampled alternately at a rate of 1.33 KHz (first transmission format) or 4 KHz (second or third transmission format). A composite tip/ring sampled signal appears at the output on pin 3 of the multiplexer U10A and is fed to an A/D polarity circuit 90 which is formed of operational amplifiers U8B, U8A and switches U11C, U10B.

The output of the multiplexer U10A via pin 3 is connected to the non-inverting input of the operational amplifier U8B which detects the polarity of the composite signal. All values of a negative polarity in the composite signal are inverted by the operational amplifier U8A whose inputs are controlled by the switch U11C. If a negative signal appears at the output of the multiplexer U10A, the output of the operational amplifier U8B will be at a logic "0". This logic "0" defining a transmit polarity signal XPOL is sent to pin 35 of the gate array 36, indicating that a signal having a negative polarity has been transmitted. Further, the control input at pin 11 of the switch U11C will be at the logic "0" causing the switch to maintain the position as shown. As a result, the polarity detection amplifier U8A will be connected in the configuration of an inverting amplifier having a gain of 1. Thus, the voltage at the output of the operational amplifier U8A via pin 1 will be positive. On the other hand, if a positive signal appears at the output of the multiplexer U10A, the output of the operational amplifier U8B will be at a logic "1". This transmit polarity signal being at the logic "1" will again be sent to the gate array and to the control input (pin 11) of the switch U11C. Consequently, the switch U11C will move to the other position making a connection between its pins 13 and 14. This, in turn, connects the amplifier U8A in the configuration of a non-inverting amplifier with a unity gain. Accordingly, the voltage at the output of the amplifier U8A will again be positive.

The output of the operational amplifier U8A is fed directly to the input (pin 2) of an A/D converter US. The A/D converter U5 is the type similar to MAX170 which is commercially available from Maxim Integrated Products. The output digital signal from the output (pin 5) of the A/D converter U5 is fed to pin 26 of the gate array 36. The encoded signal from the gate array 36 (FIG. 4A) at the sending end (location A) is transmitted on pin 6 (TDATA) via the control of pins 3, 4 and 5 over the transmission line 12 to the gate array 36a (location B) at the receiving end. The gate array 36 receives the encoded transmitted signals from the gate array 36a on pin 7 (RNPCM) under the control of the pins 10, 11 and 12.

The digital-to-analog (D/A) signal processing circuit 38 is coupled to receive the digitally encoded signals from the channel logic gate array 36. For convenience of discussion, it will be assumed that the receiving end (location B) is sending back the same signals to the sending end (location A). To this end, the encoded signals from the output of the gate array 36 via pin 39 is delivered to the input (pin 6) of a D/A converter U4 (FIG. 4B). The D/A converter U4 is the type similar to MAX543 which is commercially available from Maxim Integrated Products. The output analog signal from the output (pin 3) of the D/A converter U4 is fed to the input of an operational amplifier U6A whose output on pin 1 is between 0 to +5.0 volts. The D/A converter U4 receives an input reference signal of +5.0 volts on its pin 1. This +5.0 volts is obtained via a voltage divider formed by resistors R10 and R9 (FIG. 4C). A Schottky diode CR40 is also connected to the output (pin 3) of the D/A converter U4 for clamping it and preventing it from going negative, thereby avoiding latch-up. The resistor R7 and the internal resistance of the D/A converter U4 sets the gain of the operational amplifier U6A. The capacitor C14 functions as a compensating capacitor so as to provide a maximum rise time without a large overshoot.

The original signal polarity is received by the gate array 36 and is available on pin 34 as the signal RPOL which is sent to the control input (pin 9) of the switch U11B. The switch U11B is used to invert the original signal polarity so that the voltage received by the switching drivers 48, 50 will be the same polarity with respect to the tip (ring) sending voltage signal. If the original polarity was positive, the polarity signal RPOL will be high causing the operational amplifier U6B to be configured as a non-inverting amplifier as shown with a unity gain. If the original polarity was negative, the polarity signal RPOL will be low so as to cause the operational amplifier U6B to be switched to an inverting configuration with a unity gain.

Figure 4E:
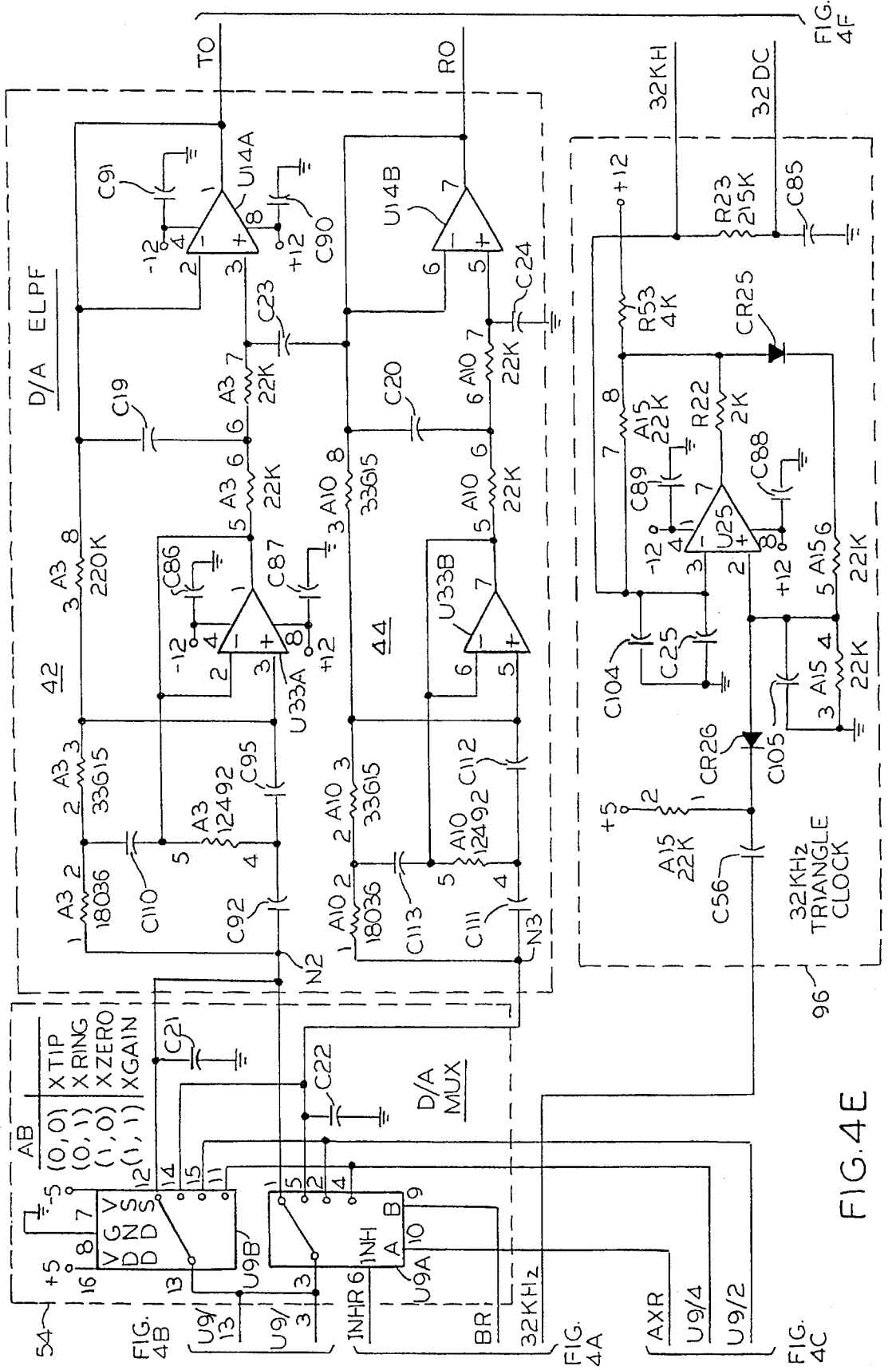

The output of the D/A processing circuit 38 is defined by the output (pin 7) of the operational amplifier U6B which is delivered to the inputs (pins 3 and 13) of the dual multiplexer U9A, U9B (FIG. 4E). As can be seen, the control logic inputs (pins 10 and 9), which are connected to respective pins 42 and 41 of the gate array U1. Each of the logic signals from the pins 42 and 41 can be at a logic "0" or a logic "1". The truth table for these logic signals is shown above the multiplexer U9B. For example, the dual multiplexer U9A and U9B is shown in the position when both the pins 10 and 9 are receiving the logic "0". The logic signal on the pin 9 may be switched at the sampling rate, i.e., 1.33 KHz (first transmission format) or 4 KHz (second or third transmission format), between the logic "0" and the logic "1" so that the voltage at the output of the amplifier U6B will charge up alternately the capacitors C21 and C22. The capacitors C21 and C22 sample and hold the values of the output voltages from the amplifier U6B. Further, the dual multiplexer U9A, U9B switch the output of the amplifier U6B to one of four outputs: (1) tip, (2) ring, (3) autozero, and (4) autogain. The resistor R54 connected to the output (pin 6) of the amplifier U6B is provided so as to limit the current to the input of the dual multiplexer and thus prevent a latch-up condition.

In order to accurately encode and decode the transmitted tip (ring) sending voltage signals, there is provided the autozero circuit 58 (FIG. 4C) which is comprised of operational amplifier U7B, resistors R18 and A2/5-6, and capacitor C17 (FIG. 4C). When the multiplexer U9A is switched to the "zero" position, a digital signal from the A/D converter U5 corresponding to "zero" input voltage is looped inside the gate array U1 and sent to the operational amplifier U7B via the D/A converter U4 and resistor R18. Any error will cause the capacitor C17 to charge up, and an output voltage will be send through the resistor A2/5-6 to the input of the A/D converter U5 so as to effectively cancel the offset error. The main source of the offset error is from the A/D converter US. The multiplexer U9A is switched to the autozero or autogain state when the A/D and D/A converters are not being utilized for the tip and ring functions.

During this idle time, the autogain function is also performed by sending a known input voltage to the A/D converter U5 via pin 4 of the multiplexer U10A. The value of this input voltage is determined by the voltage divider formed by resistors R13 and R90. For the values shown, a voltage of approximately −4.77 volts is applied to the input (pin 2) of the A/D converter U5. This signal is looped around digitally via the gate array U1 and appears at the output (pin 7) of the operational amplifier U6B which couples the same to the input of the autogain amplifier U7A via the multiplexer U9A and U9B via the resistor R17. Any error will cause a current to flow so as to charge up capacitor C16, thereby creating an error signal. This error signal is sent through resistor R93 to the reference input (pin 1) of the D/A converter U4 so as to adjust the input reference voltage.

Since the digital signal transmitted and received by the gate array U1 is a 12-bit signal with the MSB (most significant bit) being a polarity bit, there are only 11 bits that can be used for digital information. For a ±5 volts analog at the input of the A/D converter U5 and at the output of the D/A converter U4, there is a maximum of 2,048 code steps or 2.44 millivolts per step. In order to obtain a finer resolution on the A/D conversion process, a squarewave of 187 Hz from pin 33 of the gate array U1 is converted by an A/D ripple injection circuit 92. The ripple injection circuit is comprised of resistors A2/1-2, A2/3-4 and capacitor C13 and is used to convert the squarewave into a triangularwave of a magnitude equal to approximately one code step. The output of the injection circuit 92 is connected to the input (pin 2) of the A/D converter U5 via the resistor A2/3-4. In order to cancel this data error due to the injection circuit 92, a D/A ripple cancellation circuit 94 is connected to the D/A signal processing circuit 38. The cancellation circuit 94 consists of resistors R96 and R5 and capacitor C12. The input of the cancellation circuit is from a 187 Hz squarewave at pin 44 of the gate array U1, and the output of the cancellation circuit is fed to the inverting input of the operational amplifier U6A via resistor R6. The ripple injection circuit causes the A/D sample to toggle between the two closest samples at a duty cycle proportional to the closest sample, thereby producing a DC value output proportionally between the code steps to give a significant increase in resolution.

The tip filter network 42 (FIG. 4E) comprised of an elliptical low pass filter 42 and the ring filter network 44 comprised of an elliptical low pass filter 44 are connected to the respective outputs of the holding capacitors C21 and C22 for the tip and ring sampled signals. In order to eliminate quantizing noise, the elliptical filters have been designed to effectively attenuate the dominant component of the sampling rate used, which is typically 1.33 KHz (first transmission format) or 4 KHz (second or third transmission format). The elliptical filter 42 includes an active elliptical filter having a notch at the sampling rate and being formed by operational amplifier U33A and its associated components, and a second order low pass filter formed by operational amplifier U14A and its associated components. The output of the tip filter network 42 is coupled to the X50 high efficiency tip switching driver 46. Similarly, the elliptical low pass filter 44 includes an active elliptical filter having a notch at the sampling rate and being formed by an operational amplifier U33B and associated components, and a second order low pass filter formed by operational amplifier U14B and its associated components. The output of the ring filter network 44 is coupled to the X50 high efficiency ring switching driver 48.

A free-running clock oscillator 96 (FIG. 4E) is comprised of comparator U25, a feedback resistor A15/7-8, and a shunt capacitor C25. The oscillator output is from pin 3 of the amplifier U25 which is a triangularwave at a frequency of 32 KHz. The voltage goes from exactly 0 volts to a positive magnitude, i.e., +4.0 volts. The precise zero crossing is achieved by the diode CR25. The oscillator 96 is synchronized to a frequency of 32 KHz generated from pin 24 of the gate array U1. This synchronization is required so as to eliminate interference with other high frequency signals so that the switching drivers 46, 48 do not generate audible low frequency signals which are not desired. The synchronizing pulses from the gate array U1 is received via a capacitor C56, resistor A15/1-2, and a diode CR26 at the non-inverting input of the operational amplifier U25. Further, the oscillator generates a 32 KHz DC component which is accomplished by resistor R23 and capacitor C85. This 32 KHz DC component is a DC voltage which is halfway between the positive triangularwave and the negative triangularwave.

Referring again to FIG. 2, there is shown a DC tip balance circuit 98 which consists of an inductor (1.2 Hys), a 1200-ohm resistor, and a 600-ohm resistor. The inductor and the 1200-ohm resistor define a source impedance (matching the source impedance of switching drivers), and the 600-ohm resistor is a termination impedance. The balance circuit 98 is used to control the signals due to the receive path (the filter network 42) that are returned to the transmit path (the multiplexer 56) via the tip switching driver 46 and the tip sense amplifier 50. The output of the switching driver 46 is connected to the tip terminal via a series output impedance $Z_0$ of 1.2 Hys+1200 ohms. A voltage divider 99 formed by a 1 Meg resistor and a 20K resistor is connected between the tip terminal and the ground potential. It will be noted that the signal from the receive path is sent to the inverting input of the sense amplifier 50, which also performs the balancing function, through the source impedance of the balance circuit 98 in order to cancel or adjust the signals applied to the non-inverting input of the tip sense/balance amplifier 50. Similarly, a DC ring balance circuit 100 is provided for operation in connection with the ring switching driver 48 and the ring sense/balance amplifier 52. A key to the overall objective of reducing the effective signalling capacitance and maintaining a 600 ohm DC connection is the 1200 ohm/600 ohm source/balance values.

Since the switching drivers 46 and 48 and their associated circuitry for the tip and ring terminals are identical, it will be sufficient to illustrate and describe only the tip switching driver 46 and its associated circuitry. In FIGS. 4F, 4G and 4H, there is shown a schematic circuit diagram in more detail of the balancing circuit 98, tip switching driver 46, and the tip sense/balance amplifier 50 as shown in FIG. 2. The buffer amplifier U32A, resistor R63, and capacitor C93 corresponding to the balancing circuit 98 of FIG. 2 provides the same results, but the rather large 1.2 Hys inductor has been eliminated, thereby reducing costs. The operational amplifier U15B corresponds to the sense/balance amplifier 50 of FIG. 2. The resistors A5/2-8, A5/2-7 and A5/2-1 are used to perform the function of the voltage divider 99. The output impedance $Z_0$ is defined by inductor L1 and resistor R45 (FIG. 4H). It will be noted that pin 2 of the resistor array A5 is connected to the non-inverting input of the operational amplifier U15B and the output of the buffer amplifier U32A is fed via input resistor A7/7-8 (60K) to the inverting input of the operational amplifier U15B. The output (pin 7) of the amplifier U15B is connected to the multiplexer U10A (FIG. 4C). This forms the balance circuit 50 and the balance amplifier 50 for the tip switching driver 46.

The tip switching driver 46 receives a −48 VDC as its main source of power and generates ±200 volts output swing for driving the tip terminal. The switching driver 46 is used to charge up the primary winding of a transformer T1 either positive via pins 4 and 5 or negative via pins 5 and 6. Then, the primary winding is switched off and the secondary winding via pins 1 and 3 is switched on so as to allow the stored energy to be transferred to a load. Since the primary and secondary windings of the transformer T1 is being switched on and off on a continuous basis, an output voltage will be developed equalling an AC ripple riding on top of a DC component when the tip terminal is loaded. The magnitude of the output voltage is dependent upon the duty cycle of pulses generated.

As can be seen from the detailed schematic diagram of FIGS. 4F through 4H, the tip switching driver 46 is comprised of a driver amplifier 102 (FIG. 4F), a drive polarity and rectifier circuit 104, power FET drivers 106 (FIG. 4G), a feed forward amplifier 108 (FIG. 4F), a driver output current ($I_o$) amplifier 110, a duty cycle clamp circuit 112, a comparator U19C (FIG. 4F), a driver flip-flop 114 (FIG. 4G), and their associated circuitry. The driver amplifier 102 (FIG. 4F) includes a conventional transconductance amplifier U17A which provides a differential input, and provides a single-ended high impedance output, a very large gain, and a compensation node A at its output pin 6. A potentiometer R55 and a resistor R56 are provided to adjust input offset voltage of the amplifier U17A. The transconductance gm of the amplifier U17A is controlled by resistor R29 connected between the output pin 5 and the ground potential. A capacitor C35 connected between the output pin 6 and the ground potential is a compensation capacitor. The capacitor C81 and the diodes CR50, CR51 form a slew rate limiter so as to limit the output voltage rise time for large signals. The driver amplifier 102 also includes a buffer formed by operational amplifier U30A having its non-inverting input connected to the output of the amplifier U17A. The output (pin 1) of the operational amplifier U30A defines the output of the driver amplifier 102.

The non-inverting input of the amplifier U17A receives the DC band frequency signals from the tip filter network 42 via input resistors A7/2-3 and A7/1-3 which are connected in parallel. As previously discussed, the output of the buffer amplifier U32A is fed to the inverting input of the sense/balance amplifier U15B via resistor A7/8-7 in order to control the incoming signals to the tip switching driver 46 that are being returned to the transmit path. However, this creates an error path through the sense/balance amplifier U15B via the resistors A7/8-7, A7/8-9 and A7/9-4 to the inverting input (pin 2) of the amplifier U17A. In order to cancel this error, an additional input resistor A7/6-4 (60K) is connected from the output of the buffer amplifier U32A to the inverting input of the transconductance amplifier U17A.

The feed forward amplifier 108 functions as a second order high pass filter and includes an operational amplifier U21A having its inputs coupled to the output of the driver amplifier 102 and its output (pin 1) coupled to the output impedance $Z_o$ via capacitor C37. The diodes CR10, CR13 serve to protect the operational amplifier U21A against damage caused by transients. The operational amplifier U21A provides a high gain (approximately 100) only at high frequencies (above 1 KHz) and serves to bypass the power FET drivers 106 at high frequencies, thereby maintaining closed loop stability. The closed loop gain of the operational amplifier U21A is about twice the gain of the transconductance amplifier U17A because of the voltage divider effect caused by the capacitor C37 being connected in series with parallel combination of capacitor C47 and C65 (FIG. 4H).

The driver output current ($I_o$) amplifier 110 includes an operational amplifier U15A which senses the voltage across the output impedance $Z_o$. The amplifier U15A receives differential inputs via input resistors A5/2-8 and A5/3-5 and has feedback resistors A5/2-7 and A5/6-3. The resistors A5/2-1 and A5/3-4 also provide for attenuating of the large longitudinal signals of up to ±200 volts from the tip terminal. The output (pin 1) of the operational amplifier U15A is connected to the non-inverting input of the driver amplifier 102 so as to increase the actual values used for the output impedance (0.1 Hys and 100 ohms) appears to be 1.2 Hys+1200 ohms. In this manner, the approximate equivalent circuit of FIG. 3 is accomplished. Since the actual values of the inductance and resistance is relatively low, the switching driver 46 will operate with less power dissipation, less power consumption and lower signalling capacitance. The potentiometer R61 is used to correct for any error caused by the longitudinal attenuation resistors A5/1-2 and A5/3-4.

The driver polarity and rectifier circuit 104 (FIG. 4F) consists of an operational amplifier U21B which also receives the signals from the output of the driver amplifier 102 via its input resistor A18/1-2. If the input signals are positive, its output (pin 7) will be negative so as to reverse bias the diode CR16. Thus, the signals at its input (pin 6) will be sent through the resistors A18/3-4 and A18/5-6 to the inverting input (pin 8) Of the comparator U19C as positive signals. On the other hand, if the input signals are negative, the output (pin 7) will be positive and the diode CR16 will be rendered conductive so as to pass this inverted or rectified (positive) signal through the resistor A18/5-6 to the pin 8 of the comparator U19C. Therefore, the signals at the inverting input of the comparator U19C defining a slow varying control signal will always be positive.

The duty cycle clamp circuit 112 includes an operational amplifier U30B having its non-inverting input connected to receive the 32 KHz DC component from the oscillator 96 (FIG. 4E) and its inverting input connected to receive also the control signal at pin 8 of the comparator U19. The output of the clamp circuit 112 is at the anode of the diode CR14 which is clamped to the 32 KHz DC component whenever the control signal on pin 6 of the operational amplifier U30B exceeds this 32 KHz DC component. The non-inverting input of the comparator U19C receives the triangular waveform having a frequency of 32 KHz and a voltage swing of approximately between 0 and +4.0 volts as generated by the oscillator 96. The waveform from the 32 KHz oscillator 96 is illustrated in FIG. 5(*a*). The slow varying control signal is illustrated in FIG. 5(*b*). Consequently, the output of the comparator U19C provides a 32 KHz squarewave whose pulse-width or duty cycle is proportional to the control signal applied to its inverting input (pin 8). The output of the comparator U19C is shown in FIG. 5(*c*). For the control signal varying between 0 and a maximum voltage of 2 volts as shown in FIG. 5(*b*), the squarewave will have a variable pulse-width or duty cycle between 0 and 50%.

The squarewave output of the comparator U19C is coupled via a capacitor C64 to the input of the driver flip-flop 114 (FIG. 4G) formed by inverter U23D and U23C. The edges of the squarewave output are converted to narrow pulses at the input of the inverter U23D via the capacitor C64 and resistor A13/1-2. The output of the driver flip-flop is pin 7 of the inverter U23C which is latched either high or low through the resistor A13/1-2 depending upon the direction of the narrow pulses.

The power FET drivers 106 includes inverters U23A, U23B, U23E, and U23F whose outputs (pins 3, 5, 11 and 13) are used to drive the respective gates of the power field-effect transistors Q5, Q7, Q3 and Q1 (FIG. 4H). The transistors Q3, Q5 and Q7 are P-channel devices, and the transistor Q1 is an N-channel device. The output of the driver flip-flop (pin 7) is coupled to the FET driver U23A-pin 2 via resistor A9/3-4 and diode CR11, to the FET driver U23B-pin 4 via resistor A9/1-2 and diode CR15, and to the FET driver U23F-pin 14 via resistor A13/5-6 and diode CR9. The negative output of the driver flip-flop U23D is also coupled to the FET driver U23E-pin 12 via resistor A13/3-4 and diode CR12.

If the polarity from the driver polarity and rectifier 104 (pin 7 of U21B) is positive, pin 2 of the FET driver U23A will be held low through the diode CR41 and the driver flip-flop 114 will charge up the input capacitance at pin 4 of U23B via the resistor A9/1-2 during positive transitions. Then, the transistor Q7 will be slowly turned on so that the −48 volt supply is applied across the primary winding of the transformer T1/4-5 (FIG. 4H). If the polarity is negative however, pin 4 of the FET driver 23B will be held low and the driver flip-flop will charge up the input capacitance at pin 2 of U23A via the resistor A9/3-4. Thus, the transistor Q5 will be turned on slowly so that the −48 volt supply is applied across the primary winding of the transformer T1/5-6. During negative transitions of U23C, the output of the driver flip-flop 114 will drive either pin 4 of U23B via the diode CR15 or pin 2 of U23A via the diode CR11 with little delay so as to quickly turn off the corresponding conducting transistor Q7 or Q5.

Simultaneously, during these negative transitions, the output of the driver flip-flop will charge down the input capacitance at pin 14 of driver U23D via the resistor A13/5-6. Then, the N-channel transistor Q1 will be slowly turned on so as to connect the secondary winding of the transformer T1/1-3 to the ground potential. Further, the inverting node B (pin 9) of the driver flip-flop 114 will charge up the input capacitance at pin 12 of driver U23E via the resistor A13/3-4. This causes the P-channel transistor Q3 to be rendered conductive. In this manner, the turning off of the power field-effect transistors coupled to the primary winding is made to occur before the turning on of the power field-effect transistors coupled to the secondary winding (or vice-versa). This serves to prevent simultaneous conductions of the transistors coupled to the primary and secondary windings, thereby avoiding stress on the devices.

Since the transistor Q1 is an N-channel device, a diode CR31 is connected to its gate electrode for providing a level shifting and a speed-up capacitor C106 so as to facilitate fast transitions. The blocking diodes CR27 and CR28 (FIG. 4H) are used to prevent conduction when both transistors Q1 and Q3 are switched off. The diode CR43 serves to protect the transistors Q1 and Q3 due to the transients occurring from the stray inductance and stray capacitance of the transformer T1. The transistors Q1 and Q3 are switched "off" when transistor Q5 or Q7 is on, and "on" when the transistors Q5 and Q7 are both off at a 32 KHz rate with the duty cycle being determined by the control signal from the output of the driver polarity and rectifier 104.

In order to provide protection for the power field-effect transistors Q1, Q3, Q5 and Q7, during start-up, shut down, or overload conditions, there is provided a current trip detector 116 (FIG. 4G) which includes comparators U19B, U19D and sensing resistors R35, R36, R39 and R40 connected to the source electrodes of the respective transistors Q3, Q1, Q5 and Q7 to detect current flow. When the current exceeds a certain predetermined limit, the outputs (pins 1 and 13) of the comparator U19B, U19D will cause the driver flip-flop 114 to be switched to the opposite state.

Due to the fast switching speeds, the secondary ripple current at pin 3 (FIG. 4H) at the secondary winding of the transformer T1 can be quite large. The filter network formed by capacitors C45, C65 and inductors L3, L5 is tuned to 32 KHz so as to trap the carrier or fundamental frequency. Thus, the voltage on the right side of the capacitor C45 has a substantially reduced ripple. Further, any high frequency switching spikes will be trapped by the output filter 118 so that the output on the right side thereof is typically less than 1 volt ripple. In addition, attenuation will also occur due to the output impedance of the inductor L1 and the resistor R45. A resistor R59 is connected between the tip terminal and the ground potential so as to control the output leakage current. An input filter 120, inductor L7 and capacitors C49, C51 are added to filter out spikes occurring to the −48 volt supply which is fused by F4.

For the control signal of FIG. 5(c) being used to switch on and off the primary and secondary windings, a transformer primary current waveform is shown in FIG. 5(d), and a transformer secondary current waveform is shown in FIG. 5(e). The magnitude of the secondary current and the output voltage is based upon the turns ratio of the primary and secondary windings and the duty cycle. With no load connected to the tip terminal, there would be effectively no dc current with just the AC component. With a load connected, the secondary current would be the same as shown in FIG. 5(e) but it would be riding on a DC component which is equal to the load current. The switching driver 46 is operated in a push-pull arrangement so as to obtain a plus polarity or minus polarity in either direction. In other words, the switching driver can source power to the load or sink power from the load, both plus and minus (i.e., four quadrant dynamic converter).

From the foregoing detailed description, it can thus be seen that the present invention provides a metallic channel unit network which can be used by substantially all of the various alarm companies for connecting their equipment from location to location. The metallic channel unit network of the present invention provides an apparent metallic cable pair in almost every respect in the frequency range of DC to 3.5 KHz with an amplitude variation between +200 to −200 VDC.

In the invention as heretofore shown and described, the metallic channel unit network 20 is comprised of a voice hybrid driver 28, a reference/balance circuit 30, an ADPCM processor 32, a codec 34, a channel logic gate array 36, a D/A signal processing circuit 38, an A/D signal processing circuit 40, a tip filter network 42, a ring filter network 44, a tip switch driver 46, and a ring switch driver 48. Further, the metallic channel unit network 20 includes a tip sense amplifier 50, a ring sense amplifier 52, a first multiplexer 54, a second multiplexer 56, an autozero circuit 58, and an autogain loop circuit 60. Optionally, the metallic channel unit network 20 may further include a sleeve lead control circuit 62. The components 28, 30, 38-44, and 54-60 were depicted in block form in FIG. 2 and more specifically in FIGS. 4A–4E, and the components 46 and 50 illustrated in block form in FIG. 2 were depicted in more detail in FIGS. 4F–4H. In a second embodiment of the invention, the voice hybrid driver 28 and the reference/balance circuit 30 have been replaced by a transformer and an A/B capacitor multiplier circuit for splitting off the voice band signals from the tip and ring "DC band" signals. The D/A signal processing circuit 38 and the A/D signal processing circuit 40 have been replaced by a combined signal processing circuit for performing both A/D conversions and D/A conversions. Low pass filters and track and hold circuits have been added so as to facilitate the A/D conversion process. The autozero circuit 58 and the autogain loop circuit 60 have been completely eliminated. Further, the tip switch driver 46 and the ring switch driver 48 have been replaced by respective tip and ring switch mode drivers so as to provide better power efficiency and gain linearity. A separate DC/DC converter circuit has been added which generates the positive and negative high supply voltage outputs for the tip and ring switch mode drivers.

Figure 6A:
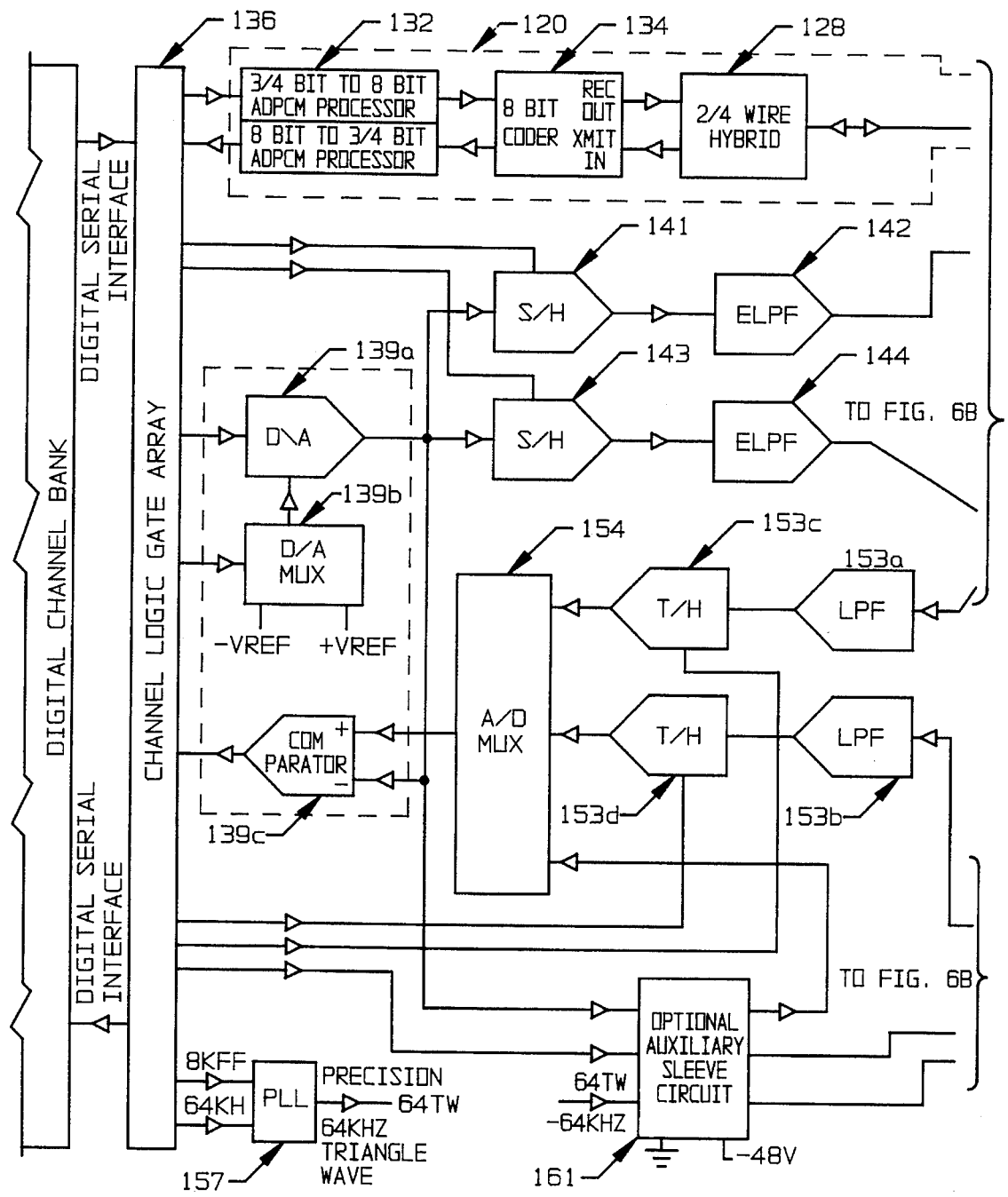
FIGS. 6A and 6B, when connected together is a simplified block diagram of a second embodiment of a metallic channel unit network of the present invention.
Figure 6B:
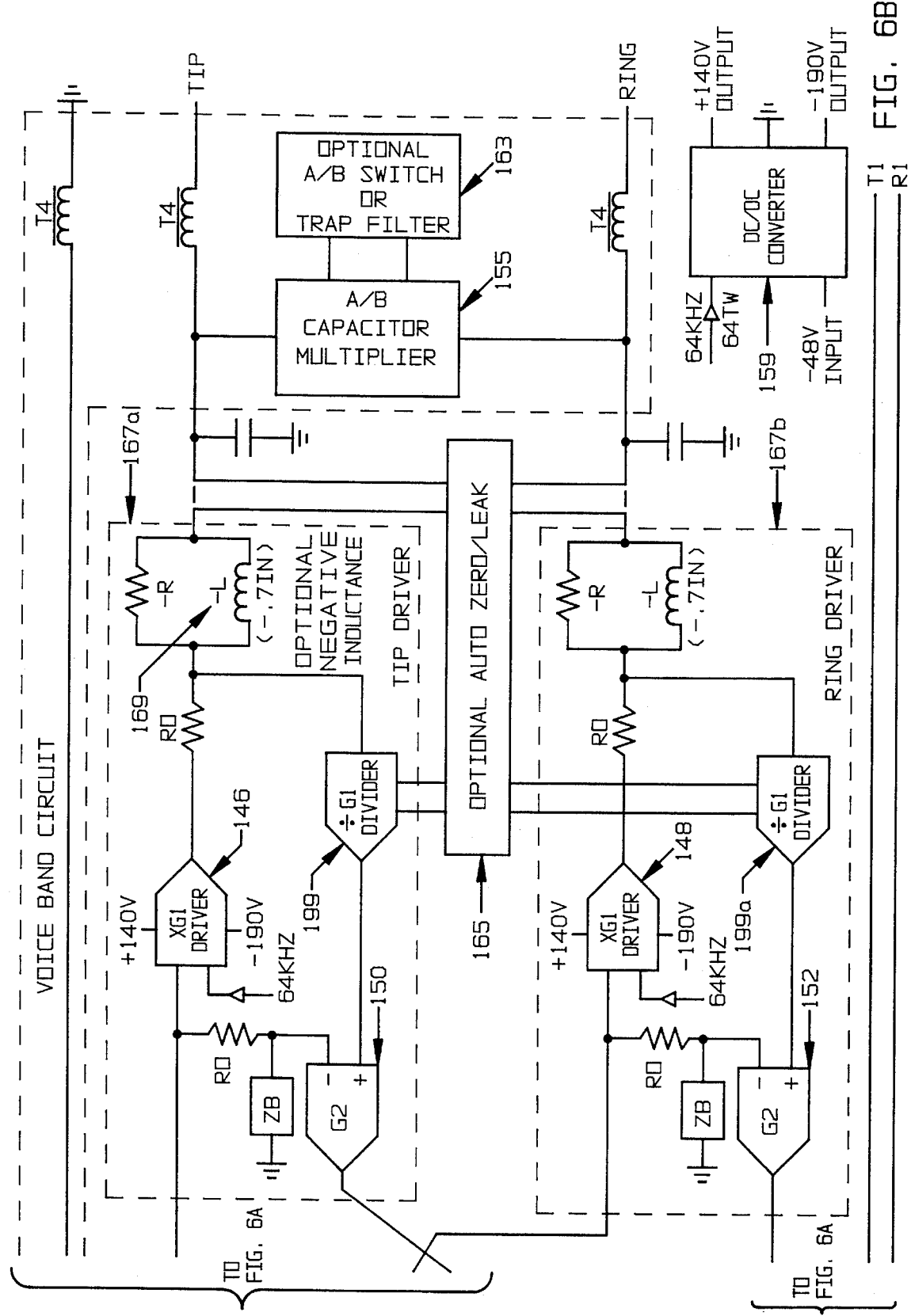

In FIGS. 6A and 6B, there is shown a simplified block diagram of a second embodiment of a metallic channel unit network of the present invention. The metallic channel unit network 120 includes a ⅔ wire hybrid circuit 128, an ADPCM processor 132, a voice PCM/CODEC 134, a channel logic gate array 136, a combined signal processing circuit 139, a tip sample and hold circuit 141, a tip elliptical low pass filter network 142, a ring sample and hold circuit 143, a ring elliptical low pass filter network 144, a XG1 tip switch mode driver 146, and a XG1 ring switch mode driver 148. A 1/G1 divider circuit 199 is coupled to the tip terminal to provide a 25-to-1 continuation ratio for scaling down the tip terminal voltage (ranging between +140 V to −190 V) to be compatible with the signal processing circuit 139. A similar 1/G1 divider circuit 199a is coupled to the ring terminal.

Further, the metallic channel unit network 120 includes a tip balance amplifier 150 (G2), a ring balance amplifier 152 (G2), a tip low pass filter network 153a, a ring low pass filter network 153b, a tip track and hold circuit 153c, a ring track and hold circuit 153d, and an A/D multiplexer 154. A transformer T4 and an A/B capacitor multiplier circuit 155 is used to couple the voice band signals between tip and ring terminals and the codec 134. A phase locked loop circuit 157 generates a precision frequency/amplitude 64 KHz triangular waveform which is synchronized to the 8 KHz clock pulses from the channel logic gate array 136 so as to avoid generating audible subharmonics. A DC/DC converter circuit 159 is responsive to the output of the phase locked loop circuit 157 for providing output voltages of +140 V and −190 V used by the tip and ring switch mode drivers 146 and 148. The combined signal processing circuit 139 consists of a D/A circuit 139a, a D/A mutiplexer 139b, and a comparator 139c which cooperates with the A/D multiplexer 154 and a successive approximation logic circuit inside the gate array 136 so as to perform both A/D conversions and D/A conversions.

Optionally, the metallic channel unit network 120 may further include an auxiliary sleeve lead circuit 161, an A/B switch or trap filter circuit 163, an autozero/leak circuit 165, and a negative inductance circuit 169. The sleeve lead circuit 161 may be constructed similar to either the tip driver portion 167a or the ring driver portion 167b. The sleeve lead circuit 161 provides an additional slow signalling path for sending sensed information to the gate array 136. The A/B capacitor switch circuit 163 is used to change the A/B capacitor multiplier circuit from a high value (0.7 uF) for a voice band signal to a low value (0.1 uF) for test signals (i.e., 24 Hz). Alternatively, the A/B trap filter circuit is used to provide a linear capacitor having a value approximately equal to 0.7 uF for voice band signals and having a value approximately equal to 0.1 uF for the 24 Hz test signals. The autozero/leak circuit 165 is used to precisely adjust the 1/G1 divider circuits 199 and 199a so as to maximize and stabilize the leak resistance.

By comparing the block diagram of FIG. 6 with the block diagram of FIG. 2, it can be seen that in the second embodiment of FIGS. 6A and 6B of the present invention the ADPCM processor 134, the codec 136, tip filter network 142, and ring filter network 144 are the only component blocks which remain essentially the same as in FIG. 2, even though the basic overall operation of the metallic channel unit networks 20 and 120 are identical. In particular, the voice hybrid driver 28 formed of the tip audio driver 72, ring audio driver 74, and line amplifier 76 of FIG. 2 have been replaced by the ⅔ wire hybrid circuit 128. Instead of using the blocking capacitors C32 and C34 of FIG. 2, the second embodiment utilizes the combination of the transformer T4 and the A/B capacitor multiplier circuit 155 for splitting off the "voice band" signals from the "DC band" signals and transmitting them separately to the codec 134. Further, the A/D signal processing circuit 40 of FIG. 2 has been eliminated in the second embodiment of FIGS. 6A ad 6B. The analog-to-digital conversion is performed in conjunction with the A/D multiplexer 154 by the same signal processing circuit 139 of FIG. 6 which also does the digital-to-analog conversion function.

The tip low pass filter network 153a and the ring low pass filter network 153b have been added before the A/D conversion process so as to prevent anti-aliasing as well as filtering out band noise. The tip track and hold circuit 153c and the ring track and hold circuit 153d have been added for interconnecting the respective filter networks 153a and 153b to the A/D multiplexer 154 so as to hold the analog samples during the successive approximation A/D conversion process in order to prevent modulating effective sampling point. This modulation would create sideband signals which are difficult to filter out. The track and hold circuits are switched under the control of the gate array 136 so as to hold the analog sample just prior to commencement of the A/D conversion process.

The autozero circuit 58 and the autogain loop circuit 60 of FIG. 2 have been eliminated since they are not required due to the combined signal processing circuit 139 which provides better accuracy. The 64 KHz phase locked loop circuit 157 of FIG. 6 has replaced the free-running clock oscillator 96 in FIG. 4E which produced a triangular waveform at a frequency of 32 KHz. The tip and ring switching drivers 46 and 48 of FIG. 2 are replaced by two-stage tip and ring switch mode drivers 146 and 148, respectively, in FIG. 6 which provide better power efficiency and gain linearity. The switch mode DC/DC converter circuit 159 has been added in FIG. 6 for supplying power to the switch mode drivers. The series output impedance $Z_0$ of 1.2 Hys+1200 ohms in FIG. 2 is replaced by a resistor $R_0$ since the inductor is no longer required to isolate the "voice band" signals from the "DC band" signals. The function of the tip and ring sense/balance amplifiers 50 and 52 in FIG. 2 are replaced by the respective tip and ring balance amplifiers 150 and 152. The function of the voltage dividers 99 are performed by the 1/G1 divider circuits 199 and 199a.

Figure 7B:
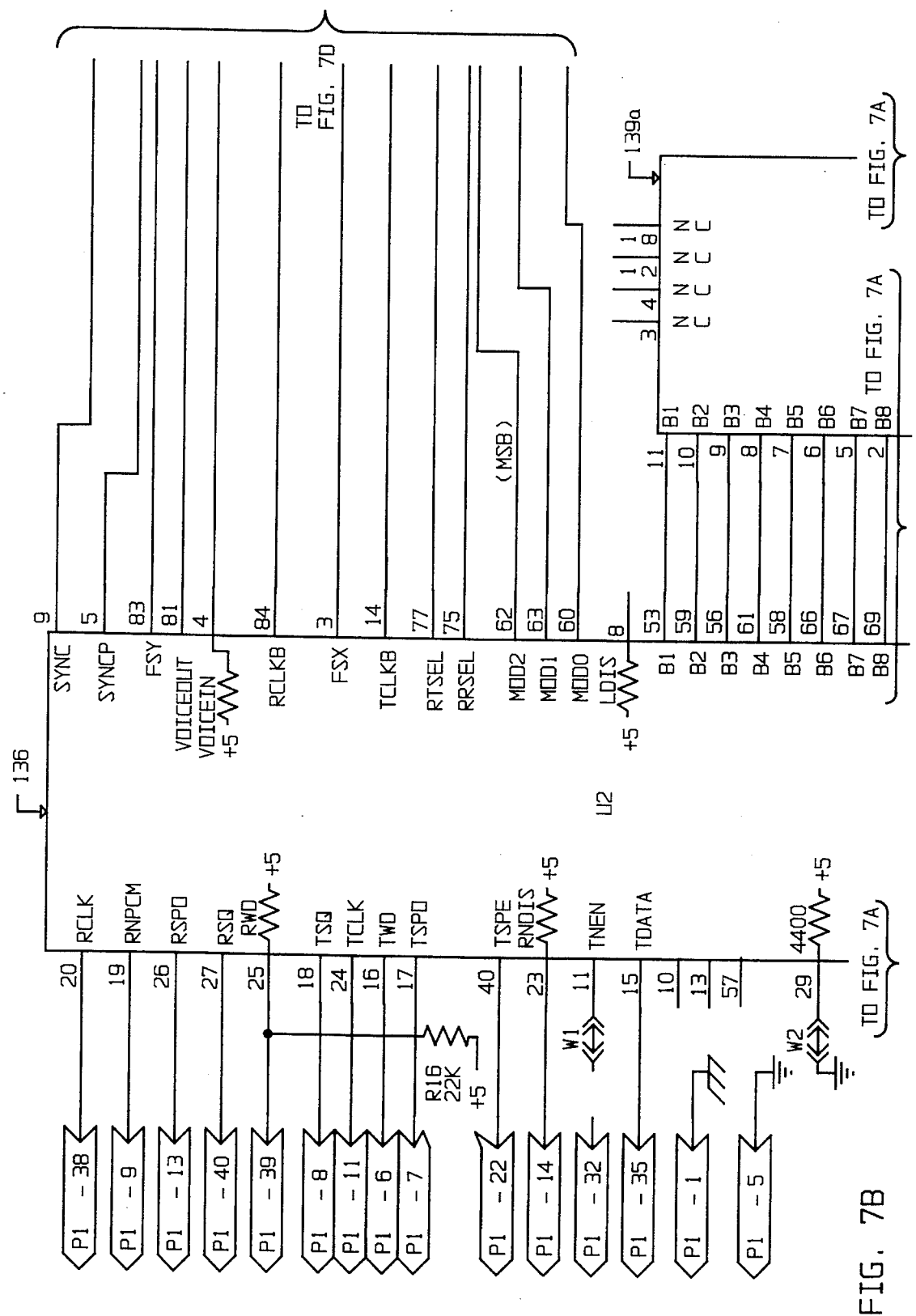
FIGS. 7A through 7Q, when connected together, is a detailed schematic circuit diagram of the second embodiment of the metallic channel unit network (except for the ring driver portion which is identical to the tip driver portion shown in FIGS. 7N–7Q) constructed in accordance with the present invention.
Figure 7C:
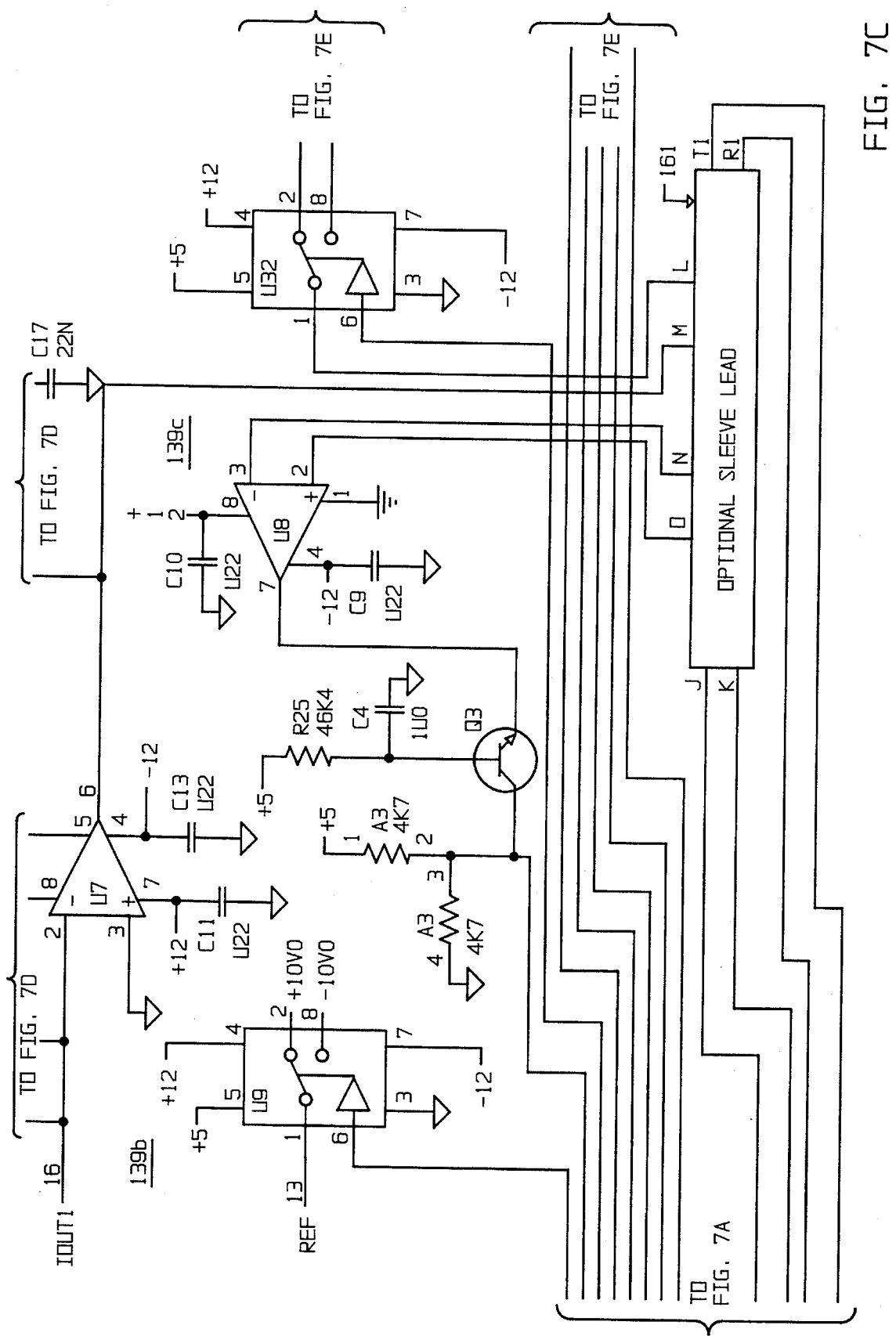
Figure 7E:
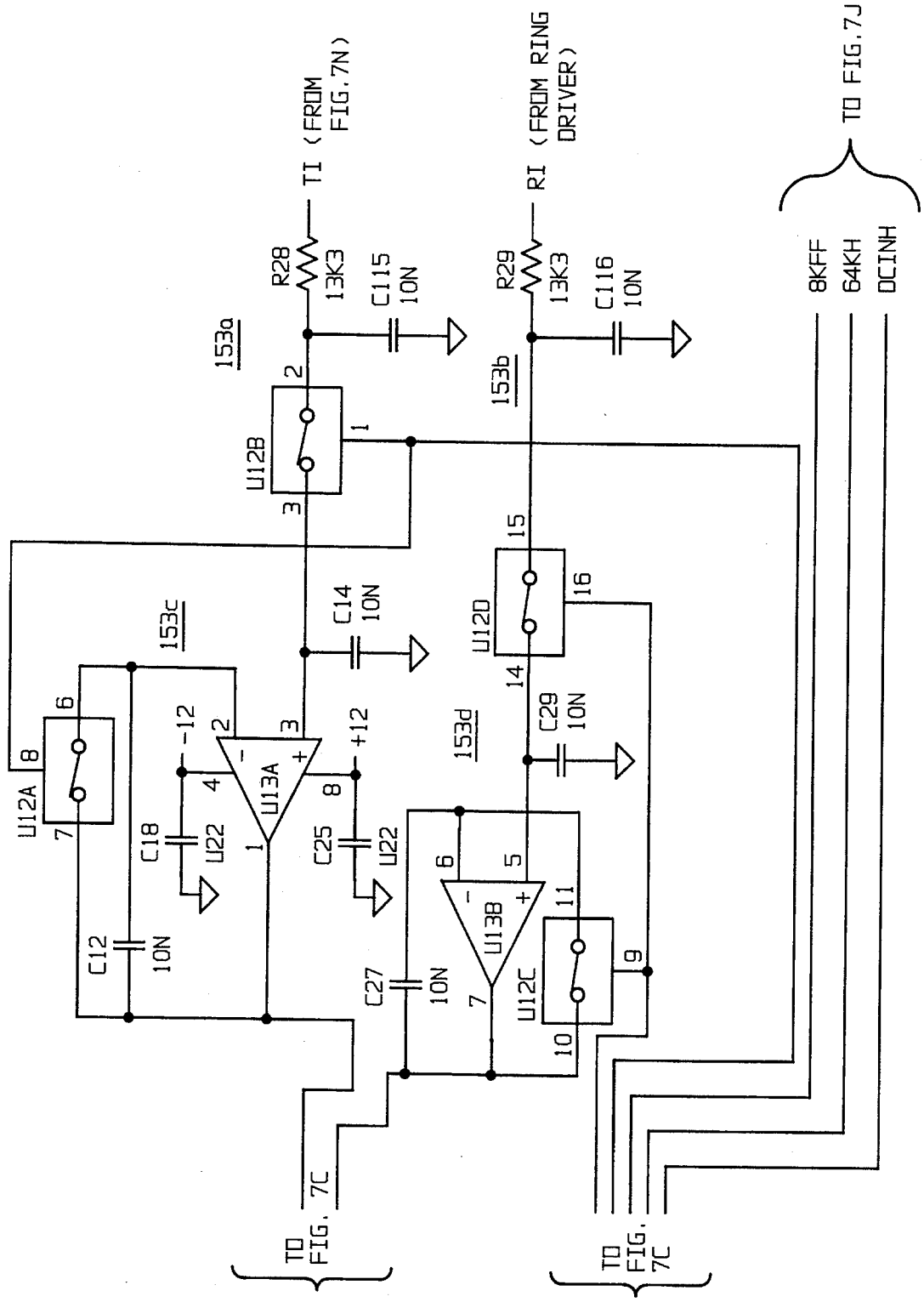
Figure 7F:
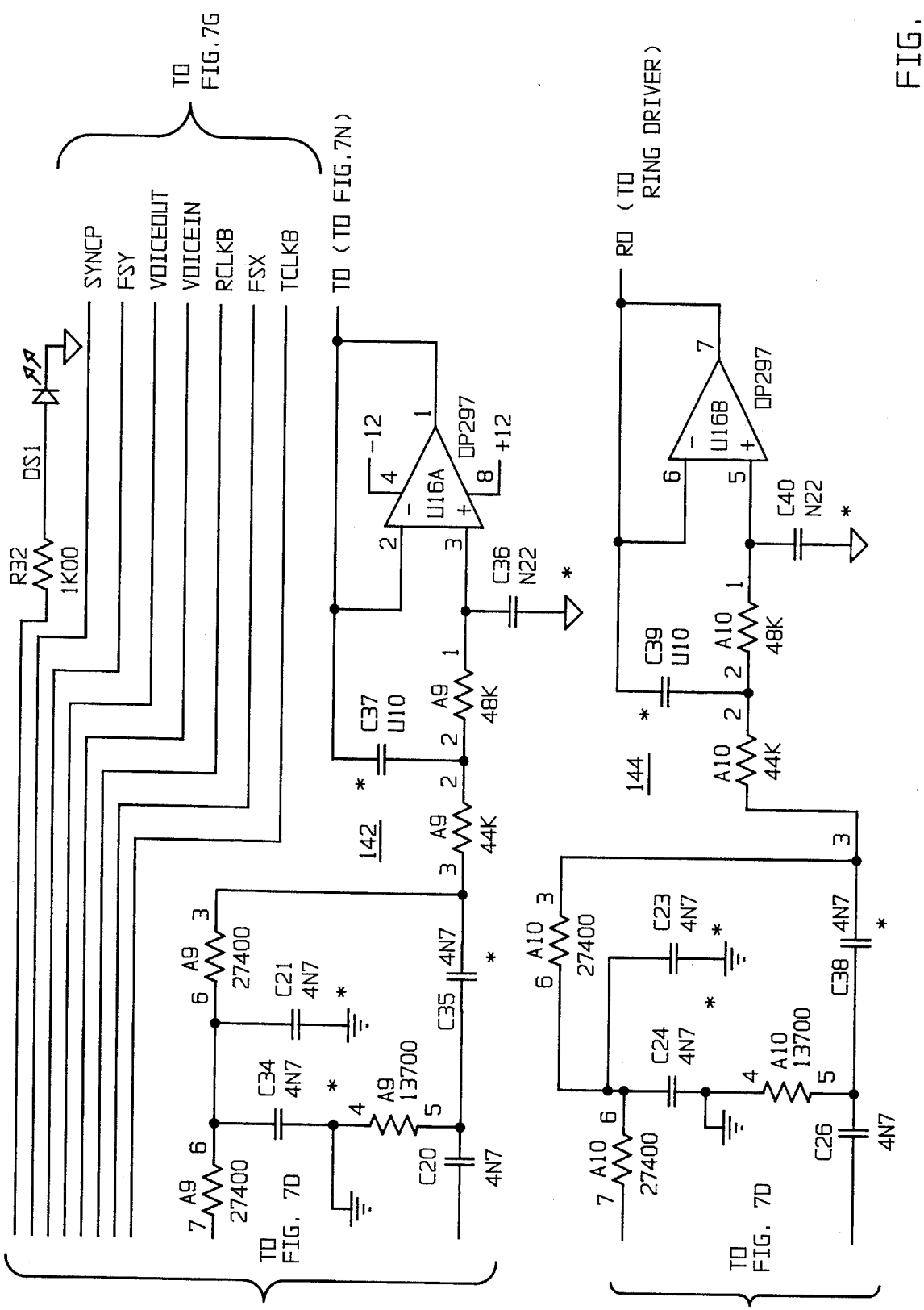
Figure 7G:
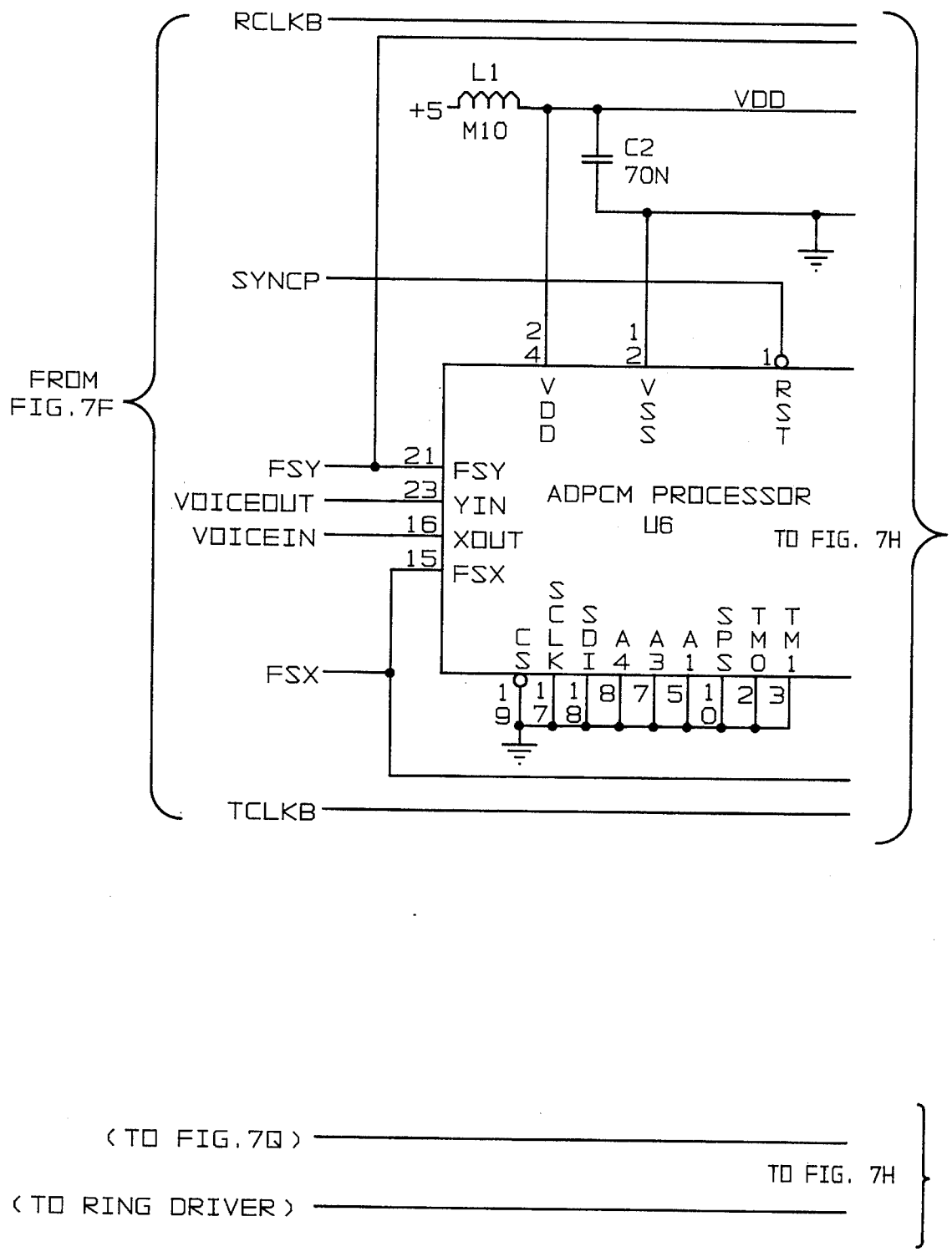
Figure 7I:
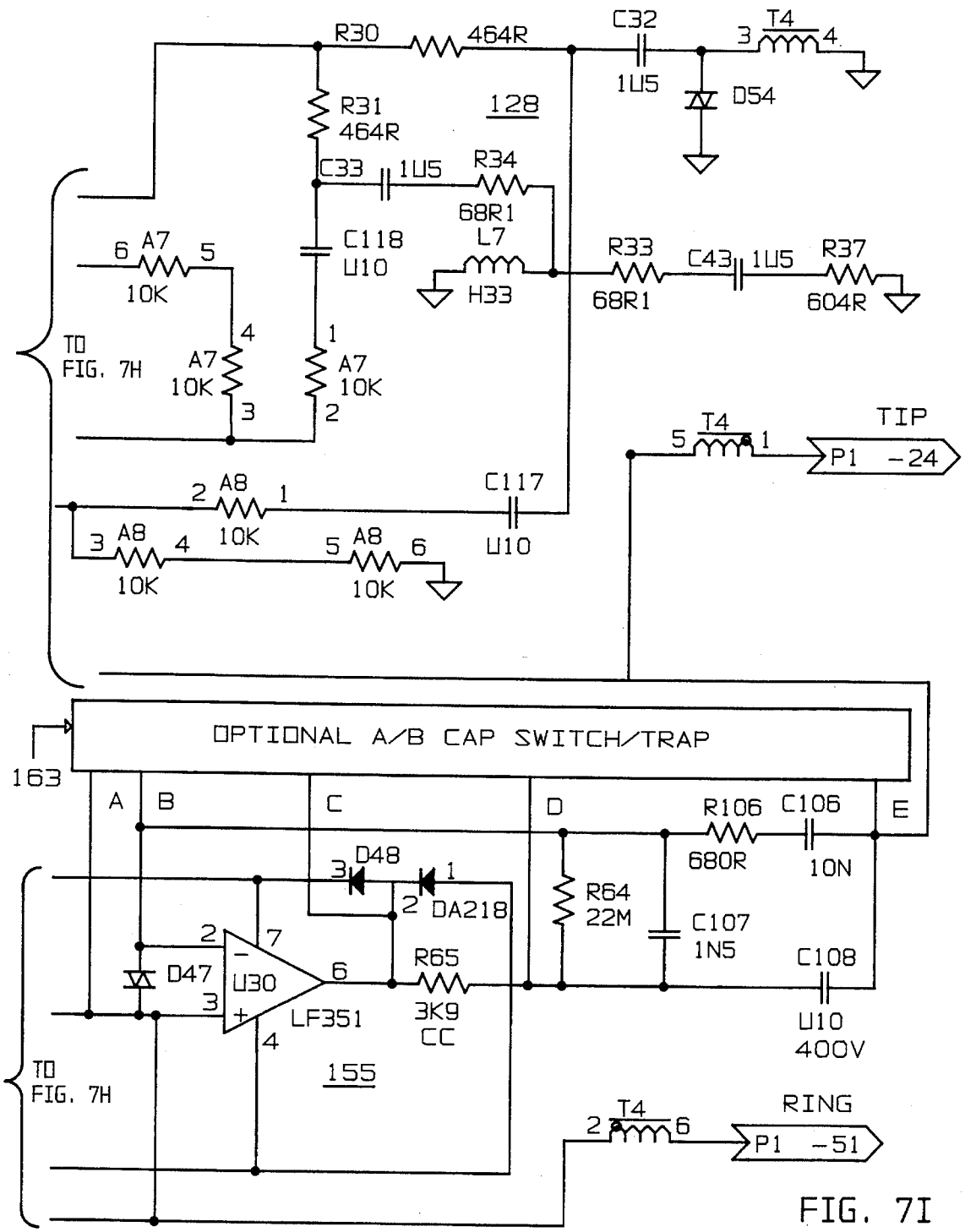
Figure 7J:
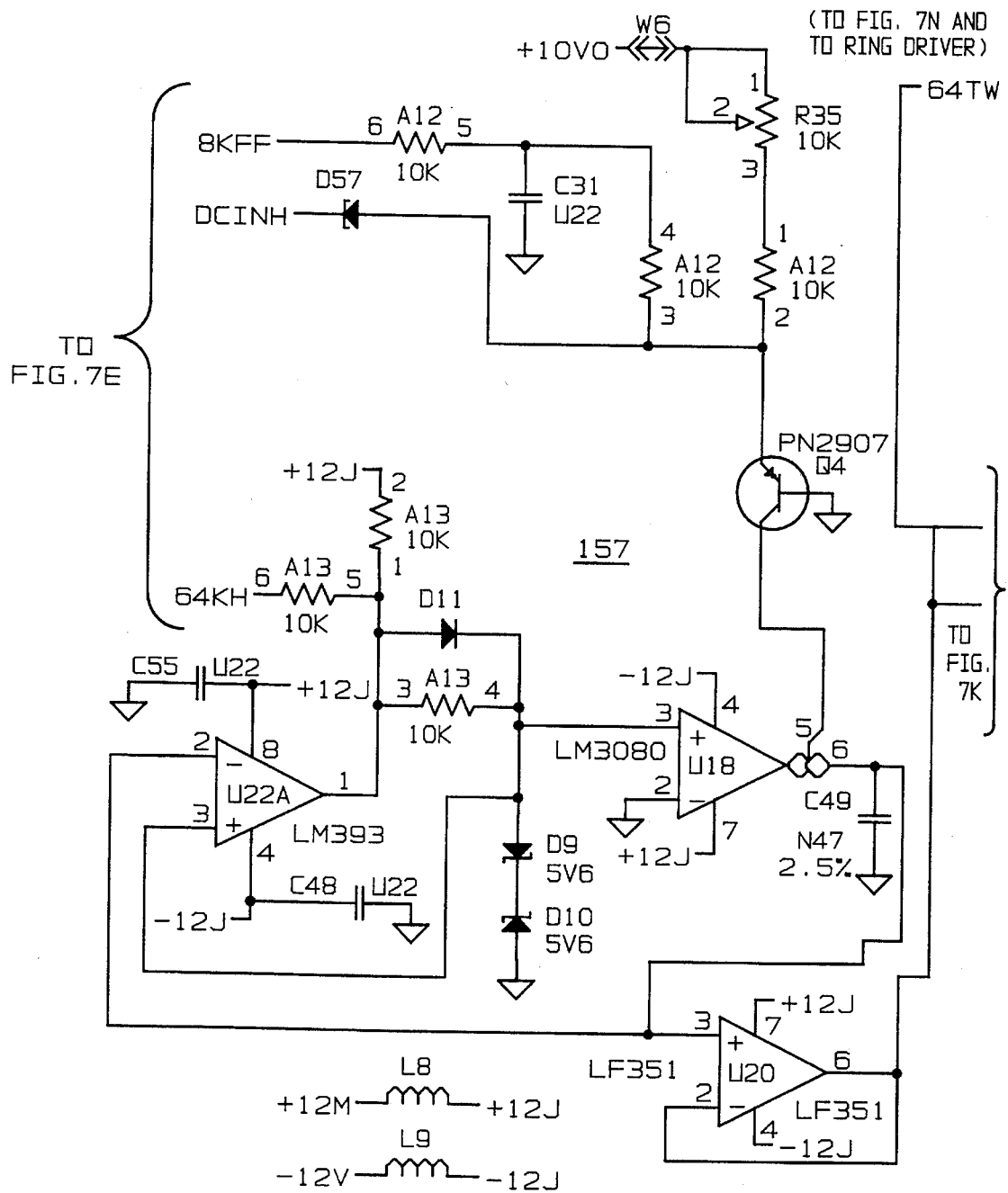
Figure 7K:
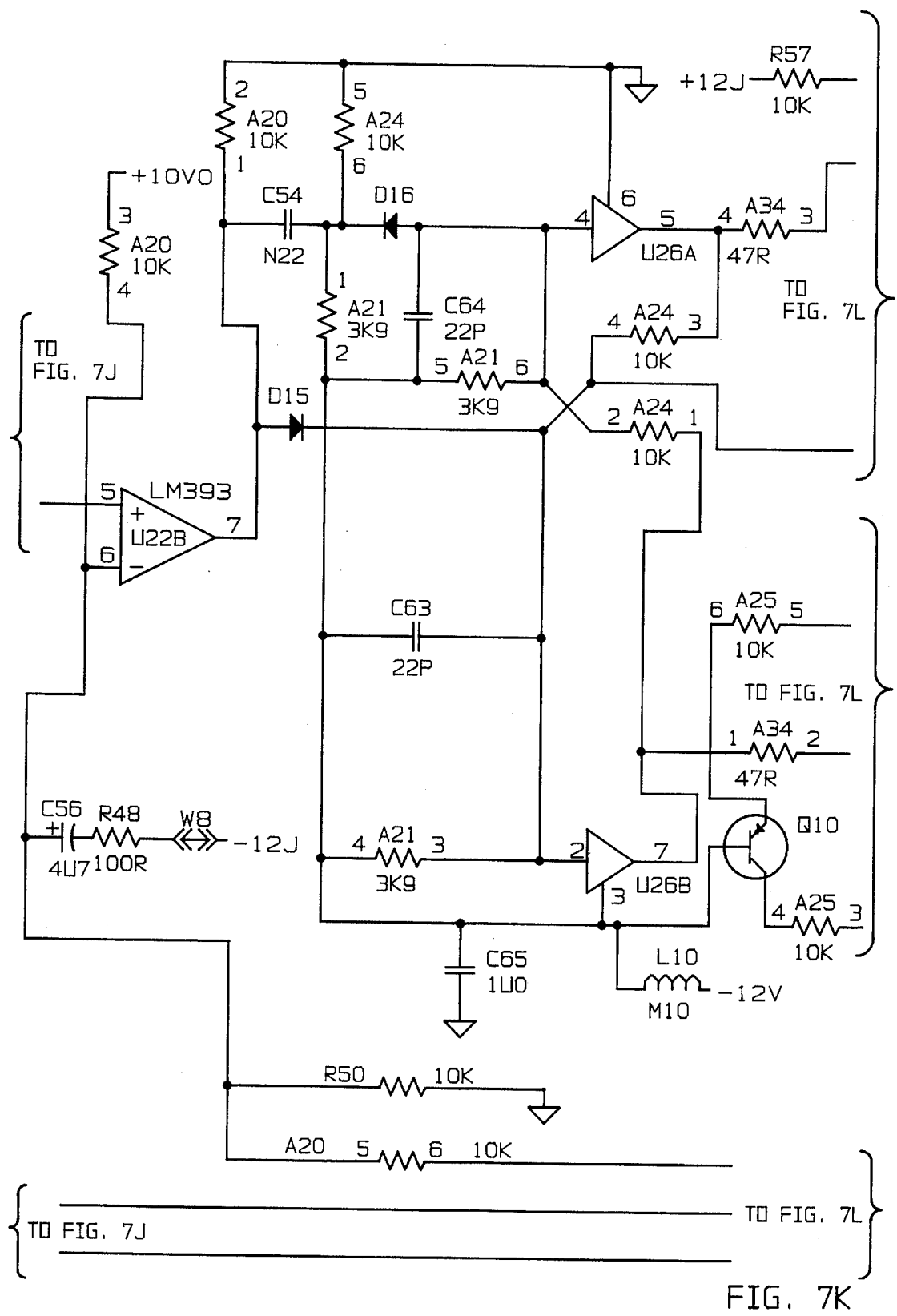
Figure 7L:
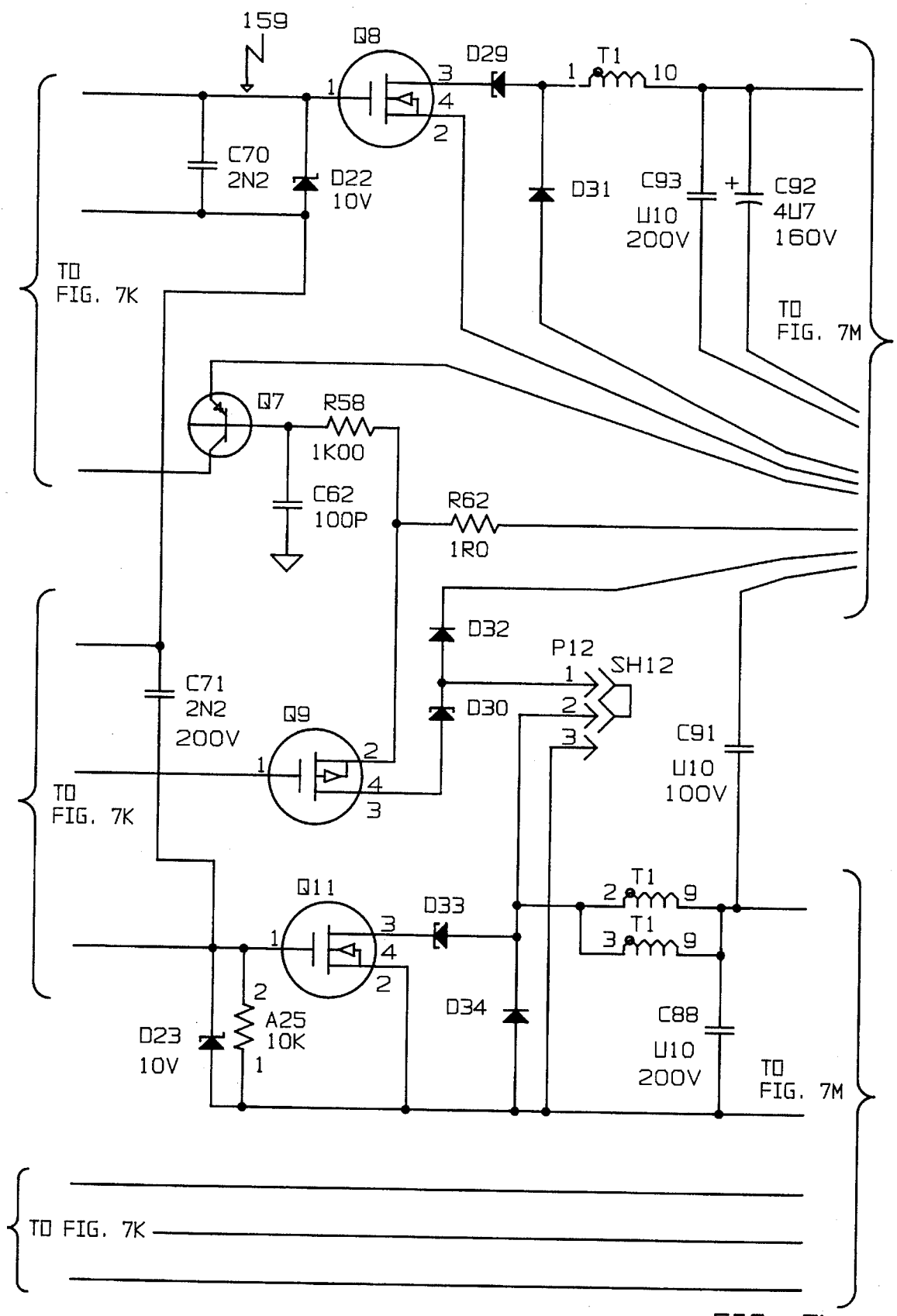
Figure 7M:
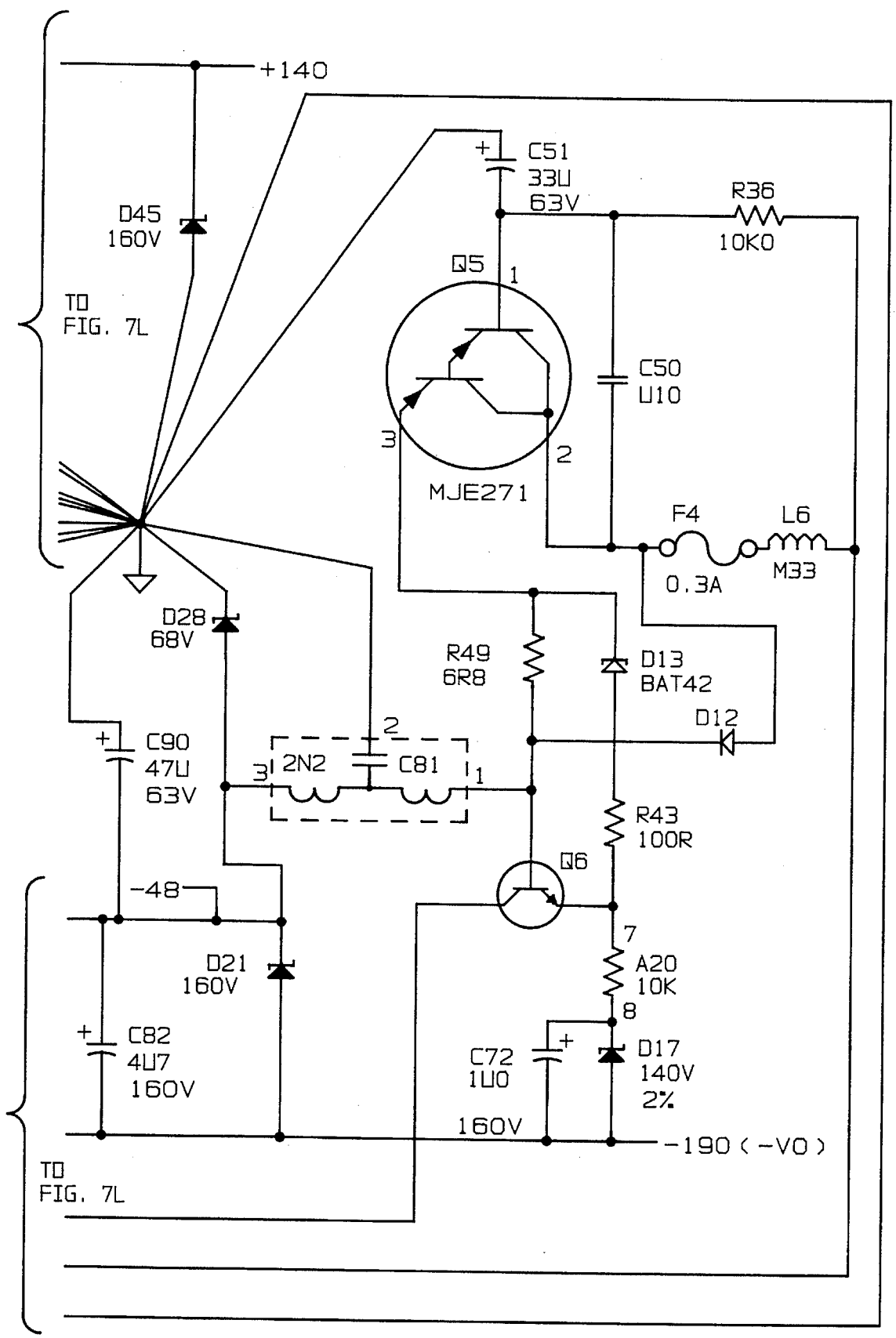
Figure 7O:
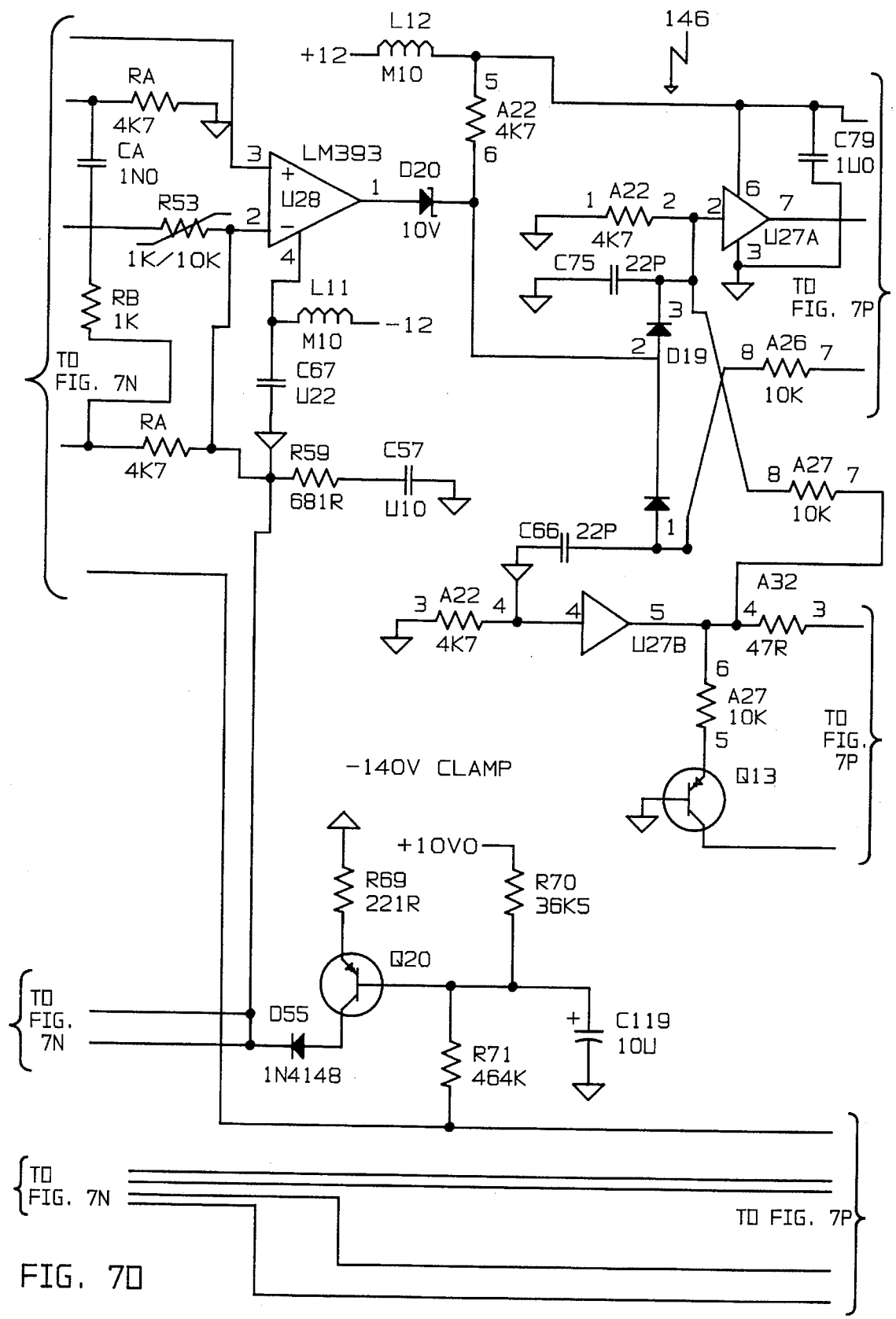
Figure 7P:
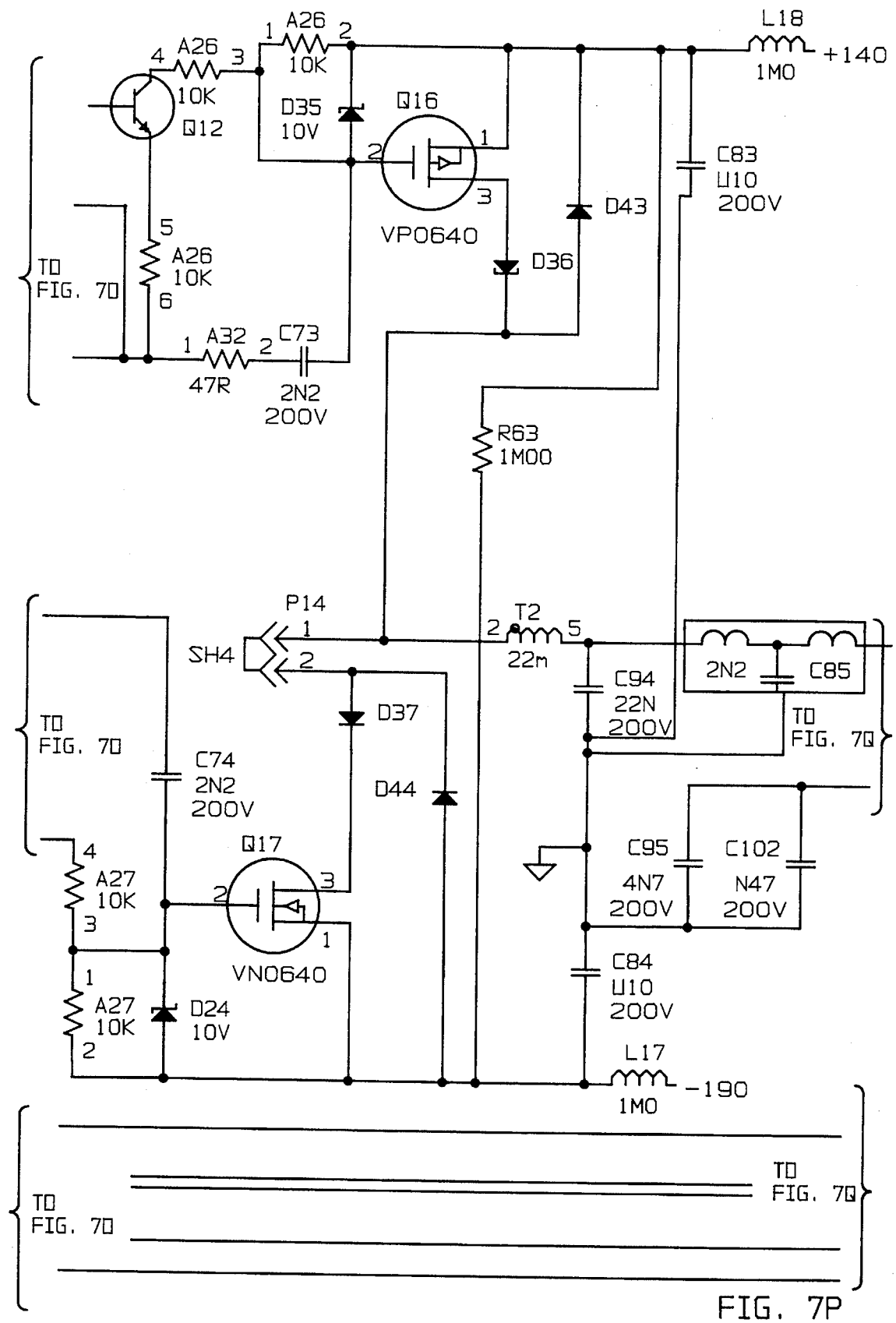
Figure 7Q:
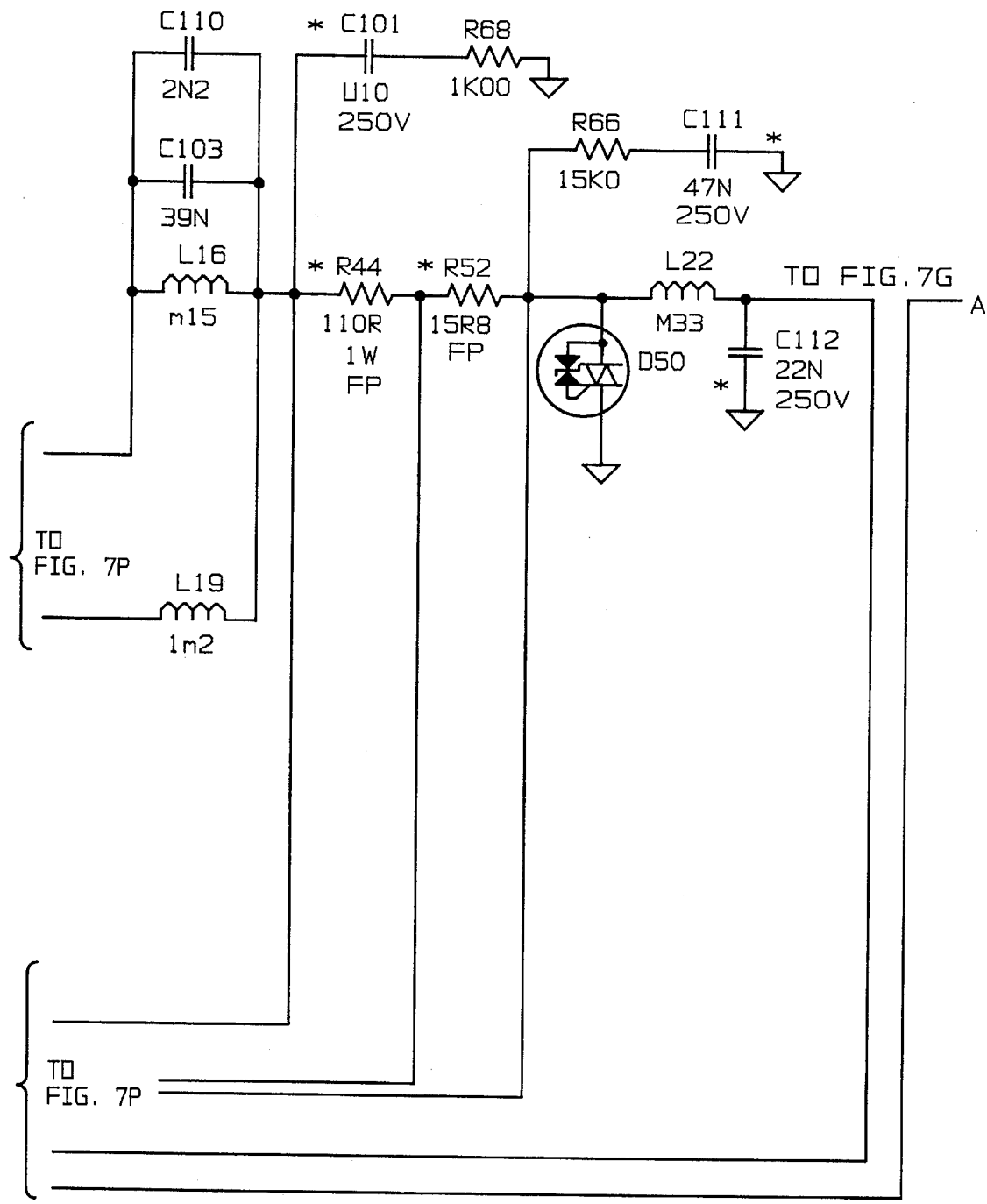

Referring now to FIGS. 7A–7Q, when connected together, there is shown a detailed schematic circuit diagram of the second embodiment of the metallic channel unit network 120 of the present invention. In particular, FIGS. 7A–7F illustrates detailed circuitry for use in the various blocks 136, 153a–153d, 139a–139c, and 141–144. FIGS. 7G–7I illustrate detailed circuitry for use in the various blocks 132, 134, 128 and 155. FIGS. 7J–7M illustrate detailed circuitry for use in the blocks 157 and 159. FIGS. 7N–7Q illustrate detailed circuitry for use in the various tip driver blocks 146, 150 and 199. It will be noted that the ring driver blocks 148, 152 and 199a are identical to the tip driver blocks. Even through these schematics are believed to be self-explanatory to those skilled in the art in view of the foregoing description, a brief explanation of the operation of these various blocks are believed to be in order.

In FIGS. 7A–7F, the tip low pass filter 153a is formed by a resistor R28 and capacitors C115 and C14, and the ring low pass filter 153b is formed by a resistor R29 and capacitors C116 and C28. The tip track and hold circuit 153c consists of an operational amplifier U13A, switches U12A and U12B, and their associated components for tracking the input signals from the filter 153a. Alternately, these low pass filters may be replaced with an elliptical low pass filter similar to the one in network 142 or 144. The ring track and hold circuit 153d consists of an operational amplifier U13B, switches U12C and U12D, and their associated components for tracking the input signals from the filter 153b. Just prior to an A/D conversion process, the switch U12B will open so as to cause the operational amplifier U13A to stop tracking and will hold the current value. Similarly, a switch U12A will also open and will cancel a charge injection error due to the charge injection from the switch U12B onto the capacitor C14. Since the switches U12A and U12B are formed on the same integrated circuit, there is produced equal compensation. The switches U12D and U12C operate in a similar manner. The A/D multiplexer 154 is formed by a switch U32 which selects the output from either the tip operational amplifier U13A or the ring operational amplifier U13B.

The D/A circuit 139a is formed of a 16-bit D/A converter I.C. U5 which is similar to MP7626 commercially available from Micropower System, Inc. The D/A multiplexer 139b is formed by a switch U9 which selects either +10 volts or −10 volts to be fed to the REF terminal on the D/A converter U5 dependent upon the polarity of the input sample. The comparator 139c (U8) receives the tip or ring input samples held by the corresponding track and hold circuit 153a or 153b. The output of the comparator U8 is fed to the gate array U2 via a transistor Q3. The transistor Q3, capacitor C4, and resistor R25 are formed as a cascade amplifier which serves to prevent oscillation from occurring on the output of the comparator U8. The successive approximation circuit inside the gate array U2 manipulates the output of the D/A converter U5 through 16 steps while looking at the output (pin 7) of the comparator U8 in order to perform the analog-to-digital conversion process.

The D/A circuit 139a receives the 16-bit digital signal from the gate array U2 on its input pins B1–B16 and generates an analog signal on its output pin 16. This analog signal is fed to an operational amplifier U7. The output of the amplifier U7 is switched on dual multiplexer U11a and U11b at the sampling rate so the voltage at the output of the operational amplifier U7 will charge up alternately the capacitors C7 and C17. The capacitors C7 and C17 sample and hold the values of the output voltages from the amplifier U7. The multiplexer U11a, capacitor C7, and buffer U15A correspond to the tip sample and hold circuit 141 of FIG. 6, and the multiplexer U11b, capacitor C17 and buffer U15B correspond to the ring sample and hold circuit 143 of FIG. 6.

The tip filter network 142 includes a trap filter formed by capacitors C34, C21, C35, C20 and resistors A9/7-6, A9/4-5, and A9/6-3 and a second order low pass filter formed by operational amplifier U16a, capacitors C37, C36 and resistors A9/3-2 and A9/2-1. Similarly, the ring filter network 144 includes a trap filter formed by capacitors C24, C23, C38, C26 and resistors A10/7-6, A10/4-5, and A10/6-3 and a second order low pass filter formed by operational amplifier U16b, capacitors C39, C40 and resistors A10/3-2 and A10/2-1.

In FIGS. 7G–7I, the ADPCM processor 132 (U6) and the codec 134 (U10) are formed of integrated circuits which are identical in function to that shown in FIG. 4B of the first embodiment. The 2/4 wire hybrid circuit 128 is formed of resistors R30–R34; capacitors C32, C33, C43 and C118; and inductor L7. The 4-wire signals from the codec U10 (pin 3) are coupled by the resistor R30, capacitor C32 and the transformer T4 to the 2-wire tip and ring terminals. The 2-wire signals from the tip and ring terminals are coupled by the transformer T4 and the capacitor C32 to the input (pin 16) of the codec via the capacitor C117 and the input resistors A6/2-1 and A7/5-6. The amplified output voltage on pin 14 is converted to a digital signal by the codec U10. The hybrid circuit 128 also performs the balancing function so as to prevent the incoming voice frequency signals of the processor 132 from looping around and being returned through the input pin 16 of the codec.

The A/B capacitor multiplier circuit 155 is formed by the operational amplifier U30 and capacitors C106, C107 and their associated components. The multiplier circuit provides a capacitor across the leads "A" and "B" connected to respective pins 5 and 2 of the voice transformer T4 which is required for coupling the "voice band" signals between the tip and ring terminals and the codec U10. For the high level "DC band" signals, the value of the capacitor is approximately 0.1 uF and for the low level "voice band" signals, the value of the capacitor is approximately 0.7 uF. The resistor R106 is added in series to the capacitor C106 for limiting the high frequency gain, and the resistor R65 is used to limit peak transient currents. A separate power supply for generating ±15 V to operate the operational amplifier U30 is formed by transformer T1 (pins 6, 7 and 8 which is part of the DC/DC converter circuit); diodes D46, D49; and capacitors C100, C109. Zener diodes D52, D53 serve to limit the voltage transients through the resistor R65 and the diode D48. A varistor D47 also protects the inputs of the operational amplifier U30 from transients. The resistor R64 provides DC biasing of the operational amplifier U30.

Referring now to FIGS. 7J–7M, there is shown a detailed schematic circuit diagram of the phase locked loop circuit 157 and the DC/DC converter circuit 159. The phase locked loop circuit 157 includes a comparator U22, the transconductance amplifier U18, and a current source transistor Q4 for generating a 64 KHz triangular wave signal on a capacitor C49 which is synchronized to the 8 KHz clock from the channel bank. The output of the transconductance amplifier U18 is a current source which charges linearly the capacitor C49. When this voltage reaches +6 volts, determined by the diodes D9 and D10, the comparator U22 switches the polarity on the diodes. Then, the transconductance amplifier U18 will charge linearly the capacitor C49 to −6 volts and then will repeat the cycle.

The frequency of the triangular wave signal is determined initially (approximately 56 KHz) by the current through the transistor Q4 from potentiometer R35 and resistor A12/1-2. The output on pin 1 of the comparator U22 is a squarewave which is fed via resistor A13/5-6 to pin 64 KH on the gate array U2. The gate array divides down the same by 8 and toggles the signal on the pin 8KFF low. The gate array sets the pin 8KFF high with its internal 8 KHz clock. Then, this 8 KHz squarewave from the pin 8KFF is integrated by the resistor A12/5-6 and the capacitor C31 so as to modify the bias current through the transistor Q4. As a result, the frequency on the capacitor C49 is locked to the 8 KHz clock of the gate array. Therefore, the triangular wave of the capacitor C49 will be exactly 64 KHz locked to the 8 KHz clock with a voltage swing between −6 volts and +6 volts. This 64 KHz triangular wave signal is buffered by operational amplifier U20 and sent to the DC/DC converter circuit 159 and to the tip and ring drivers.

The DC/DC converter circuit 159 functions to transfer selectively power from one of the battery input voltage (−48 volts), the positive voltage output (+140 volts), and the negative voltage output (−190 volts) to the other remaining ones. The DC/DC converter circuit 159 includes pulse width modulator I.C. U22 which converts the symmetrical triangular wave to a squarewave whose duty cycle is controlled by the bias voltage applied to its pin 6. The initial bias set to approximately +5 volts is determined by the resistors A20/3-4 and R50. A feedback signal is received through the resistor A20/5-6 for lowering the bias voltage so as to reduce the duty cycle as required by the output voltage. The output of U22 on pin 7 is delivered to the input of a pair of flip-flop drivers formed by I.C. U26A and U26B and their associated components. The outputs of the flip-flop drivers are on pin 5 of U26A and on pin 7 of U26B which are coupled to power field-effect transistors Q8, Q9 and Q11. It will be noted that the resistors A24/4-3 and A24/2-1 and the capacitors C63 and C64 are used to create a delay so that the output of driver U26A will always turn off the transistors Q8 and Q11 before turning on the transistor Q9 via driver U26B and the output of driver U26B will always turn off the transistor Q9 before turning on the transistors Q8 and Q11 via driver U26A.

The output pin 7 of driver U26B is connected to the gate of the FET Q9 via the current-limiting resistor A34/1-2. The output pin 5 of driver U26A is connected to the gate of FET U8 via level shifting diode D22 and to the gate of the FET Q11 via a level shifter formed by the transistor Q10 and capacitor C71. A peak current in the FET Q9 is sensed by a transistor Q7. When the current exceeds a certain value, such as 0.6 A for longer than a predetermined time, the transistor Q7 will turn on so as to toggle high the input of U26B which will turn off the FET Q9. As a result, there is prevented excessive current from being supplied to the FET Q9 during overload or start-up conditions (soft start).

The voltages on the load capacitors C93, C92, C91, C90, C88 and C82 increase as energy is transferred to them every cycle. This energy transfer will be repeated until the desired output voltage $-V_o$ is obtained. When the output voltage $-V_o$ exceeds −190 V, the Zener diode D17 will conduct so as to cause current to flow through the resistor A20/7-8, transistor Q6 and the resistor A20/5-6 thereby pulling the input pin 6 of U22 negative which lowers the duty cycle and thus regulates the output voltage $-V_o$ to be about −190 V. The resistor R48 and capacitor C56 provide loop compensation for the voltage regulation. The capacitor C72 is connected in parallel across the diode D17 so as to limit the voltage rise time o on the level shifter Q10/C71. The resistor R36, the capacitor C51 and a transistor Q5 are used to produce a slow start-up of the converter circuit when the −48 volts is initially applied. The slow start-up is used to prevent the transistor Q11 from turning on when the transistor Q9 is already on. The capacitor C50 provides stability to the transistor Q5 due to the inductive load L6. The current from the −48 volt power supply is limited to some predetermined input current value. For example, when the current flowing though the resistor R49 exceeds 125 mA the diode D13 will conduct so as to pull feedback current through the transistor Q6. As a consequence, the duty cycle of the squarewave from U22 is again changed so as to maintain a maximum current of 125 mA.

Since the tip driver portion 167a and the ring driver portion 167b for the respective tip and ring terminals are identical, it will be sufficient to illustrate and describe in detail only the tip switch mode driver 146 (XG1), tip balance amplifier 150 (G2), and 1/G1 divider circuit 199. Thus, the ring switch mode driver 148, ring balance amplifier 152, and divider circuit 199a have not been shown in detail. In FIGS. 7N–7Q, there is depicted a detailed schematic circuit diagram of the tip switch mode driver 146, tip balance amplifier 150, and tip divider circuit 199. The switch mode driver 146 consists of a high gain input amplifier U24, a comparator U28, a pair of FET drivers U27A and U27B, level shifter transistors Q12 and Q13, power field-effect transistors Q16 and Q17 and their associated circuitry. The triangular waveform having a frequency of 64 KHz and a voltage swing between +6.0 V and −6.0 V generated by the phase locked loop circuit 157 at the output pin 6 of amplifier U20 is fed to the non-inverting input of the comparator U28. The output of the input amplifier U24 provides a control signal which is applied via resistor R53 to the inverting input of the comparator U28. The output of the amplifier U24 varies from −6 V to +6 V so as to control the duty cycle of the comparator U28 from 100% high to 0% high. Thus, the comparator U28 functioning as a pulse width modulator provides a 64 KHz squarewave whose duty cycle is proportional to the control signal applied to its inverting input. The output voltage swing of the comparator U28 is shifted from 0 to −12 V to 0 to +12 V by the diode D20.

The output of the comparator U28 is coupled to the FET driver U27A-pin 2 via a diode D19/2-3 and to FET driver U27B-pin 4 via a diode D19/2-1. When the comparator U28 goes high, the capacitor C66 will create a delay so that the output of the driver U27A will always turn off the FET Q16 before the FET Q17 is turned on by the output of the driver U27B. When the comparator U28 goes low, the capacitor C75 will create a delay so that the output of the driver U27B will always turn off the FET Q17 before the FET Q16 is turned on by the output of the driver U27A. The output pin 7 of driver U27A drives the gate of the FET Q16 via the level shifter transistor Q12 and a speed-up capacitor C73. The output pin 5 of the driver U27B drives the gate of the FET Q17 via the level shifter transistor Q13 and a speed-up capacitor C74. The capacitors C73 and C74 serve to facilitate fast transitions at the respective gates of the power transistors Q16 and Q17. The diodes D35 and D24 are used to clamp the voltage swing between the proper limits and protect the gates of the respective transistors Q16 and Q17. The power transistors Q16 and Q17 are switched on and off alternately at a 64 KHz rate with a duty cycle being controlled by the control signal from the output of the input amplifier U24.

The level shifter transistors Q12 and Q13 shift the squarewave output of the drivers U27A and U27B swinging between 0 to +12 V to a 64 KHz squarewave swinging between +140 V and −190 V at the common drains of the power transistors Q16 and Q17. The source of the transistor Q16 is coupled to the positive power supply rail of +140 V, and the source of the transistor Q17 is coupled to the negative power supply rail of −190 V. The diodes D36 and D37 serve to protect reverse current through the respective transistors Q16 and Q17. The diodes D43 and D44 function to bypass the reverse current to the respective power supplies (+140 V or −190 V). The 64 KHz squarewave is fed to a filter network formed by an inductor T2/2-5 and a capacitor C94. This filter network is used to integrate and reject the 64 KHz squarewave and produce a slowly varying output which is proportional to the control signal. A parallel resonant tank circuit is comprised of inductor L16 and capacitors C103, C110 which is tuned to 64 KHz. A series resonant tank circuit is comprised of inductor L19 and capacitors C95, C102 which is also tuned to 64 KHz so as to shunt the energy to ground. A filter circuit C85 interconnected between the filter network and the parallel resonant tank circuit is used to suppress higher frequency switching spikes.

The output of the parallel resonant tank circuit is fed through an output sensing resistor R44 and a current sensing resistor R52 to the output lead "A." A current limiting circuit is formed by opto-isolators U23 which are turned on when the current sensed in the resistor R52 exceeds a certain peak, i.e., 64 mA. This causes drive current to be pulled away from the inverting input of the comparator U28 so as to limit the current. The varistor D18 serve to protect U23 from transients. A clamping transistor Q20 is provided for clamping or limiting the −140 V power supply. If the voltage exceeds −140 V for a certain time, the transistor Q20 will turn on so as to cause the inverting input of the comparator U28 to be positive, thereby pulling the supply voltage back to −140 V. A dampening circuit formed by capacitor C101 and resistor R68 is used to dampen the resonance of the filter network (T2 and C94).

The gain of the switch mode driver 146 is determined by the resistors A20 (390K) and A20 (15K75) which is approximately 25. The 1/G1 divider circuit 199 is formed by the resistors A20 (390K) and A20 (15K75) which is approximately 1/25. Since all of the resistors are in the same array, the tolerance and temperature coefficient are closely matched. Further, the potentiometer R38 (100R) is used to trim any differences. The balance amplifier 150 is comprised of the operational amplifier U21 and its associated components. The output of the 1/G1 divider circuit 199 is fed to the non-inverting input (pin 3) of the amplifier U21. A balance network formed by the resistor A16/6-5 and capacitor C44 is used in conjunction with the inverting input (pin 2) of the amplifier U21 so as to cancel the signals arriving from the receive path (T0) so that they are prevented from being returned to the transmit path (TI).

Capacitors C59 and C58 are the main compensation capacitors for producing the switch mode driver loop stability. The resistor RA and RB with capacitor CA provide phase/gain compensation at the cut-off frequency of the filter network (T2 and C94). As a result, the gain of the amplifier U24 is increased so as to obtain the phase margin needed for stable compensation at the higher frequencies.

Capacitor C57 along with resistor R53 limits the dV/dT of the control voltage to the comparator U28. Resistor R59 corrects the phase to ensure the higher frequency stability. For slow or low level signals, the resistor R53 has a low value and R59/C57 has little effect. However, for fast or high level signals, the resistor R53 increases to a large value and slowly drives the capacitor C57 which limits the dV/dT. The resistors RC add additional stability to the capacitors C59, C58 by shifting the phase shift as their compensation rolls the loop gain of the amplifier U24 to zero.

Figure 8:
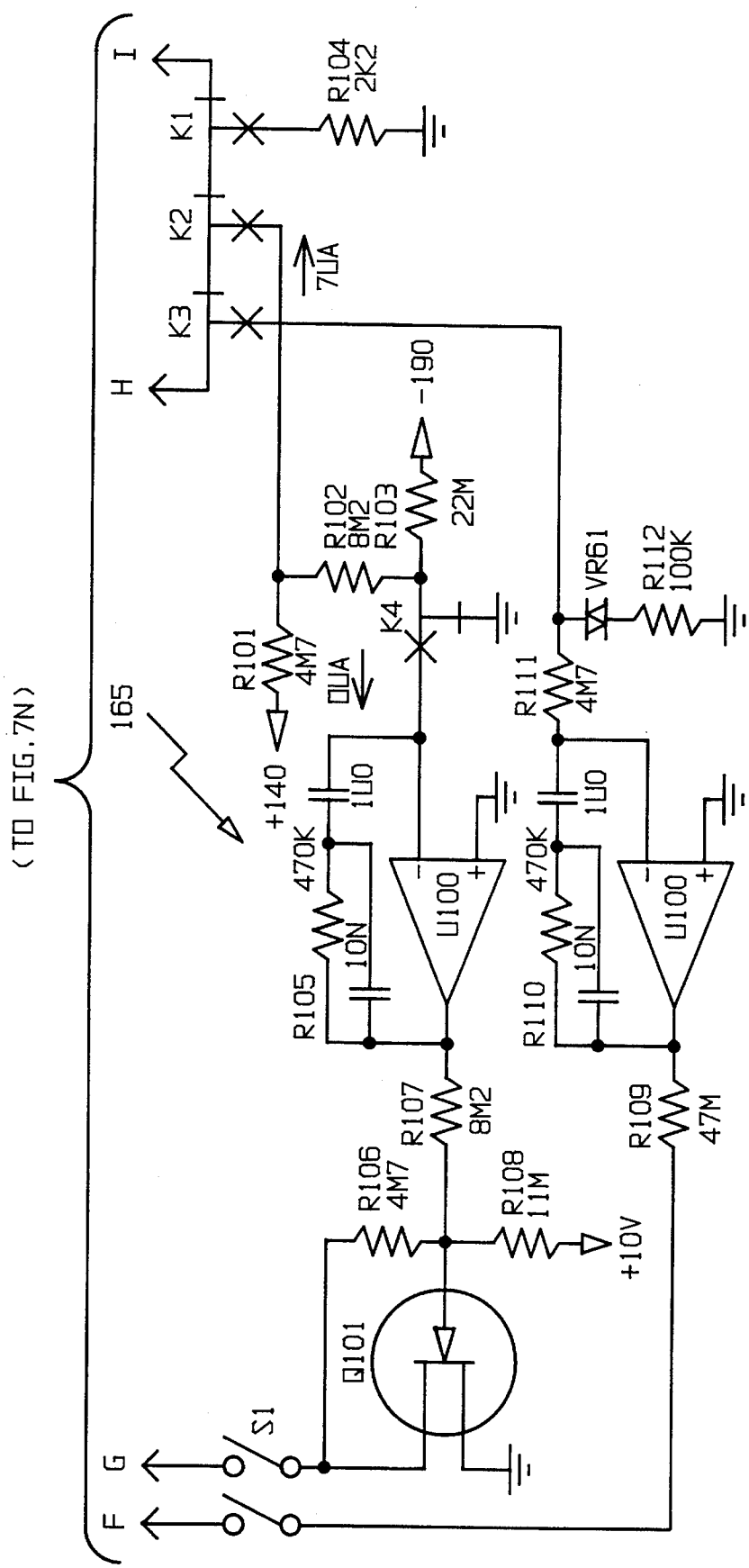
FIG. 8 is a detailed schematic circuit diagram of the autozero/leak circuit for use in the optional block 165 in the second embodiment of FIG. 6B.

In FIG. 8, there is shown a detailed schematic circuit diagram of the autozero/leak circuit for use in the optional block 165 of FIG. 6B. The autozero/leak circuit 165 performs an auto calibration at regular intervals on the overall offset and leakage (gain) drift of the transmission system. The autozero/leak circuit consists of operational amplifiers U100A and U100B, a FET Q101, relays K1-K4, a switch S1, and their associated components and the digital control circuitry in the gate array 136.

Figure 9:
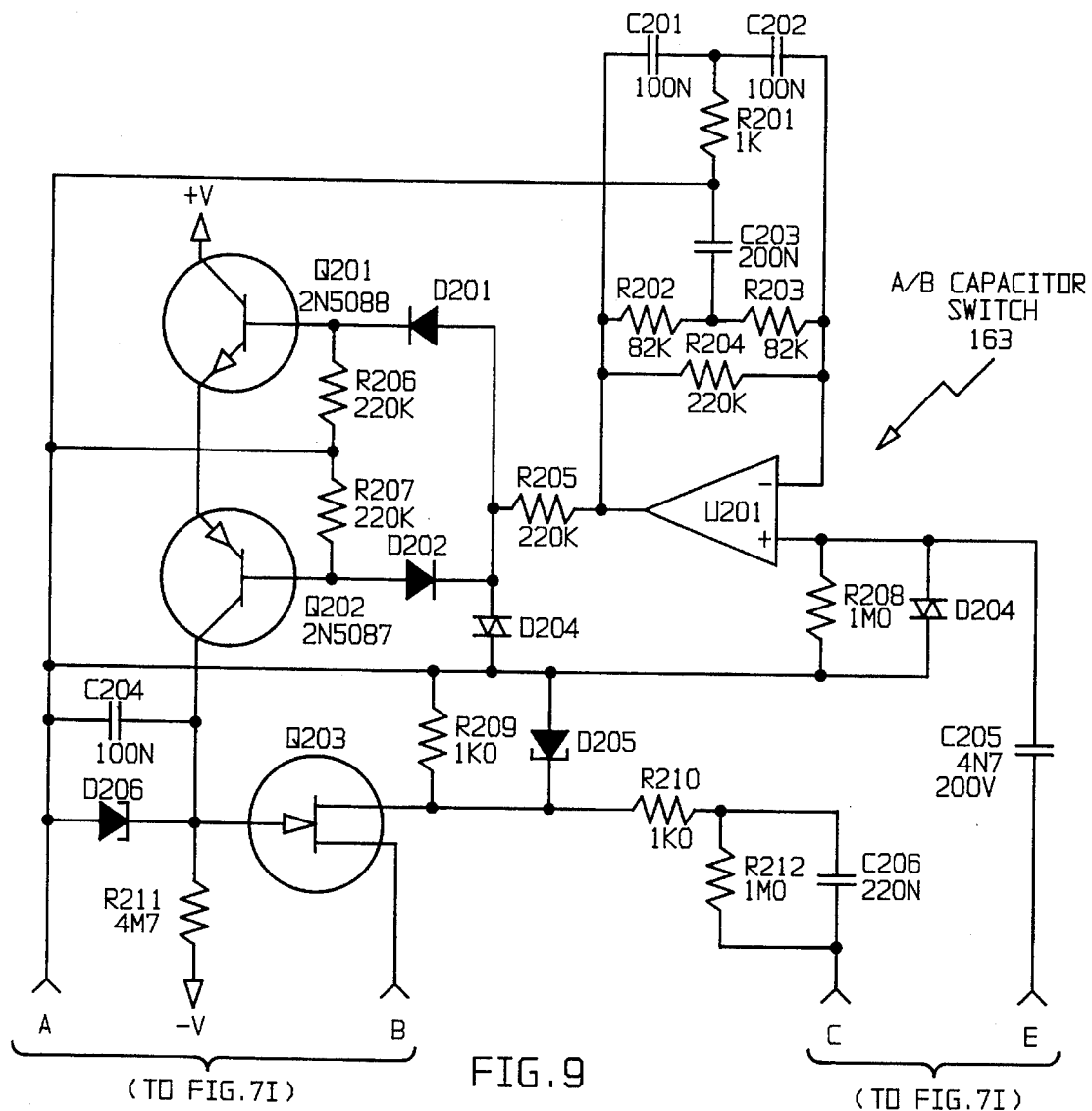
FIG. 9 is a detailed schematic circuit diagram of the A/B capacitor switch for use in the optional block 163 of FIG. 6B.

In FIG. 9, there is shown a detailed schematic circuit diagram of the A/B capacitor switch circuit for use in the optional block 163 in FIG. 6B. The capacitor switch circuit 163 is used to switch the A/B capacitor multiplier circuit 155 having a 0.7 uF value at voice level signals to a 0.1 uF value at approximately 1 volt at the 24 Hz test level or greater than 1 volt at the other frequencies. The capacitor switch circuit consists of operational amplifier U201, transistors Q201 and Q202, and a FET Q203 and their associated components. The operational amplifier U201 is used to turn on the FET Q203 when a frequency dependent threshold is exceeded so as to reduce the gain in the A/B capacitor multiplier circuit 155. As a result, the effective capacitance is reduced from 0.7 uF to 0.1 uF.

Figure 10:
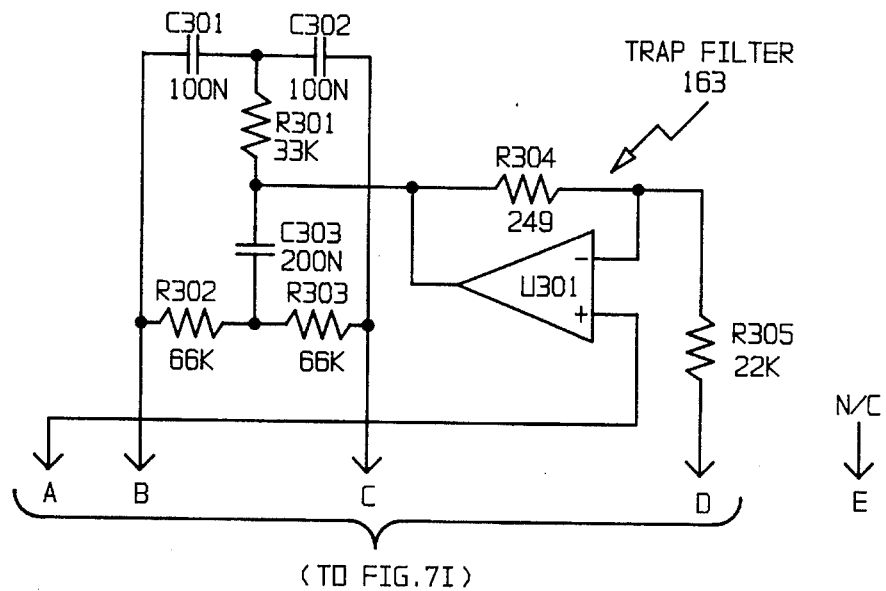
FIG. 10 is a detailed schematic circuit diagram of the trap circuit for use in the optional block 163 of FIG. 6B.

In FIG. 10, there is shown a schematic circuit diagram of a 24 Hz trap circuit for alternate use in the optional block 163 in FIG. 6. The trap circuit includes a twin T trap active filter formed by operational amplifier U30, capacitors C301–C303, and resistors R301–R303. The circuit is used to block the input to the A/B capacitor multiplier circuit 155 at 24 Hz so that the gain of the amplifier U30 is reduced to zero. Consequently, the A/B capacitance value is made to be equal to approximately 0.1 uF at the 24 Hz test level and to approximately 0.7 uF for other frequencies, in particular voice band frequencies.

Figure 11A:
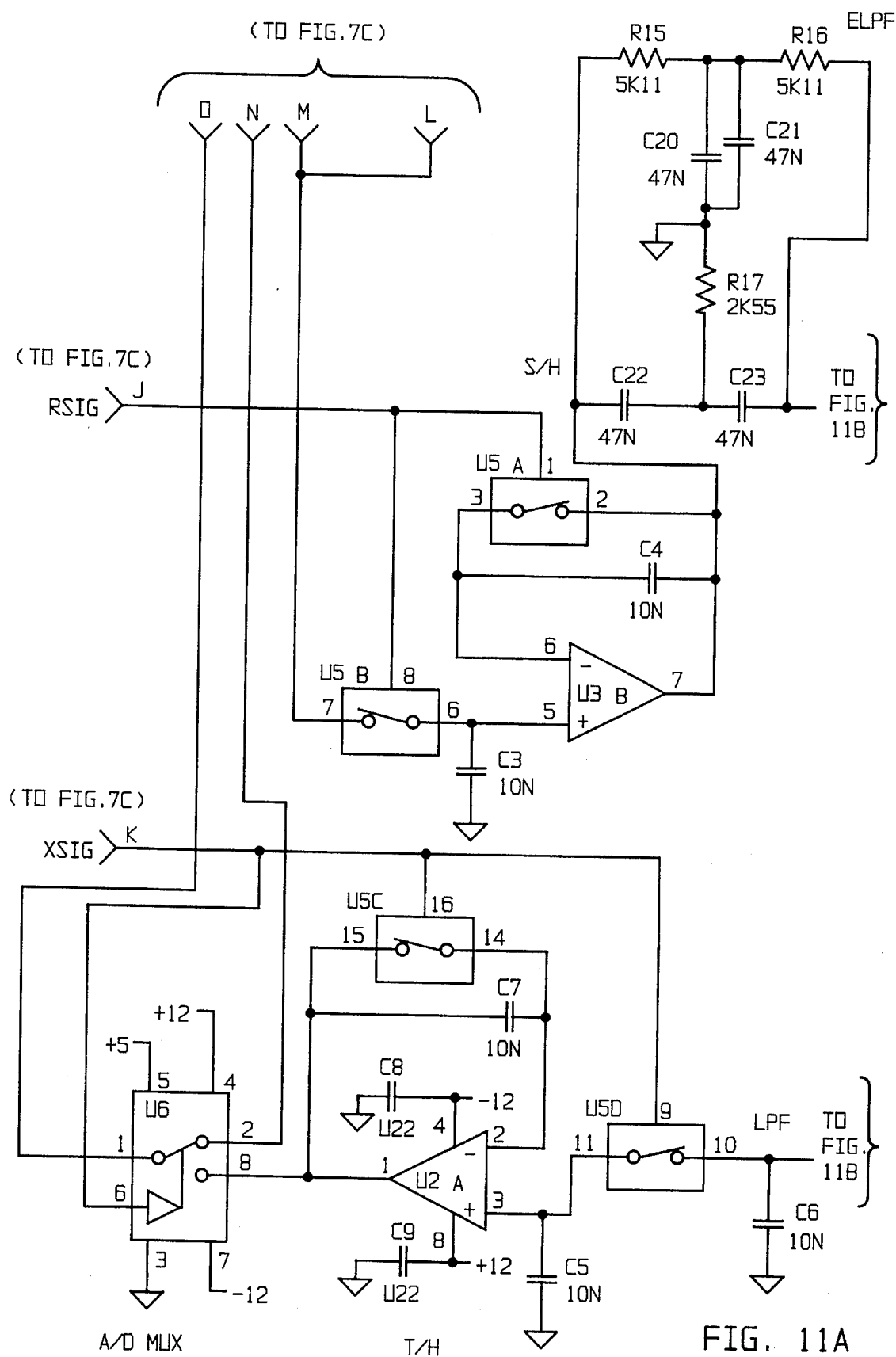
FIGS. 11A through 11C, when connected together is a detailed schematic circuit diagram of the sleeve lead circuit for use in the optional block 161 of FIG. 6A.
Figure 11B:
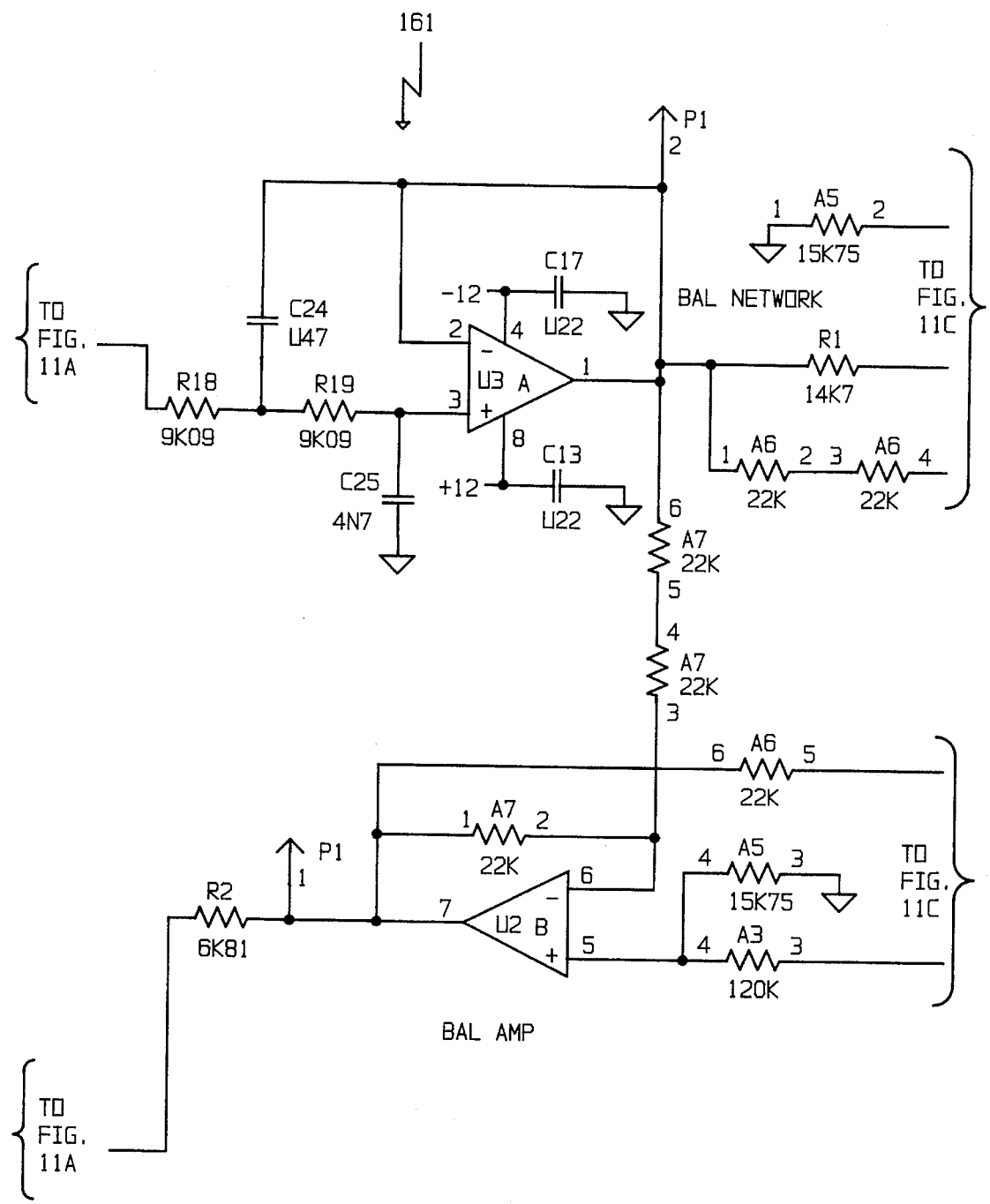
Figure 11C:
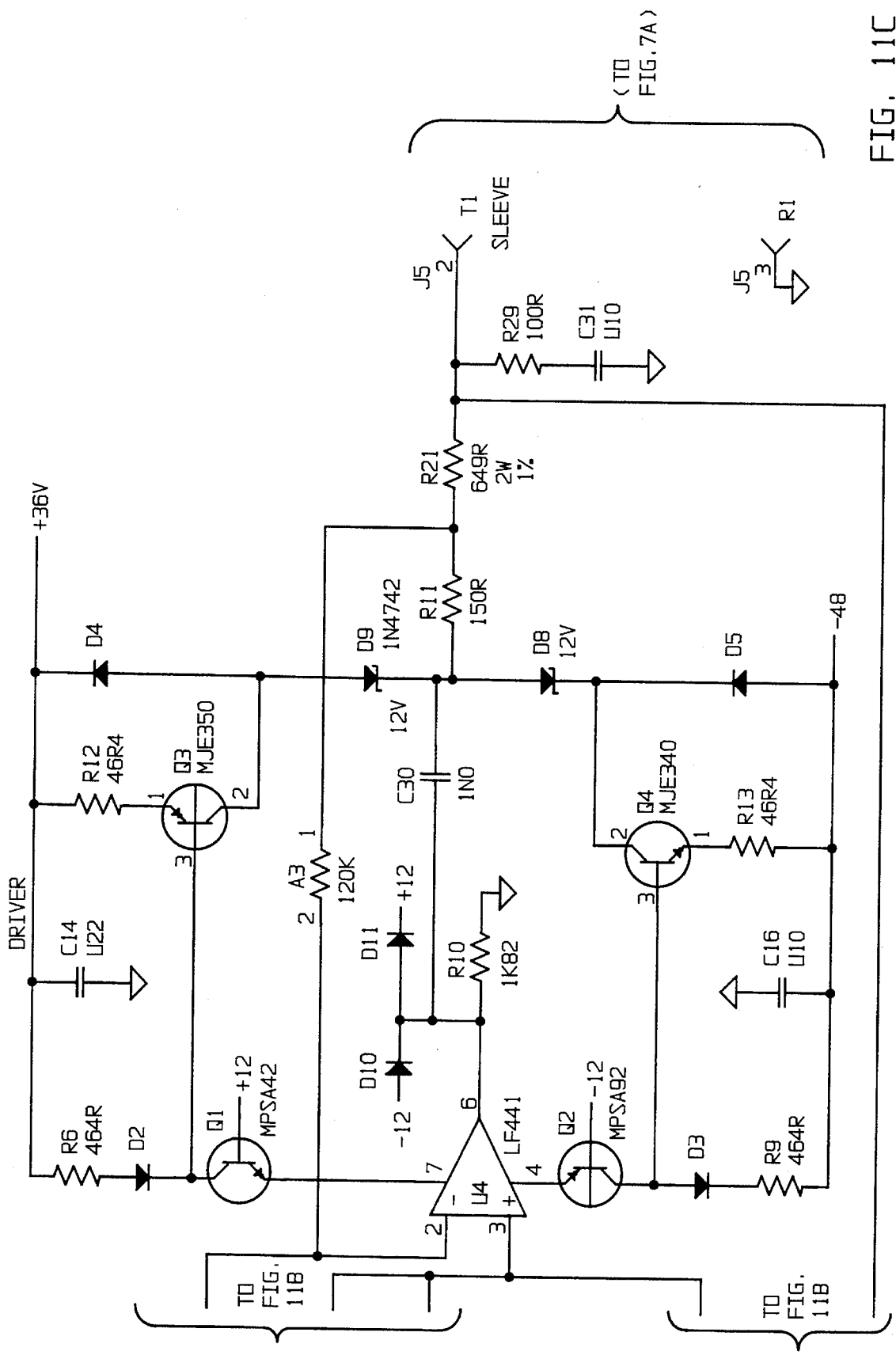

In FIGS. 11A through 11C, there is shown a detailed schematic circuit diagram of the sleeve lead circuit for use in the optional block 161 in FIG. 6. The sleeve lead circuit 161 is quite similar to the tip or ring switch mode driver 146 (148) in its construction and operation, except that the driver U4 is operated with a smaller positive rail of +36 V and a smaller negative rail of −48 V. The sleeve lead circuit 161 is comprised of a driver formed by operational amplifier U4, transistors Q1–Q4, and their associated components. The sleeve lead circuit 161 also includes a balance amplifier formed by operational amplifier U2 and the associated resistors. A low pass filter is formed by a resistor R2 and capacitors C5, C6. The sleeve lead circuit further includes a track and hold circuit formed by operational amplifier U2A; an A/D multiplexer U6; a sample and hold circuit formed by operational amplifiers U3B and switches U5A, U5B; and a filter network formed by operational amplifier U3A and its associated components.

In a third embodiment of the present invention, a negative inductance bandpass filter has been added to control the stability of the series negative inductor circuit. A negative capacitor circuit has been employed and is comprised of a first negative shunt capacitance coupled between the tip terminal and a ground potential, a second negative shunt capacitance coupled between the ring terminal and the ground potential, and a third negative shunt capacitance intercoupled between the tip terminal and the ring terminal. Further, a negative capacitance bandpass filter is used to control the stability of the negative capacitor circuit and actually changes the out-of-hand capacitance to a positive value. A 200 HZ impedance circuit has been added in series with the tip terminal and the ring terminal to prevent over-loading of external telephone company testing circuitry connected to the metallic channel unit network during testing.

Figure 12:
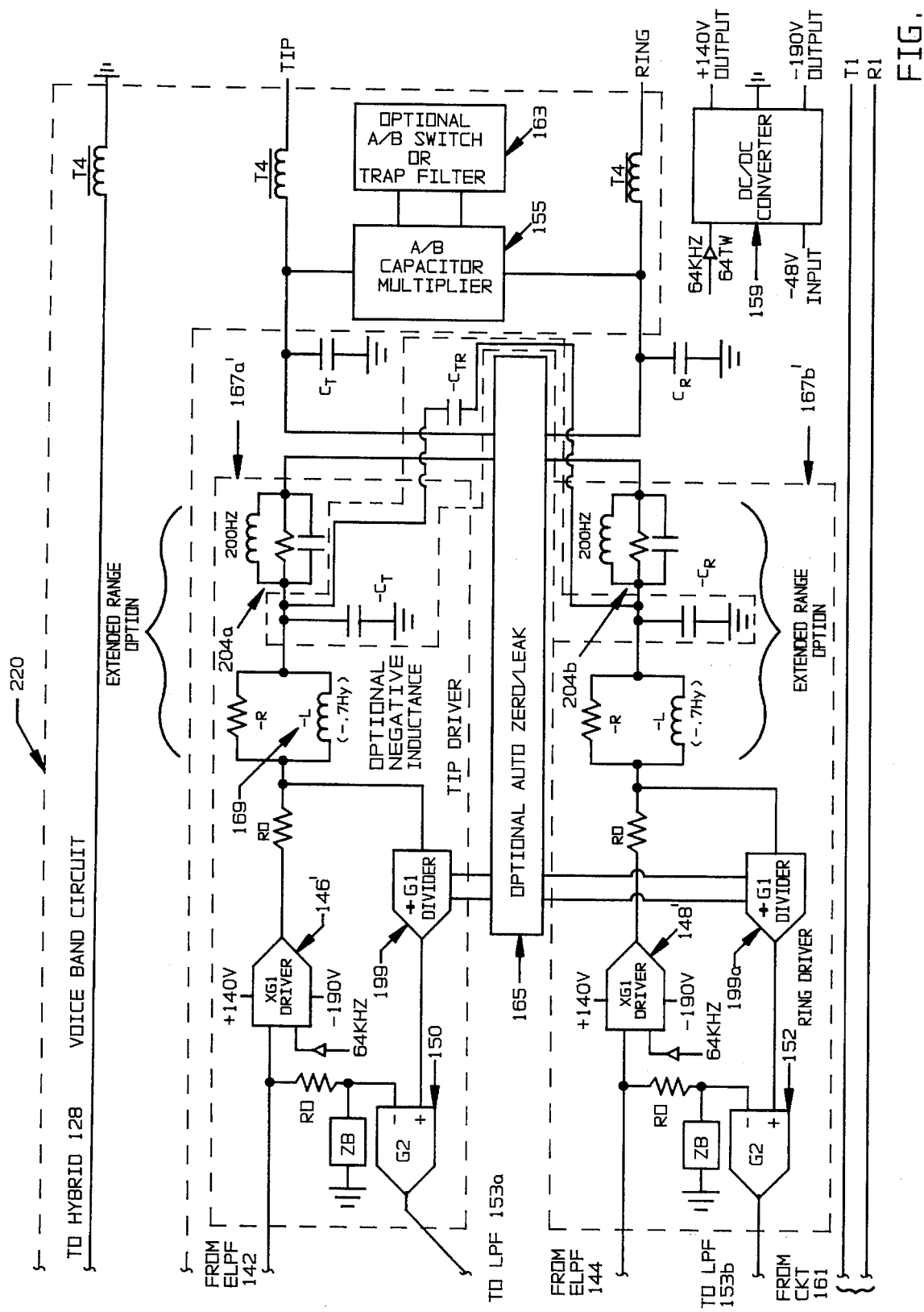
FIG. 12 is a simplified block diagram of a third embodiment of a metallic channel unit network of the present invention.

In FIG. 12, there is illustrated a simplified block diagram of a third embodiment of a metallic channel unit network of the present invention. By comparing the block diagram of FIG. 12 with the block diagram of FIGS. 6A and 6B, it can be seen that in the third embodiment of FIG. 12 all of the component blocks of the metallic channel unit network 220 remain essentially the same as the metallic channel unit network 120 in FIGS. 6A and 6B, except for the tip driver portion 167a' and the ring driver portion 167b'.

Referring in particular to FIG. 12, the negative capacitor circuit 202 has been added to the XG1 tip switch mode driver 146' after the negative inductor circuit 169 and to the XG1 ring switch mode driver 148' after the negative inductor circuit. The negative capacitor circuit 202 includes a first negative shunt capacitance $-C_T$ coupled between the tip terminal and the ground potential, a second negative shunt capacitance $-C_R$ coupled between the ring terminal and the ground potential, and a third negative shunt capacitor $-C_{TR}$ intercoupled between the tip terminal and the ring terminal. The 200 Hz impedance circuit 204a is connected in series with the tip terminal and generates a positive impedance at the frequency of 200 Hz. Similarly, the 200 Hz impedance 204b is connected in series with the ring terminal and generates a positive impedance at the frequency of 200 Hz.

Figure 13:
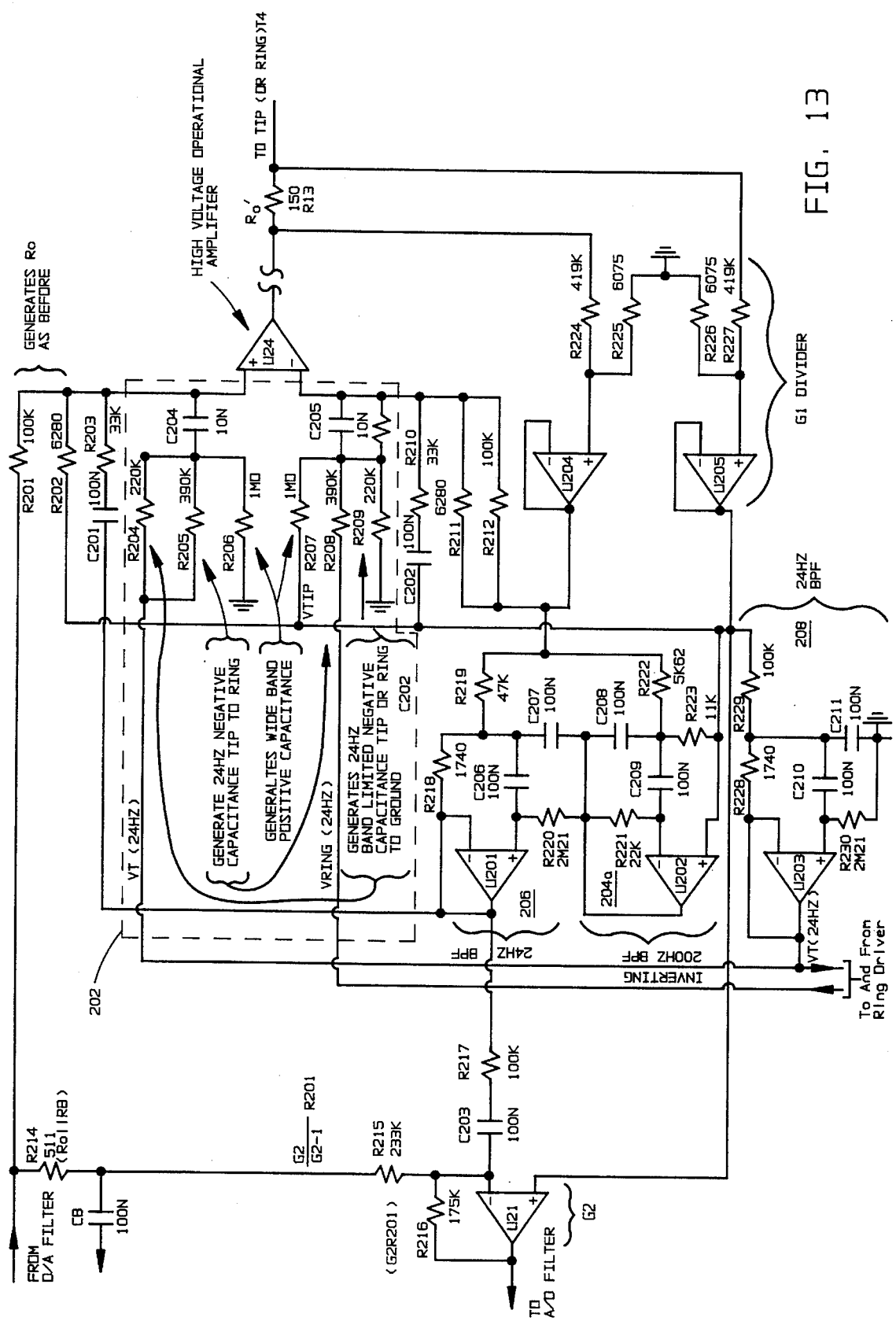
FIG. 13 is a detailed schematic circuit diagram of the modified (extended range) tip switch mode driver 146' in the tip driver portion 167a'.

Referring now to FIG. 13, there is shown a detailed circuit diagram of the extended range tip driver portion 167a' in the third embodiment of the metallic channel unit network 220 of the present invention. It should be understood that the extended range ring driver portion 167b' is identical to the tip driver portion 167a' and thus it will be sufficient to illustrate and describe in detail only the tip driver portion 167a'. The tip driver portion 167a' includes a switch mode driver 146' formed of a high gain input amplifier U24 and all of the same components connected to the output of the amplifier U24 in the detailed schematic circuit diagram of FIGS. 7N–7Q of the second embodiment. It is only the input circuitry means connected to the input amplifier U24 that has been modified in order to produce the negative capacitor circuit 202 and the 200 Hz impedance circuit 204a (204b).

At the outset, it will be noted that the resistors R201 and R202 connected to the non-inverting input of the amplifier U24 serves to generate the output resistance Ro'. Further, the magnitude of the negative inductance $-L$ in the negative inductor circuit 169 has been increased and is generated by the series resistor and capacitor combinations R203/C201; R210/C202; and R217/C203. Specifically, the differential voltage between the outputs of operational amplifiers U204 and U205 is proportional to the output current as sensed through the resistor Ro'. Thus, this differential voltage drives the capacitors C201 and C202 with a negative polarity so as to generate the negative inductance $-L$ represented in the negative inductor circuit 169.

In order to limit the bandwidth for maintaining loop stability, there is added a negative inductor bandpass filter 206 having a center frequency of 24 Hz which is connected in series before the resistor and capacitor combination R217/C203 and R203/C201 so as to remove the negative inductance $-L$ for out-of-band signals. The bandpass filter 206 is formed by operational amplifier U201, capacitors C206, C207 and resistors R218–R220. This filter circuit is used to produce the negative inductance $-L$ at 24 Hz, but at higher and lower frequencies than 24 Hz the negative inductance is eliminated.

The facility propagation delay also limits the range of the metallic channel unit network due to the undesired positive shunt capacitance created between the tip and ring terminals to the ground potential. Further, this positive shunt capacitance and the positive series inductance can resonate in the DC to 200 Hz frequency range, which is undesirable, due to the increase in the digital propagation delay (L and C). Therefore, in order to extend the range of the metallic channel unit network 220 a negative capacitor circuit 202 has been provided and is formed by resistors R204–R209 and capacitors C204, C205.

Figure 15A:
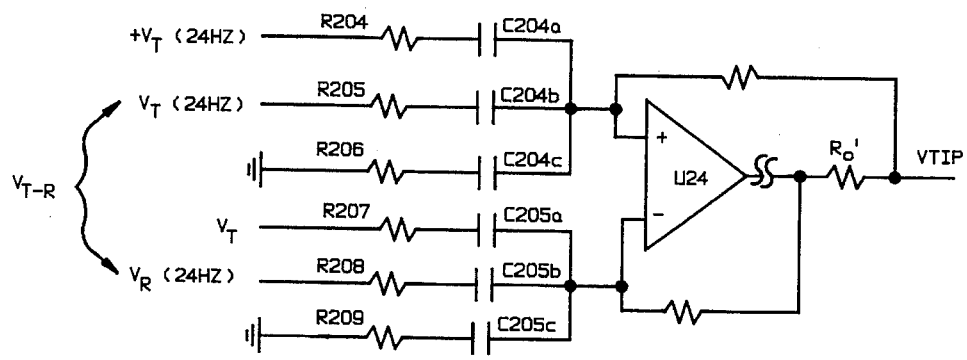
FIGS. 15(a) and 15(b) show how three individually generated capacitors are simplified by sharing a single capacitor.

In FIG. 15(a), there is shown a simplified circuit diagram of the negative capacitor circuit 202 connected to the non-inverting input of the operational amplifier U24. As can be seen, one end of the series resistor and capacitor combination R204/C204a is connected to receive the voltage $V_T$ and applies the same to the non-inverting input of the operational amplifier U24 for generating the first negative shunt capacitor $-C_T$ (FIG. 12) between the tip terminal and the ground potential. One end of the series resistor and capacitor combination R209/C205c is connected to the ground potential, and the other end thereof is connected to the inverting input of the operational amplifier U24 for generating the second negative shunt capacitor $-C_R$ (FIG. 12) between the ring terminal and the ground potential. One end of the series resistor and capacitor combination R205/C204b is connected to receive also the voltage $V_T$ and applies the same to the non-inverting input of the operational amplifier, and one end of the series resistor and capacitor combination R208/C205b is connected to receive the voltage $V_R$ and applies the same to the inverting input of the operational amplifier. The differential voltage $V_{T-R}$ ($V_T-V_R$) applied between the resistor and capacitor combinations R205/C204b and R208/C205b is used to generate the third negative shunt capacitor $-C_{TR}$ (FIG. 12) between the tip terminal and the ring terminal. It will be noted that the series resistor and capacitor combinations R206/C204c and R207/C205a are used to generate the wide band positive capacitance.

Figure 15B:
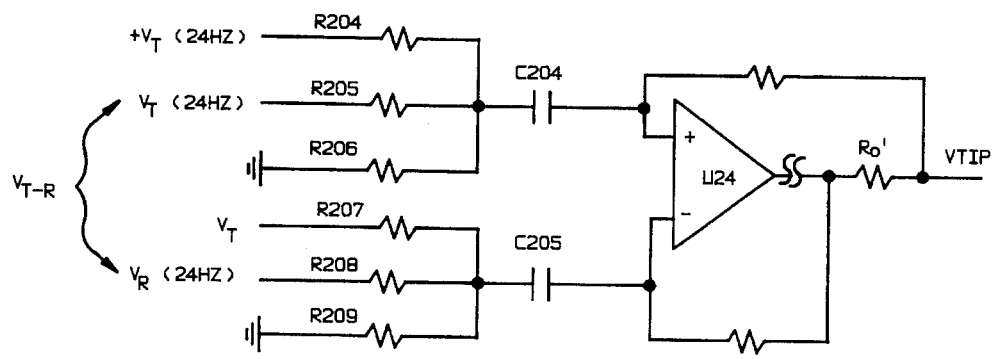

In FIG. 15(b), the three capacitors C204a, C204b, and C204c in FIG. 15(a) are combined together and are represented by a single capacitor C204 which is shared by the resistors R204–R206. Similarly, the three capacitors C205a, C205b, and C205c in FIG. 15(a) are combined together and are represented by a single capacitor C205, which is shared by the resistors R207–R209. This serves to reduce the number of components used, thereby saving costs. The effective capacitance in series with each of the resistors R204, R205 and R206 is determined by the following equations:

$$C_{eff(R204)} = C204 \times \frac{R205(R206)}{R204(R205) + R204(R206) + R205(R206)} \quad (1)$$

$$C_{eff(R205)} = C204 \times \frac{R204(R205)}{R204(R205) + R204(R206) + R205(R206)} \quad (2)$$

$$C_{eff(R206)} = C204 \times \frac{R204(R205)}{R204(R205) + R204(R206) + R205(R206)} \quad (3)$$

It will be understood that the effective capacitance in series with each of the resistors R207, R208, and R209 can be calculated by using equations similar to the above equation (1) through (3).

In order to limit the bandwidth of the negative capacitor circuit 202 for maintaining loop stability, there is also added a negative capacitor bandpass filter 208 having a center frequency of 24 Hz which is connected in series between the output of the operational amplifier U205 and the series resistor and capacitor combination R204/C204 so as to generate only the negative capacitance near the 24 Hz frequency. The bandpass filter is formed by operational amplifier U203, capacitors C210, C211 and resistors R228–R230. This filter circuit is used to produce the negative capacitances at 24 Hz, but at higher and lower frequencies than 24 Hz the negative capacitances are eliminated.

Figure 14:
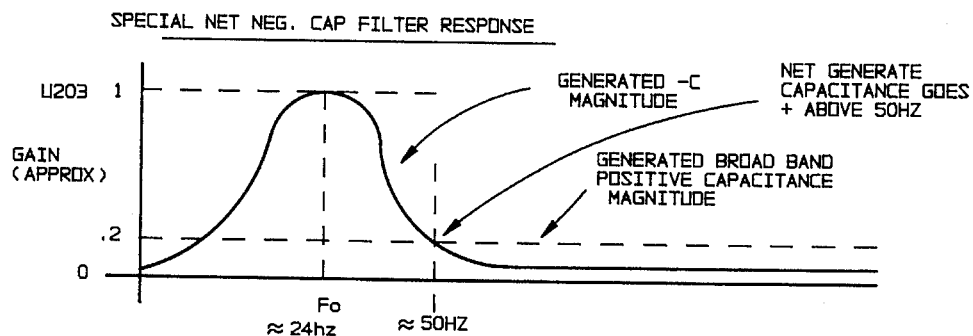
FIG. 14 is a plot showing the net frequency response of the second bandpass filter circuit.

However, in the case of a digital facility having a relatively long delay there is still created a problem when an open circuit resonance can occur even below the frequency of 100 Hz. In this situation, the apparent delay will induce a positive capacitance which will resonate with the positive inductance, thereby causing the positive capacitance to totally disappear at the resonant frequency. Consequently, the bandpass filter 208 having even the narrow bandpass range will still generate some negative out-of-band capacitance and thus the potential instability could occur. Accordingly, in order to insure that the negative capacitor circuit 202 has stability above the frequency of 50 Hz, the resistor and capacitor combinations R206/C204 and R207/C205 defining compensation means were added to provide a small wide band positive capacitance to compensate or cancel the negative capacitance generated therein by the bandpass filter 208 above 50 Hz. The frequency response of the bandpass filter 208 and compensation circuitry has been illustrated in FIG. 14.

The 200 Hz longitudinal impedance circuit 204a (204b) is connected between the negative inductor circuit 169 and the tip (ring) terminal so as to produce a positive impedance at the frequency of 200 Hz. The 200 Hz impedance circuit 204a is comprised of an inverting bandpass filter which is formed by an operational amplifier U202, resistors R221–R223 and capacitors C208, C209. This 200 Hz bandpass filter serves as a 200 Hz tank circuit and is used to generate a positive impedance at the frequency of 200 Hz.

As can be seen, the output of the operational amplifier U202 is fed to the non-inverting input of the operational amplifier U201 via the resistor R220 and the capacitors C206, C207. In other words, at the frequency of 24 Hz the operational amplifier U201 will drive the input of the operational amplifier U24 negatively via the capacitor/resistor combinations C201/R203, C202/R210 and C203/R217 to produce the negative inductance −L since the 200 Hz bandpass circuit 204a is mostly disabled (i.e., no output at 24 Hz). On the other hand, at the frequency of 200 Hz the operational amplifier U201 will drive the input of the operational amplifier U24 positively via the same capacitor/resistor combinations to produce the positive series resistance since the bandpass filter 206 is mostly disabled (i.e., no output at 200 Hz).

Figure 16:
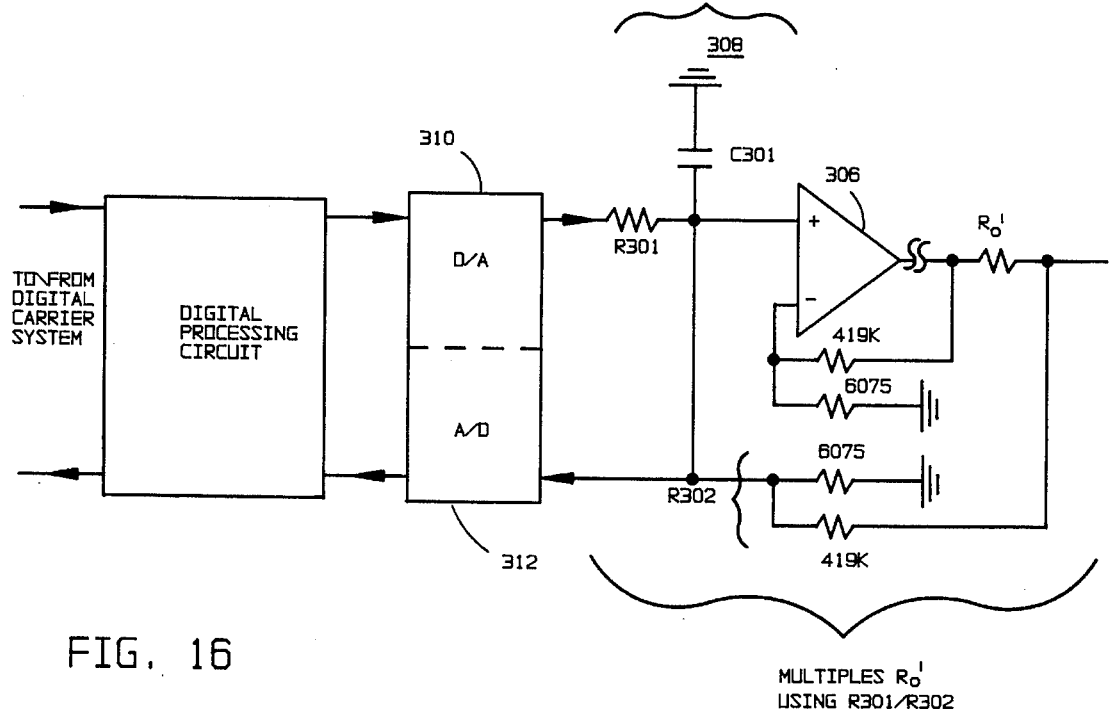
FIG. 16 is a simplified block diagram, illustrating digital implementation of the analog control circuit utilizing a single operational amplifier.

It should be understood to those skilled in the art that while the negative inductor circuit 169, negative capacitor circuit 202, and 200 Hz impedance circuit 204 have been shown to be made with analog circuitry they may be implemented digitally as an alternative. This digital implementation would provide the desired precision and also reduce the costs. In FIG. 16 of the drawings, there is shown a simplified block diagram which represents the digital implementation of the analog circuitry and utilizes a single operational amplifier 306. In this case, an A/D-D/A filter 308 formed by resistors R301, R302 and capacitor C301 is operatively connected to the D/A signal processing circuit 310 and A/D signal processing circuit 312 so as to prevent anti-aliasing.

Figure 17:
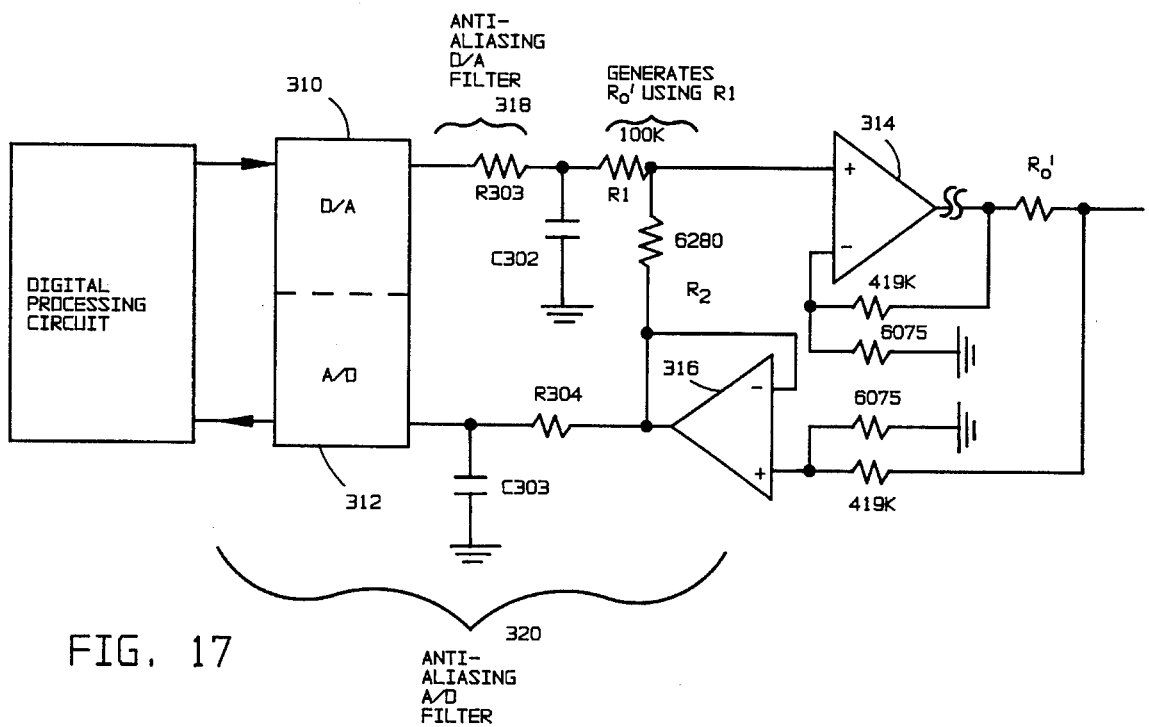
FIG. 17 is a simplified block diagram, illustrating the digital implementation of the analog control circuit utilizing two operational amplifiers.

In FIG. 17 of the drawings, there is shown a simplified block diagram which represents the digital implementation of the analog circuitry and utilizes two operational amplifiers 314 and 316. In this instance, a first D/A filter 318 formed of a resistor R303 and capacitor C302 is operatively connected to the D/A signal processing circuit 310 and a second A/D filter 320 formed of resistor R304 and capacitor C303 is operatively connected to the A/D signal processing circuit 312.

By the digital implementation of the negative inductor circuit 169 and the negative capacitance circuit 202, there is obtained the advantage of having the capability to adjust automatically the values of the negative inductance and negative capacitance so as to match or track with the positive inductance and capacitance due to the total digital propagation delay, which may vary with each installation. Thus, the simulated cable's apparent length is made to be independent of each installation by this automatic adjustment feature.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A channel unit network having a two-wire port for interconnecting a two-wire, bidirectional signal transmitting means with a four-wire digital transmitting means in a communication system to create a precision bidirectional simulated two-wire pair with an extended operating range over a transmission medium, said two-wire port having tip and ring terminals adapted for connection to the two-wire means, said channel unit network comprising:

signal processing circuit means, coupled to said four-wire means and being responsive to incoming tip and ring "DC band" frequency signals from said four-wire means and to incoming tip and ring "DC band" frequency signals from said two-wire means, for performing both digital-to-analog conversions on said incoming tip and ring "DC band" frequency signals from said four-wire means and analog-to-digital conversions on said incoming tip and ring "DC band" frequency signals from said two-wire means;

tip driver means having an input coupled to said signal processing means for receiving said incoming tip "DC band" frequency signals from said four-wire means and an output coupled to said tip terminal for supplying corresponding outgoing tip terminal "DC band" frequency signals from said four-wire means;

ring driver means having an input coupled to said signal processing means for receiving said incoming ring "DC band" frequency signals from said four-wire means and an output coupled to said ring terminal for supplying corresponding outgoing ring terminal "DC band" frequency signals from said four-wire means;

first resistance means having its input coupled to the output of said tip switch mode driver means and an output;

first negative inductor circuit means coupled between the output of said first resistance means and said tip terminal for generating a first negative inductance at a first predetermined frequency;

first bandpass filter means operatively connected to said first negative inductor circuit means for eliminating said first negative inductance at frequencies higher and lower than said first predetermined frequency so as to provide loop stability;

second resistance means having its input coupled to the output of said ring switch mode driver means and an output;

second negative inductor circuit means coupled between the output of said second resistance means and said ring terminal for generating a second negative inductance at a second predetermined frequency; and second bandpass filter means operatively connected to said second negative inductor circuit means for eliminating said second negative inductance at frequencies higher and lower than said second predetermined frequency so as to provide loop stability.

2. A channel unit network as claimed in claim 1, further comprising tip negative capacitor circuit means coupled to said input of said tip driver means for generating a first negative shunt capacitance between said tip terminal and the ground potential, a second negative shunt capacitance between said ring terminal and the ground potential, and a third negative shunt capacitance between said tip terminal and said ring terminal so as to reduce propagation delay.

3. A channel unit network as claimed in claim 2, further comprising third bandpass filter means operatively connected to said tip negative capacitor circuit means for generating said first, second and third negative shunt capacitances at a frequency of approximately 24 Hz so as to produce loop stability.

4. A channel unit network as claimed in claim 3, further comprising longitudinal impedance circuit means coupled between said first negative inductance and said tip terminal for generating a positive impedance at a frequency of approximately 200 Hz so as to prevent over-loading of external telephone company testing circuitry.

5. A channel unit network as claimed in claim 4, wherein said first bandpass filter means is formed of a first operational amplifier, and capacitors and resistors operatively connected to said first operational amplifier to function as a bandpass filter having a center frequency of 24 Hz.

6. A channel unit network as claimed in claim 5, wherein said second bandpass filter means is formed of a second operational amplifier, and resistors and capacitors operatively connected to said second operational amplifier to function as a bandpass filter having a center frequency of 24 Hz.

7. A channel unit network as claimed in claim 6, wherein said longitudinal impedance circuit means is formed of a third operational amplifier, and resistors and capacitors operatively connected to said third operational amplifier to function as a 200 Hz tank circuit.

8. A channel unit network as claimed in claim 7, further comprising compensation means formed of resistors and capacitors for producing a small wideband positive capacitance so as to cancel the negative capacitance generated therein by said third bandpass filter means at the frequency of above 50 Hz in order to maintain stability.

9. A channel unit network as claimed in claim 8, wherein said first, second and third negative capacitances are used in conjunction with said negative inductance for eliminating propagation delay caused by undesired positive shunt capacitances and positive series inductance in the frequency range of DC to 200 Hz.

10. A channel unit network having a two-wire port for interconnecting a two-wire, bidirectional signal transmitting means with a four-wire digital transmitting means in a communication system to create a precision bidirectional simulated two-wire pair with an extended operating range over a transmission medium, said two-wire port having tip and ring terminals adapted for connection to the two-wire means, said channel unit network comprising:

signal processing circuit means, coupled to said four-wire means and being responsive to incoming tip and ring "DC band" frequency signals from said four-wire means and to incoming tip and ring "DC band" frequency signals from said two-wire means, for performing both digital-to-analog conversions on said incoming tip and ring "DC band" frequency signals from said four-wire means and analog-to-digital conversions on said incoming tip and ring "DC band" frequency signals from said two-wire means;

tip driver means having an input coupled to said signal processing means for receiving said incoming tip "DC band" frequency signals from said four-wire means and an output coupled to said tip terminal for supplying corresponding outgoing tip terminal "DC band" frequency signals from said four-wire means;

first resistance means having its input coupled to the output of said tip switch mode driver means and an output;

first negative inductor circuit means coupled between the output of said first resistance means and said tip terminal for generating a first negative inductance at a predetermined frequency; and first bandpass filter means operatively connected to said first negative inductor circuit means for eliminating said first negative inductance at frequencies higher and lower than said predetermined frequency so as to provide loop stability.

11. A channel unit network as claimed in claim 10, further comprising tip negative capacitor circuit means coupled to said input of said tip driver means for generating a first negative shunt capacitance between said tip terminal and the ground potential, a second negative shunt capacitance between said ring terminal and the ground potential, and a third negative shunt capacitance between said tip terminal and said ring terminal so as to reduce propagation delay.

12. A channel unit network as claimed in claim 11, further comprising second bandpass filter means operatively connected to said tip negative capacitor circuit means for generating said first, second and third negative shunt capacitances at a frequency of approximately 24 Hz so as to produce loop stability.

13. A channel unit network as claimed in claim 12, further comprising longitudinal impedance circuit means coupled between said first negative inductance and said tip terminal for generating a positive impedance at a frequency of approximately 200 Hz so as to prevent overloading of external telephone company testing circuitry.

14. A channel unit network as claimed in claim 13, wherein said first bandpass filter means is formed of a first operational amplifier, and capacitors and resistors operatively connected to said first operational amplifier to function as a bandpass filter having a center frequency of 24 Hz.

15. A channel unit network as claimed in claim 14, wherein said second bandpass filter means is formed of a second operational amplifier, and resistors and capacitors operatively connected to said second operational amplifier to function as a bandpass filter having a center frequency of 24 Hz.

16. A channel unit network as claimed in claim 15, wherein said longitudinal impedance circuit means is formed of a third operational amplifier, and resistors and capacitors operatively connected to said third operational amplifier to function as a 200 Hz tank circuit.

17. A channel unit network as claimed in claim 16, further comprising compensation means formed of resistors and capacitors for producing a small wideband positive capacitance so as to cancel the negative capacitance generated therein by said third bandpass filter means at the frequency of above 50 Hz in order to maintain stability.

18. A channel unit network as claimed in claim 17, wherein said first, second and third negative capacitances are used in conjunction with said negative inductance for eliminating propagation delay caused by undesired positive shunt capacitances and positive series inductance in the frequency range of DC to 200 Hz.

* * * * *